(12) United States Patent  (10) Patent No.: US 8,816,350 B2
Sugihara et al.  (45) Date of Patent: Aug. 26, 2014

(54) ARRAY SUBSTRATE, LIQUID CRYSTAL PANEL, LIQUID CRYSTAL DISPLAY DEVICE, AND TELEVISION RECEIVER

(75) Inventors: Toshinori Sugihara, Osaka (JP); Toshihide Tsubata, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 115 days.

(21) Appl. No.: 13/255,242

(22) PCT Filed: Feb. 9, 2010

(86) PCT No.: PCT/JP2010/000765
§ 371 (c)(1),
(2), (4) Date: Sep. 8, 2011

(87) PCT Pub. No.: WO2010/103726
PCT Pub. Date: Sep. 16, 2010

(65) Prior Publication Data
US 2011/0315991 A1 Dec. 29, 2011

(30) Foreign Application Priority Data
Mar. 13, 2009 (JP) ................................. 2009-061993

(51) Int. Cl.
*H01L 27/14* (2006.01)
*G09G 3/36* (2006.01)
*G02F 1/1362* (2006.01)
*G02F 1/1343* (2006.01)

(52) U.S. Cl.
CPC ................... *G02F 1/136286* (2013.01); *G02F 2001/136218* (2013.01); *G09G 3/3607* (2013.01); *G09G 3/3614* (2013.01); *G09G 2300/0447* (2013.01); *G02F 2001/134345* (2013.01); *G09G 2300/0426* (2013.01); *G09G 3/3655* (2013.01); *G09G 2320/0209* (2013.01)
USPC .................... 257/72; 257/71; 257/E27.121

(58) Field of Classification Search
USPC ............. 257/59, 71, 7, E27.121; 345/76, 100
See application file for complete search history.

(56) References Cited

U.S. PATENT DOCUMENTS 5,247,289 A 9/1993 Matsueda
2005/0264498 A1 12/2005 Asano
(Continued)

FOREIGN PATENT DOCUMENTS

| CN | 1954253 A | 4/2007 |
|---|---|---|
| CN | 1979318 A | 6/2007 |
| CN | 101109880 A | 1/2008 |
| CN | 101354512 A | 1/2009 |

(Continued)

OTHER PUBLICATIONS

Official Communication issued in International Patent Application No. PCT/JP2010/000765, mailed on May 18, 2010.

*Primary Examiner* — Laura Menz
*Assistant Examiner* — Candice Y Chan
(74) *Attorney, Agent, or Firm* — Keating & Bennett, LLP

(57) ABSTRACT

An array substrate disclosed herein includes: scanning signal lines (16$i$ and 16$j$); data signal lines (15$x$, 15$y$, 15X, and 15Y) to each of which a data signal is supplied; a first pixel region column; and a second pixel region column adjacent to the first pixel region column, each of the first and second pixel region columns including pixel regions, wherein: two data signal lines corresponding to the first pixel region column are provided, two data signal lines corresponding to the second pixel region column are provided, a gap between two adjacent data signal lines (15$y$ and 15X) is provided, one of the two adjacent data signal lines being corresponding to the first pixel region column, and the other of the two adjacent data signal lines being corresponding to the second pixel region column; and a gap line 41 is provided within the gap, a Vcom signal being supplied to the gap line 41. This improves display quality of a liquid crystal display device in which each pixel column corresponds to a plurality of data signal lines.

31 Claims, 56 Drawing Sheets

(56) References Cited

U.S. PATENT DOCUMENTS

| | | |
|---|---|---|
| 2007/0132684 A1 | 6/2007 | Baek et al. |
| 2007/0200965 A1 | 8/2007 | Okawa et al. |
| 2008/0204613 A1 | 8/2008 | Kim et al. |
| 2009/0027581 A1 | 1/2009 | You et al. |
| 2010/0253668 A1 | 10/2010 | Sugihara et al. |
| 2011/0032238 A1 | 2/2011 | Asano |

FOREIGN PATENT DOCUMENTS

| | | |
|---|---|---|
| JP | 03-185428 A | 8/1991 |
| JP | 10-253987 A | 9/1998 |
| JP | 2001-281690 A | 10/2001 |
| JP | 2005-338592 A | 12/2005 |
| JP | 2006-005776 A | 1/2006 |
| JP | 2007-058007 A | 3/2007 |
| WO | 2008/090660 A1 | 7/2008 |
| WO | 2009/084331 A1 | 7/2009 |

F I G. 2
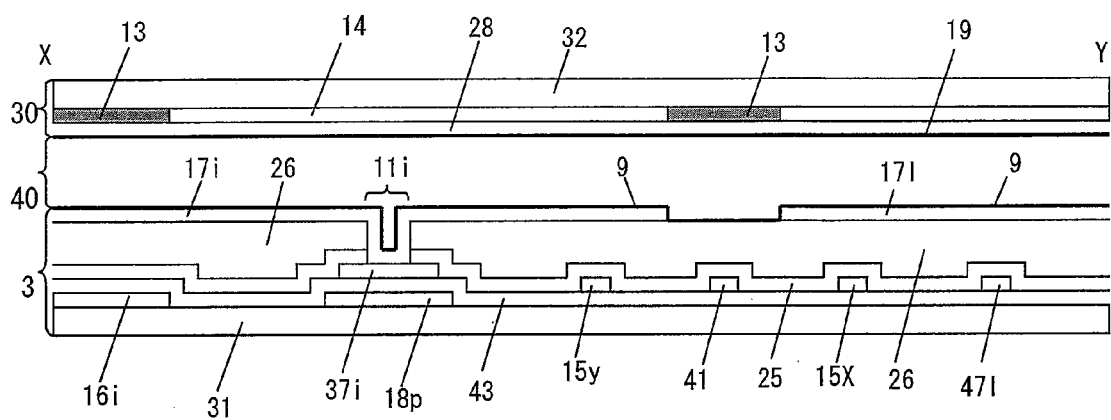

F I G. 5
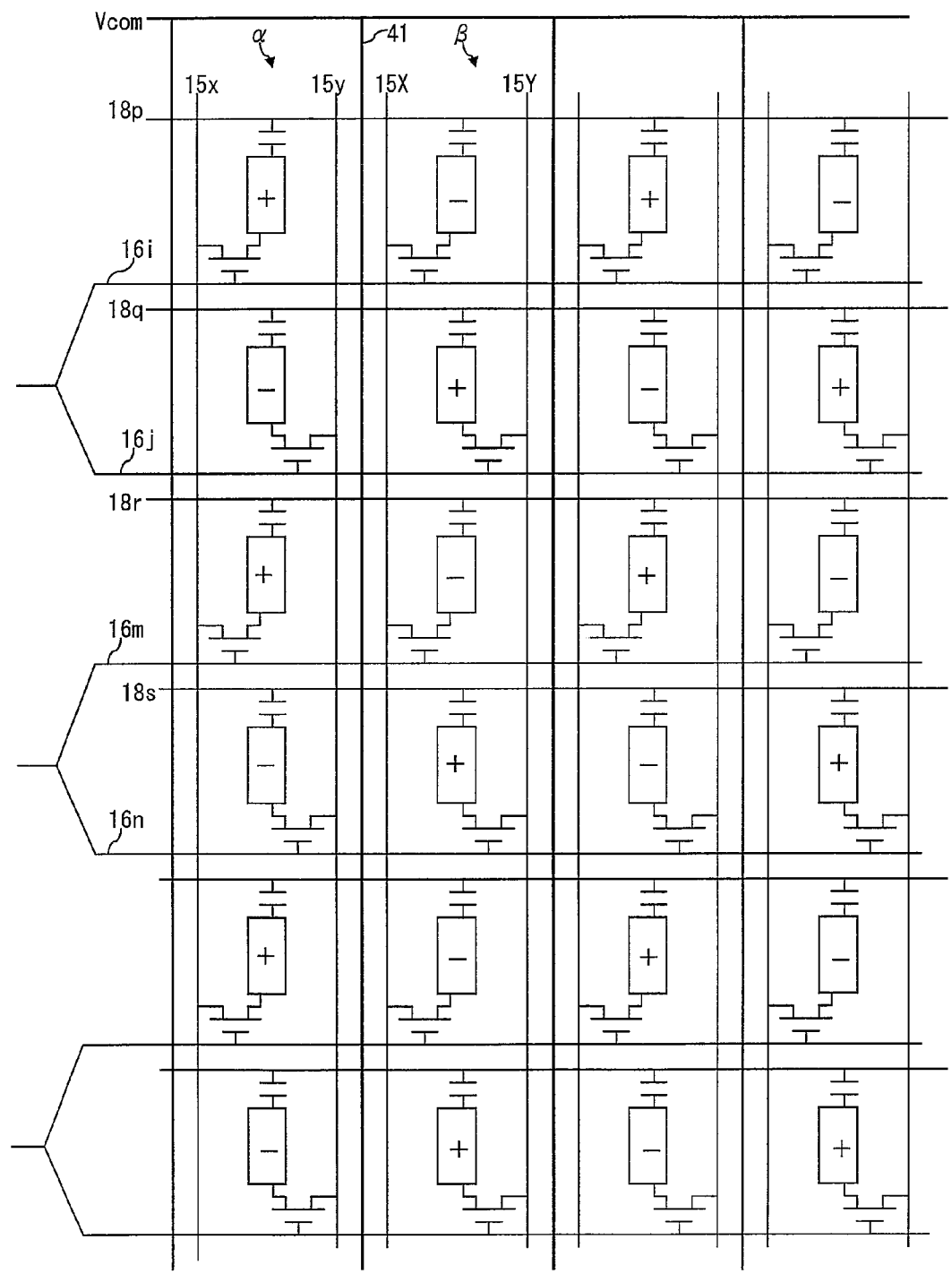

F I G. 6
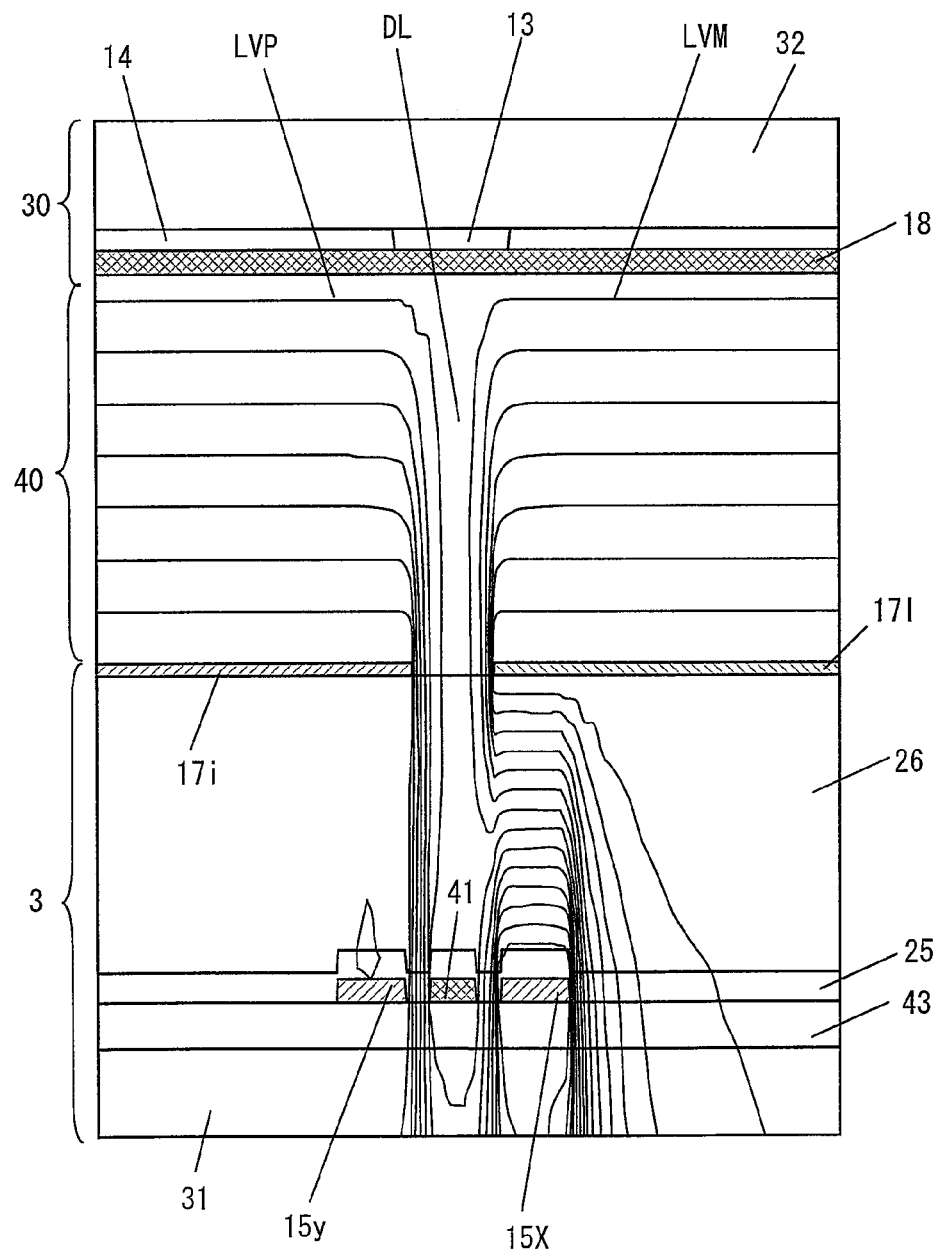

F I G. 9
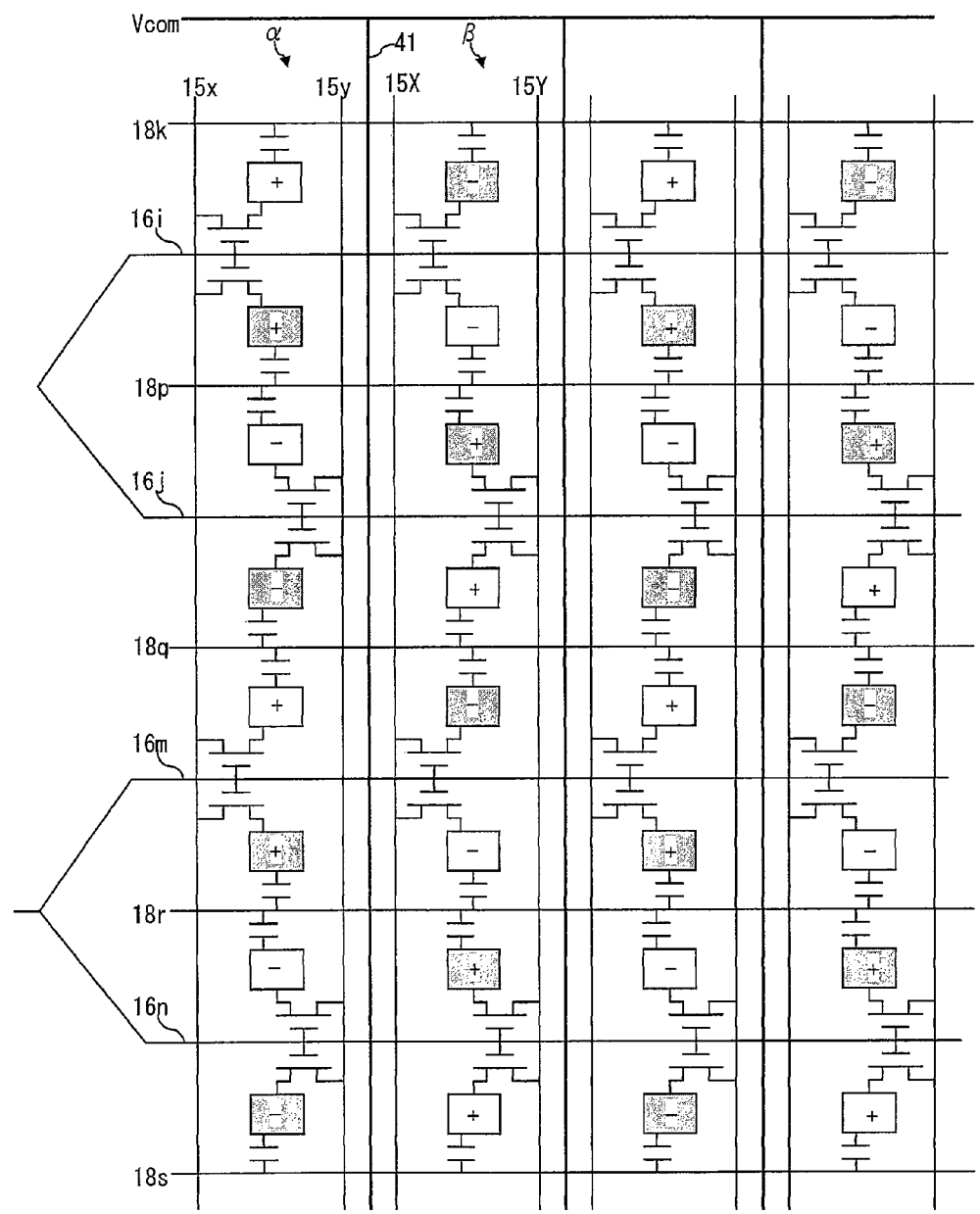

F I G. 1 1
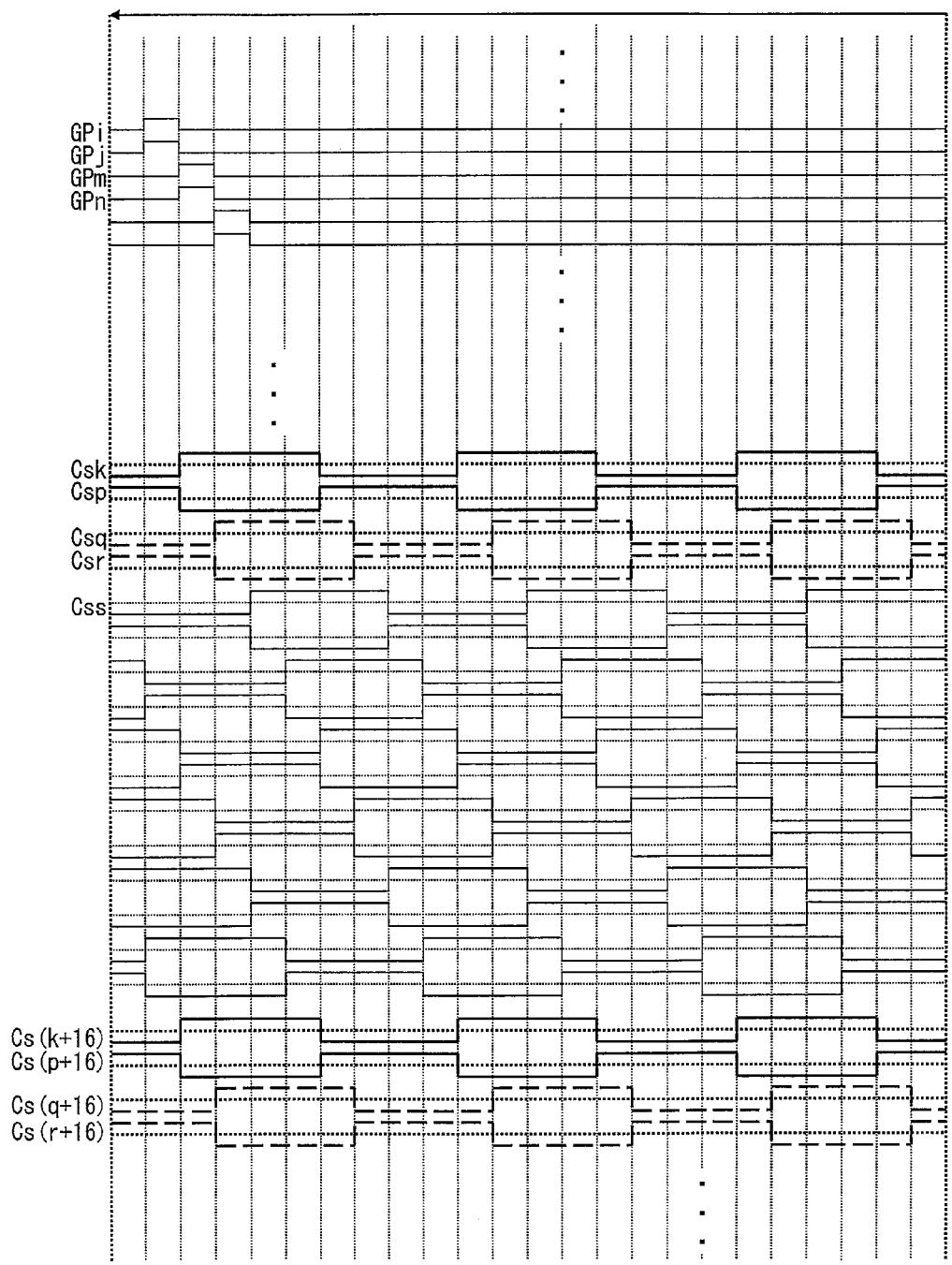

F I G. 1 6
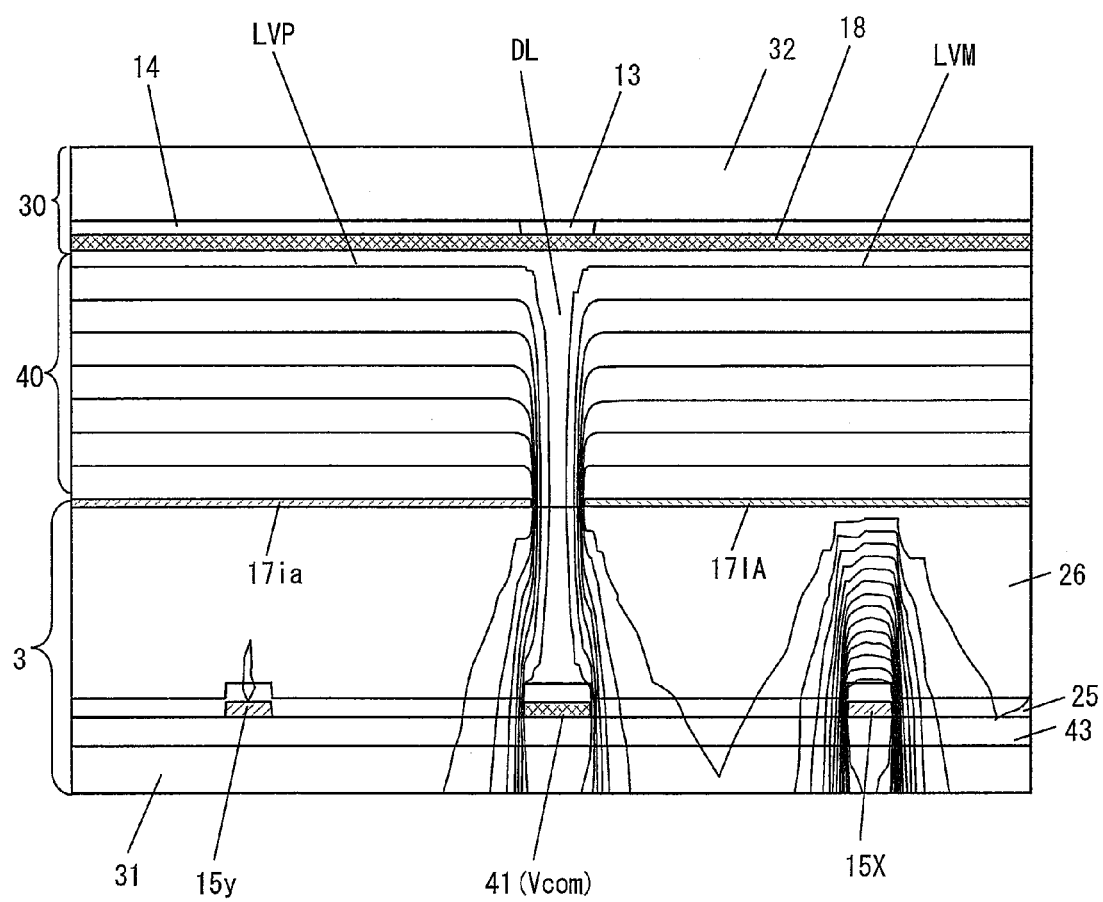

F I G. 2 1
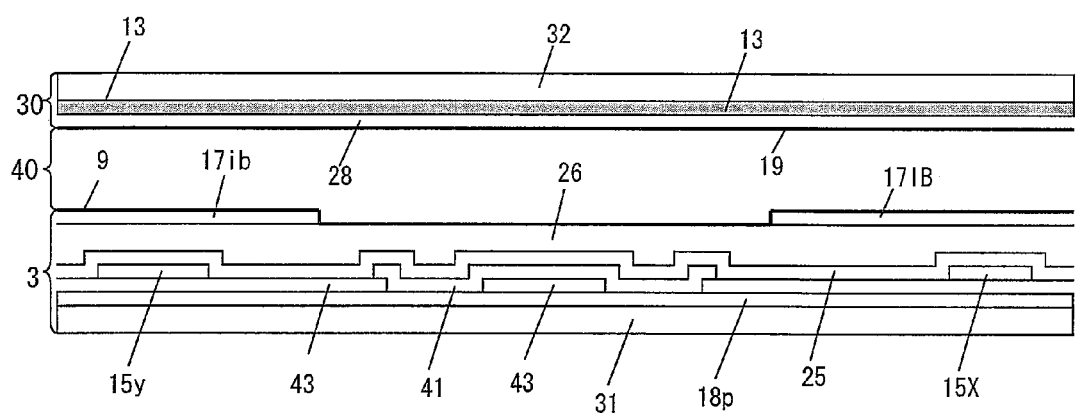

F I G. 2 2
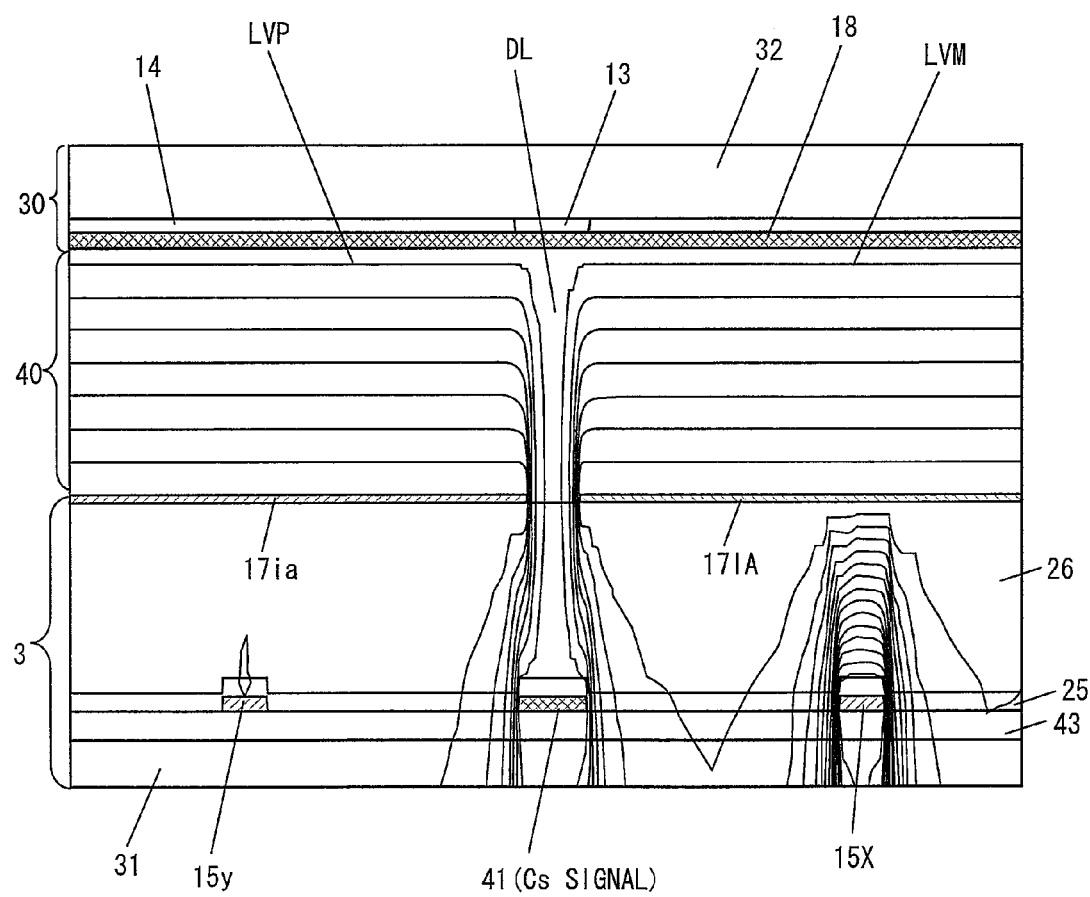

F I G. 3 1
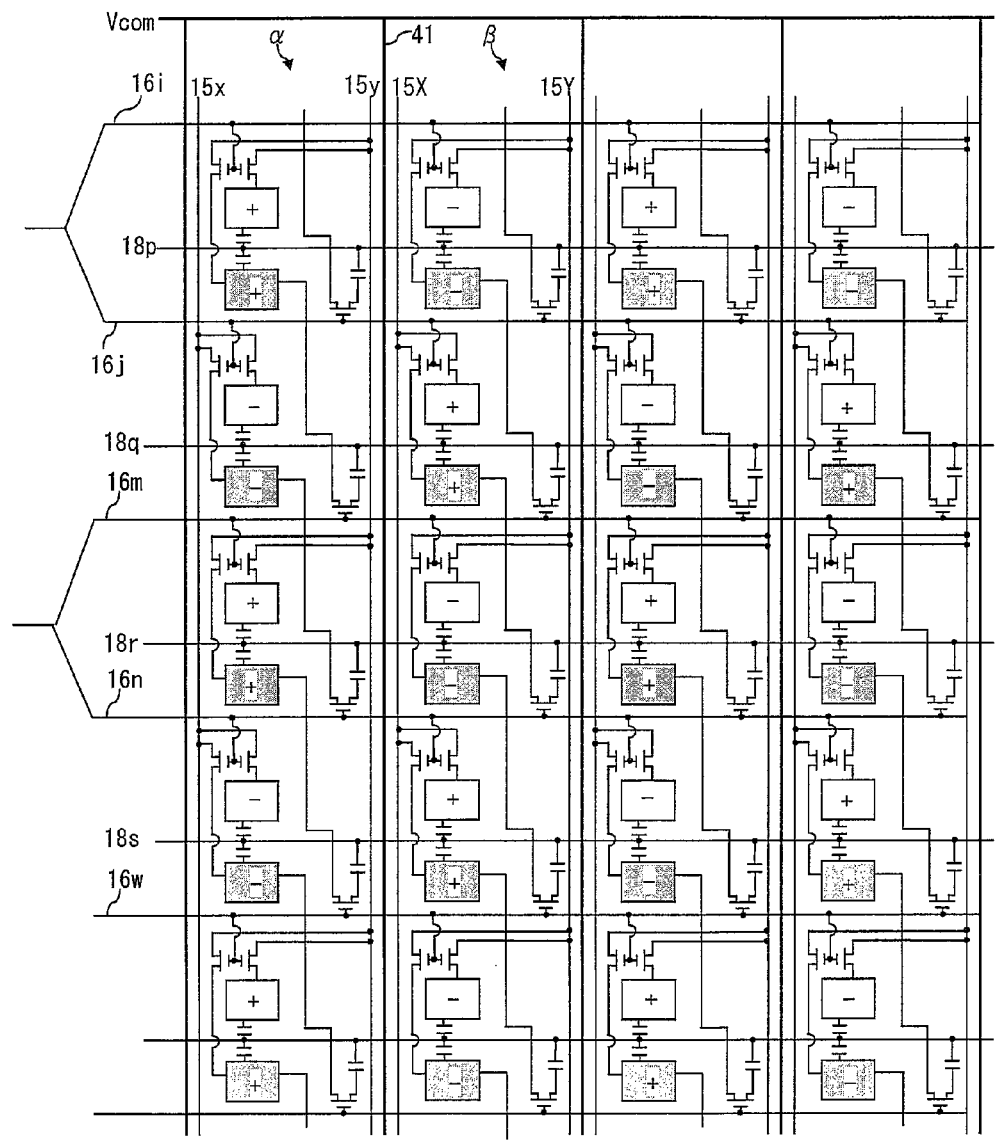

F I G. 3 3
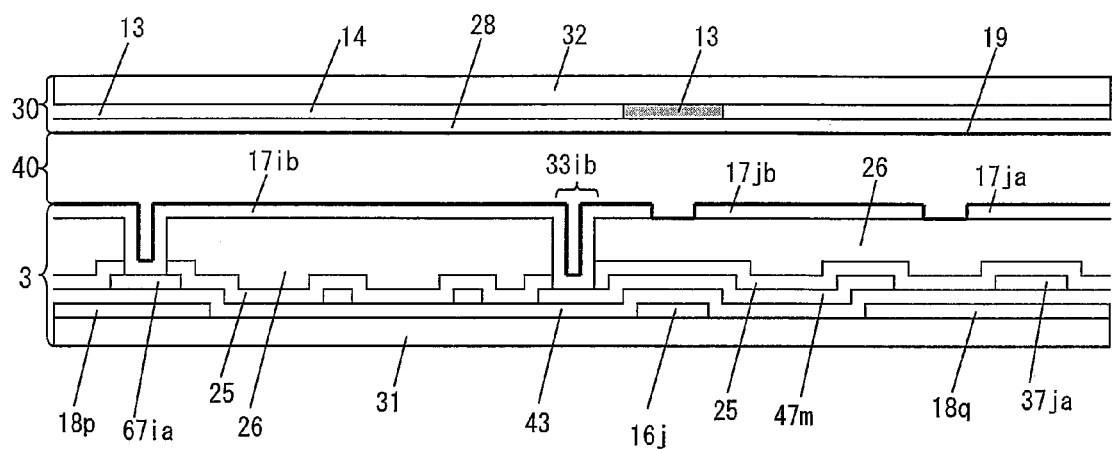

F I G. 3 6
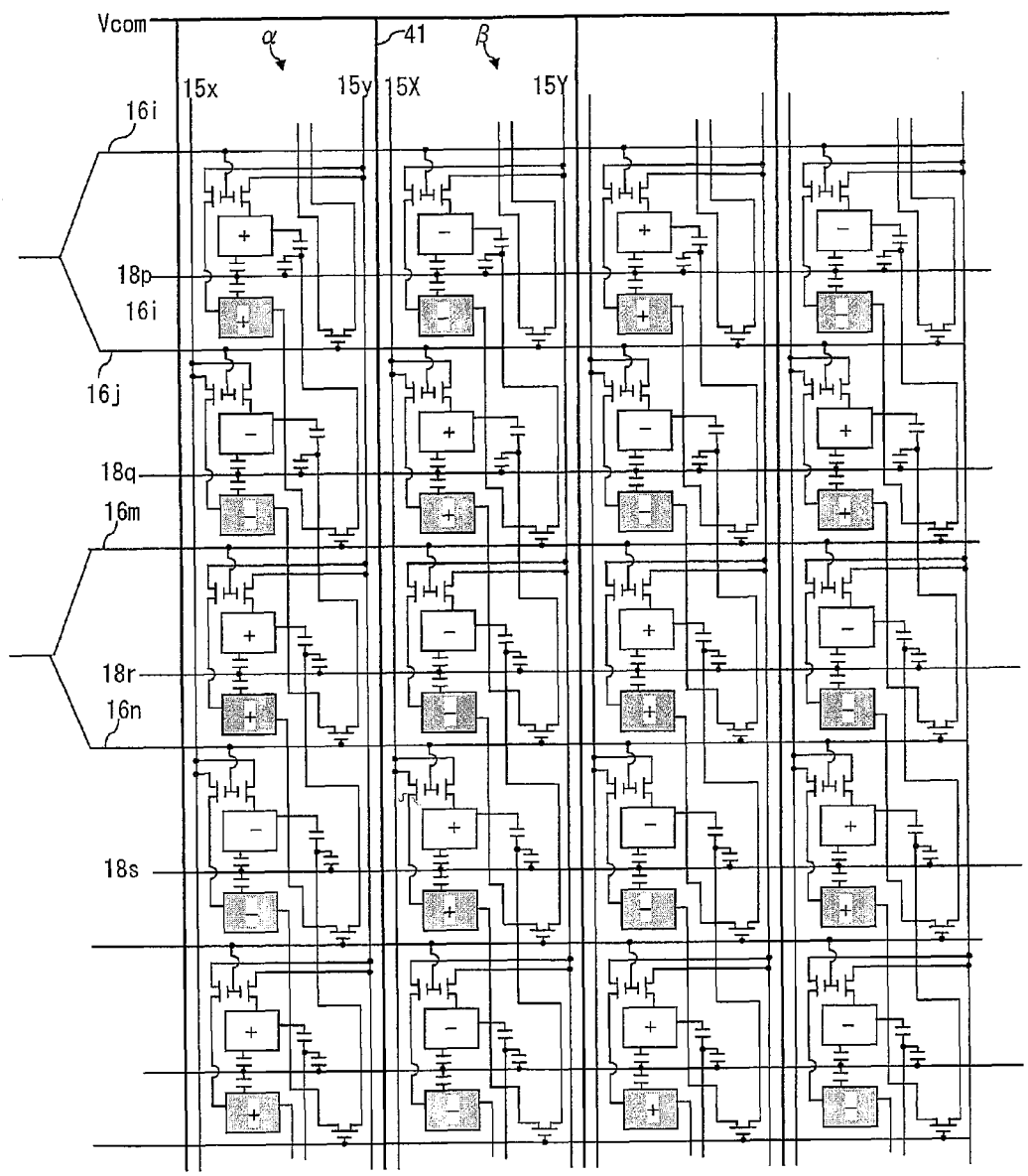

F I G. 4 3
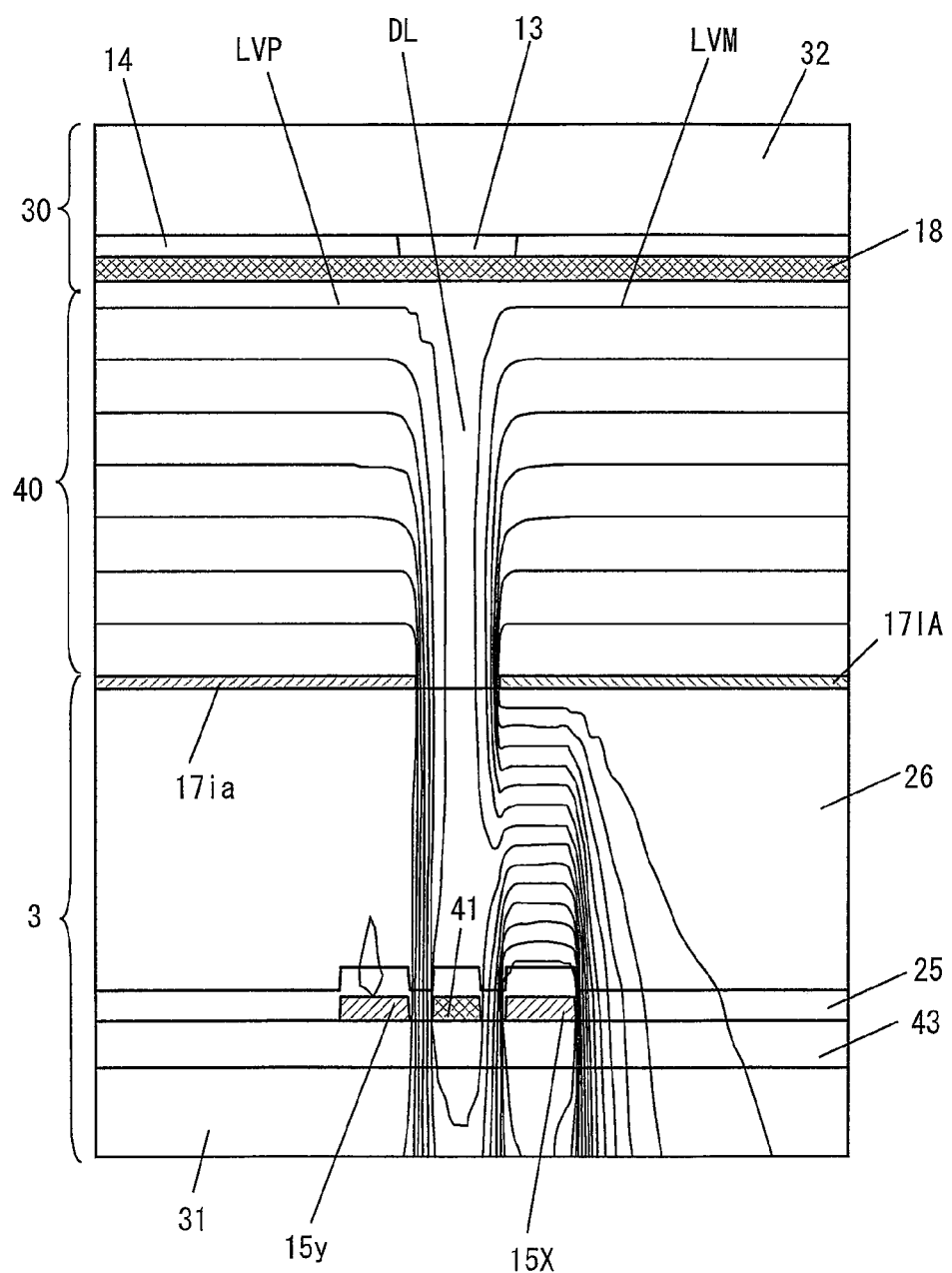

F I G. 5 0
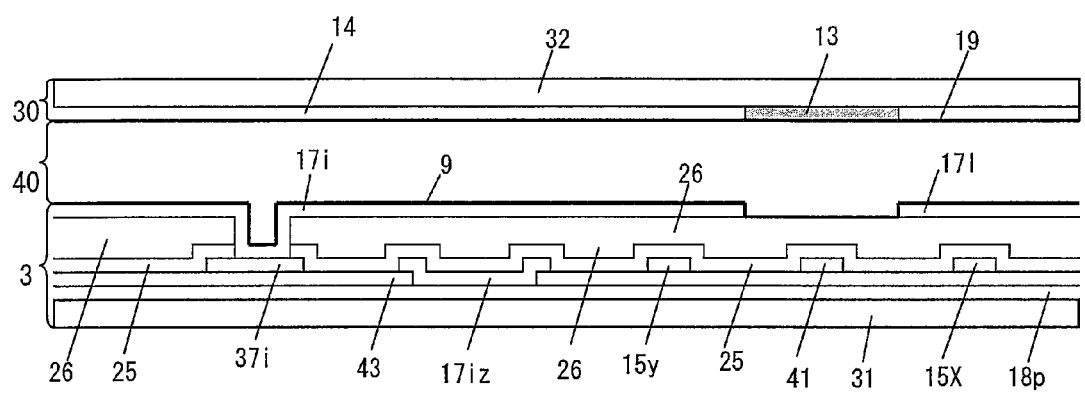

F I G. 5 2
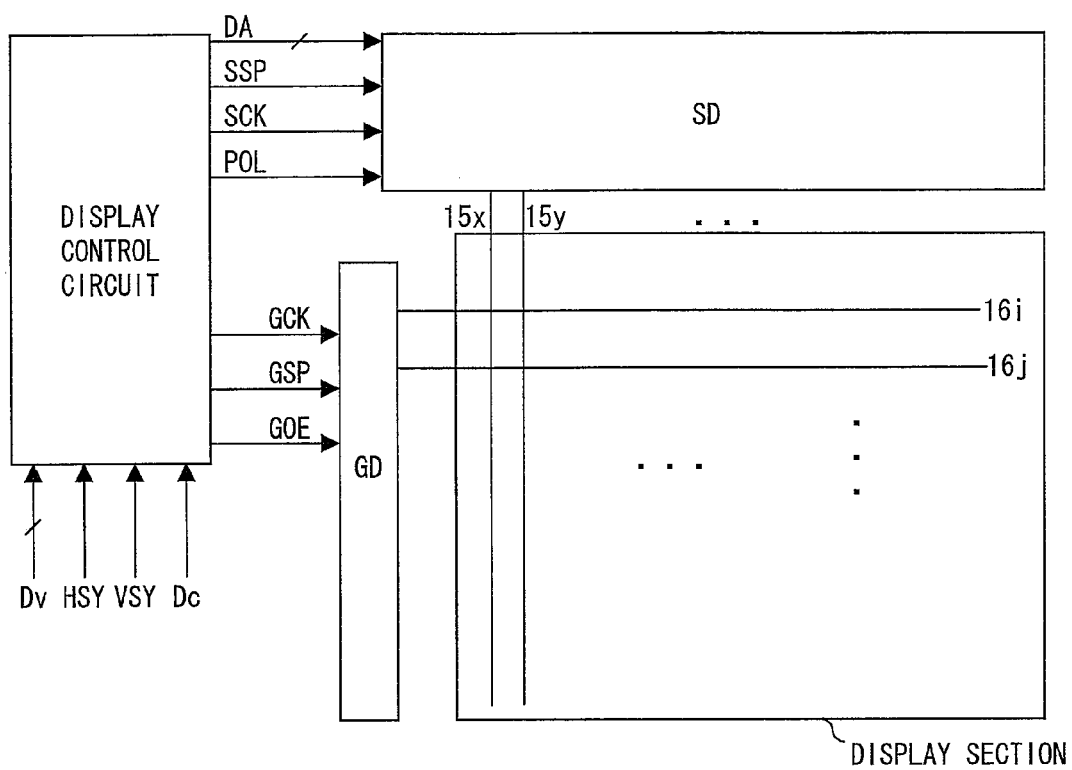

F I G. 5 4
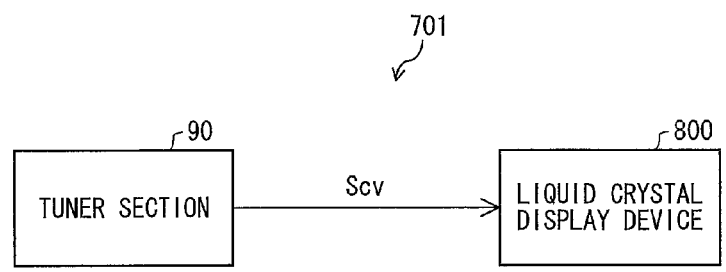
F I G. 5 5
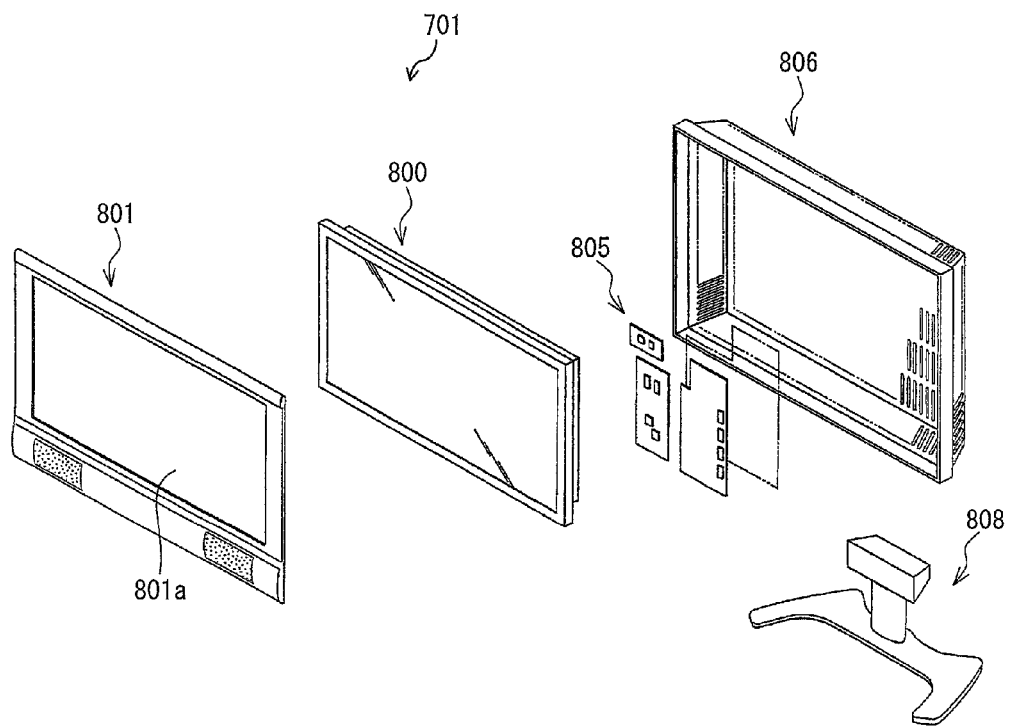

ARRAY SUBSTRATE, LIQUID CRYSTAL PANEL, LIQUID CRYSTAL DISPLAY DEVICE, AND TELEVISION RECEIVER

TECHNICAL FIELD

The present invention relates to a liquid crystal display device in which each pixel column corresponds to a plurality of data signal lines.

BACKGROUND ART

Patent Literature 1 (see FIG. 57) discloses a liquid crystal display device in which each pixel column corresponds to two data lines (namely, a left data line and a right data line). The pixel column includes pixels, among which (i) odd-numbered pixels each have a pixel electrode connected to the left data line and (ii) even-numbered pixels each have a pixel electrode connected to the right data line. With this configuration, two adjacent scanning signal lines are simultaneously selected (that is, (i) a scanning signal line connected to an odd-numbered pixel and (ii) a scanning signal line connected to an even-numbered pixel are simultaneously selected). This operation increases a speed of screen drawing.

There has also been proposed a liquid crystal panel of a pixel division system (in which system each pixel includes first and second pixel electrodes), in which liquid crystal panel each pixel column corresponds to two data lines. The pixel column includes pixels each having (i) a first sub pixel electrode connected to a first one of the two data lines and (ii) a second sub pixel electrode connected to a second one of the two data lines. This configuration makes it possible to (i) control driving of the first and second pixel electrodes for different luminances, and thus (ii) improve a viewing angle characteristic of the liquid crystal panel.

CITATION LIST

Patent Literature 1
Japanese Patent Application Publication, Tokukaihei, No. 10-253987 A (Publication Date: Sep. 25, 1998)

SUMMARY OF INVENTION

Technical Problem

The inventors of the present invention have found that unevenness (longitudinal shadow) in a shape of a longitudinal stripe appears in a case where each pixel column corresponds to a plurality of data signal lines as above. This unevenness is presumed to arise partially from a parasitic capacitance formed between (i) a pixel electrode of each pixel in a first one of two adjacent pixel columns and (ii) a data signal line corresponding to a second one of the two adjacent pixel columns.

It is an object of the present invention to improve display quality of a liquid crystal display device in which each pixel column corresponds to a plurality of data signal lines.

Solution to Problem

An array substrate of the present invention includes: scanning signal lines; data signal lines to each of which a data signal is supplied; a first pixel region column; and a second pixel region column adjacent to the first pixel region column, each of the first and second pixel region columns including pixel regions, wherein: data signal lines corresponding to the first pixel region column are provided; data signal lines corresponding to the second pixel region column are provided; a gap between two adjacent data signal lines is provided, one of the two adjacent data signal lines being corresponding to the first pixel region column, and the other of the two adjacent data signal lines being corresponding to the second pixel region column; and a gap line is provided in the gap, below the gap, or above the gap, a signal different from the data signal being supplied to the gap line.

Advantageous Effects of Invention

In a case where a display device (for example, a liquid crystal display device) including the array substrate of the present invention (for example, an active matrix substrate) is driven, the gap line is supplied with a signal other than the data signal (for example, a signal having a constant potential or a signal having a polarity which is inverted periodically). With this arrangement, it is possible to (i) reduce a cross talk between a first pixel and a data signal line corresponding to a second pixel adjacent to the first pixel, and thus (ii) improve display quality.

BRIEF DESCRIPTION OF DRAWINGS

FIG. 2 is a cross-sectional view, taken along a line, of the liquid crystal panel of FIG. 1.

FIG. 5 is a diagram schematically illustrating a display state of the liquid crystal panel being driven by the method of FIG. 4.

FIG. 6 is a cross-sectional view illustrating how equipotential lines are distributed in the vicinity of a gap line when the liquid crystal panel is being driven.

FIG. 9 is a diagram schematically illustrating a display state of the liquid crystal panel being driven by the method of FIG. 8.

FIG. 11 is a timing chart illustrating gate ON pulses and retention capacitor line signals in the driving method of FIG. 8.

FIG. 16 is a cross-sectional view illustrating how equipotential lines are distributed in the vicinity of a gap line when the liquid crystal panel is being driven.

FIG. 21 is a cross-sectional view, taken along a line, of the liquid crystal panel of FIG. 20.

FIG. 22 is a cross-sectional view illustrating how equipotential lines are distributed in the vicinity of a gap line when the liquid crystal panel is being driven.

FIG. 31 is a diagram schematically illustrating a display state of the liquid crystal panel being driven by the method of FIG. 30.

FIG. 33 is a cross-sectional view, taken along a line, of the liquid crystal panel of FIG. 32.

FIG. 36 is a diagram schematically illustrating a display state of the liquid crystal panel being driven by the method of FIG. 35.

FIG. 43 is a cross-sectional view illustrating how equipotential lines are distributed in the vicinity of a gap line when the liquid crystal panel is being driven.

FIG. 50 is a cross-sectional view, taken along a line, of the liquid crystal panel of FIG. 49.

(a) is a diagram schematically illustrating a configuration of a liquid crystal display unit of the present invention, and (b) diagram schematically illustrating a configuration of a liquid crystal display device of the present invention.

FIG. 52 is a block diagram illustrating an overall configuration of the liquid crystal display device.

Figure 53:
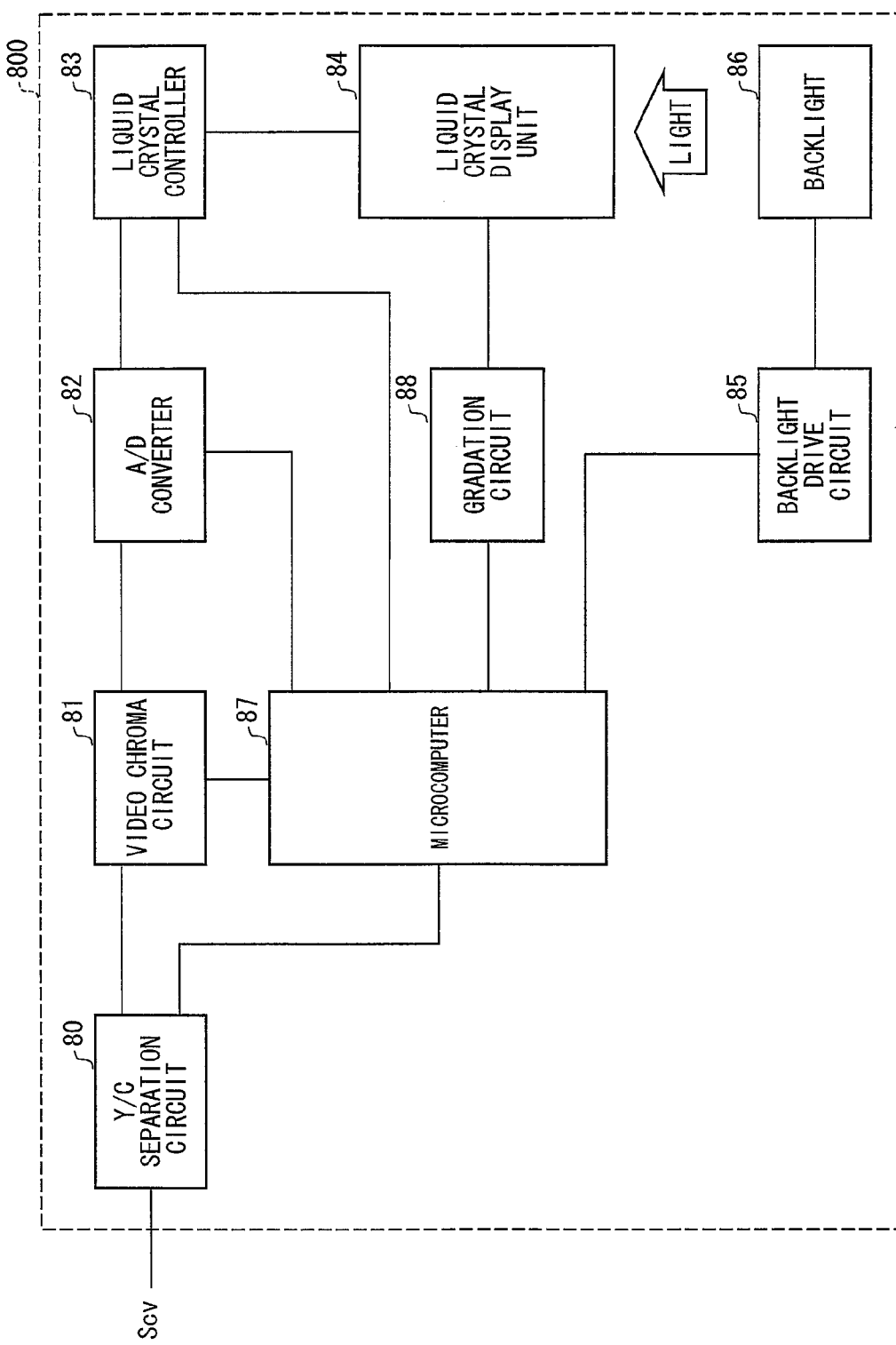

FIG. 53 is a block diagram illustrating functions of the liquid crystal display device.

FIG. 54 is a block diagram illustrating functions of a television receiver of the present invention.

FIG. 55 is an exploded perspective view illustrating a configuration of the television receiver.

Figure 56:
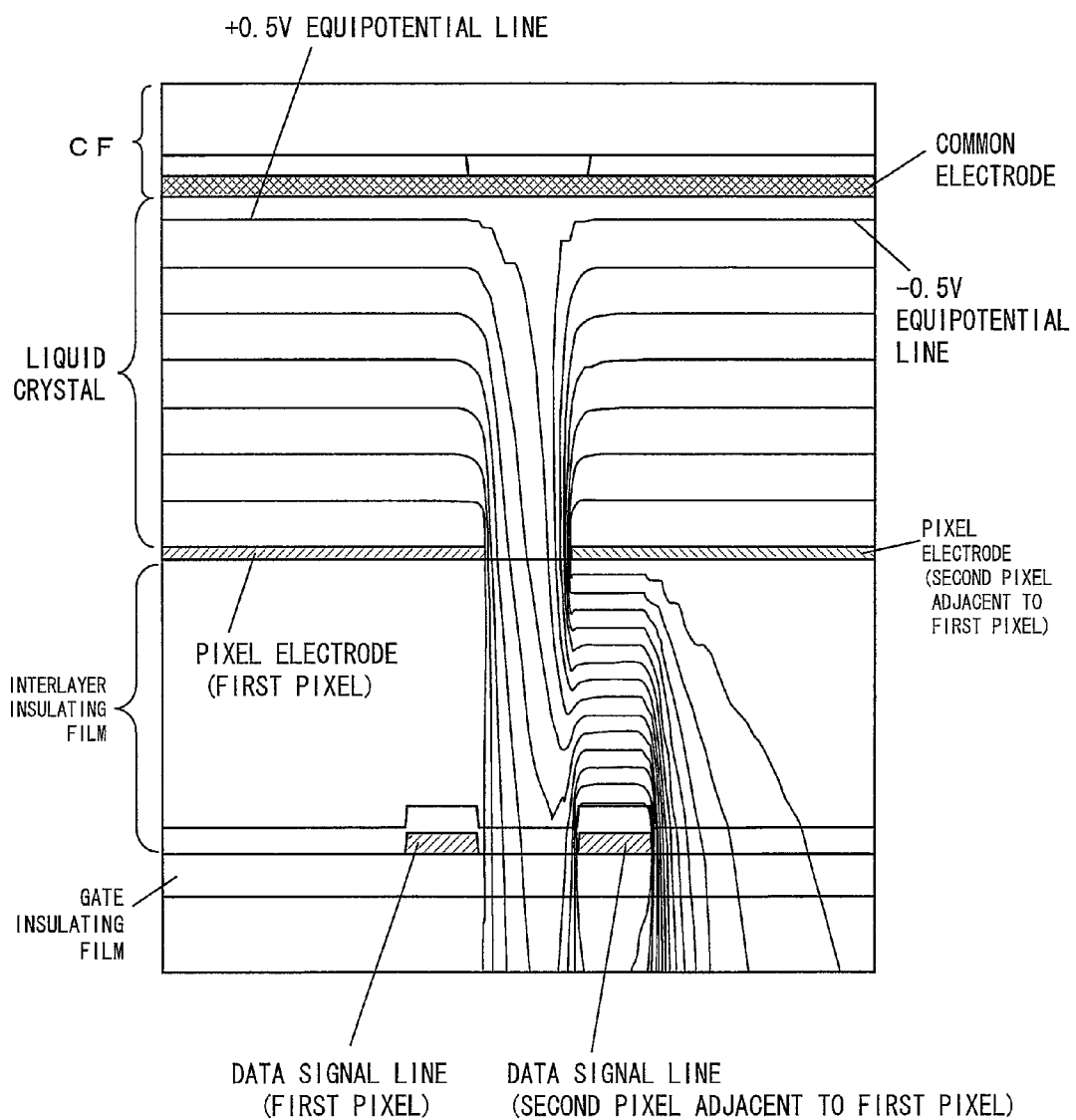

FIG. 56 is a cross-sectional view illustrating how equipotential lines are distributed between data signal lines in a reference liquid crystal panel being driven.

Figure 57:
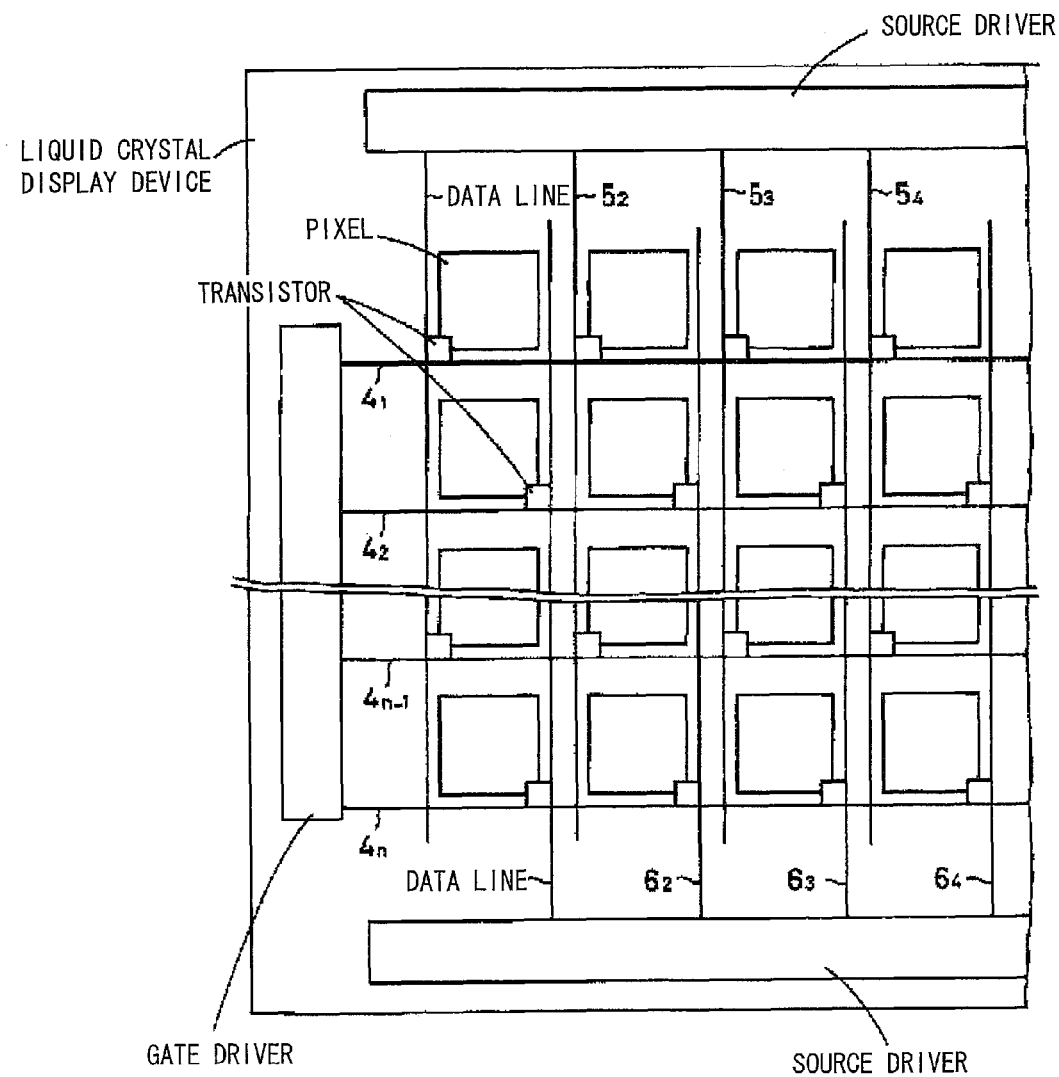

FIG. 57 is a plan view illustrating a configuration of a conventional active matrix substrate.

DESCRIPTION OF EMBODIMENTS

Embodiments of the present invention will be described below with reference to FIGS. 1 through 56. For convenience of explanation, the description below uses the term "row direction" to refer to a direction in which scanning signal lines extend. Needless to say, when a liquid crystal display device including a liquid crystal panel of the present invention (or an active matrix substrate used in the liquid crystal panel) is used (viewed), scanning signal lines may extend either in a lateral direction or a longitudinal direction. In each drawing showing a liquid crystal panel, an alignment-controlling structure is omitted as necessary.

[Embodiment 1]

Figure 3:
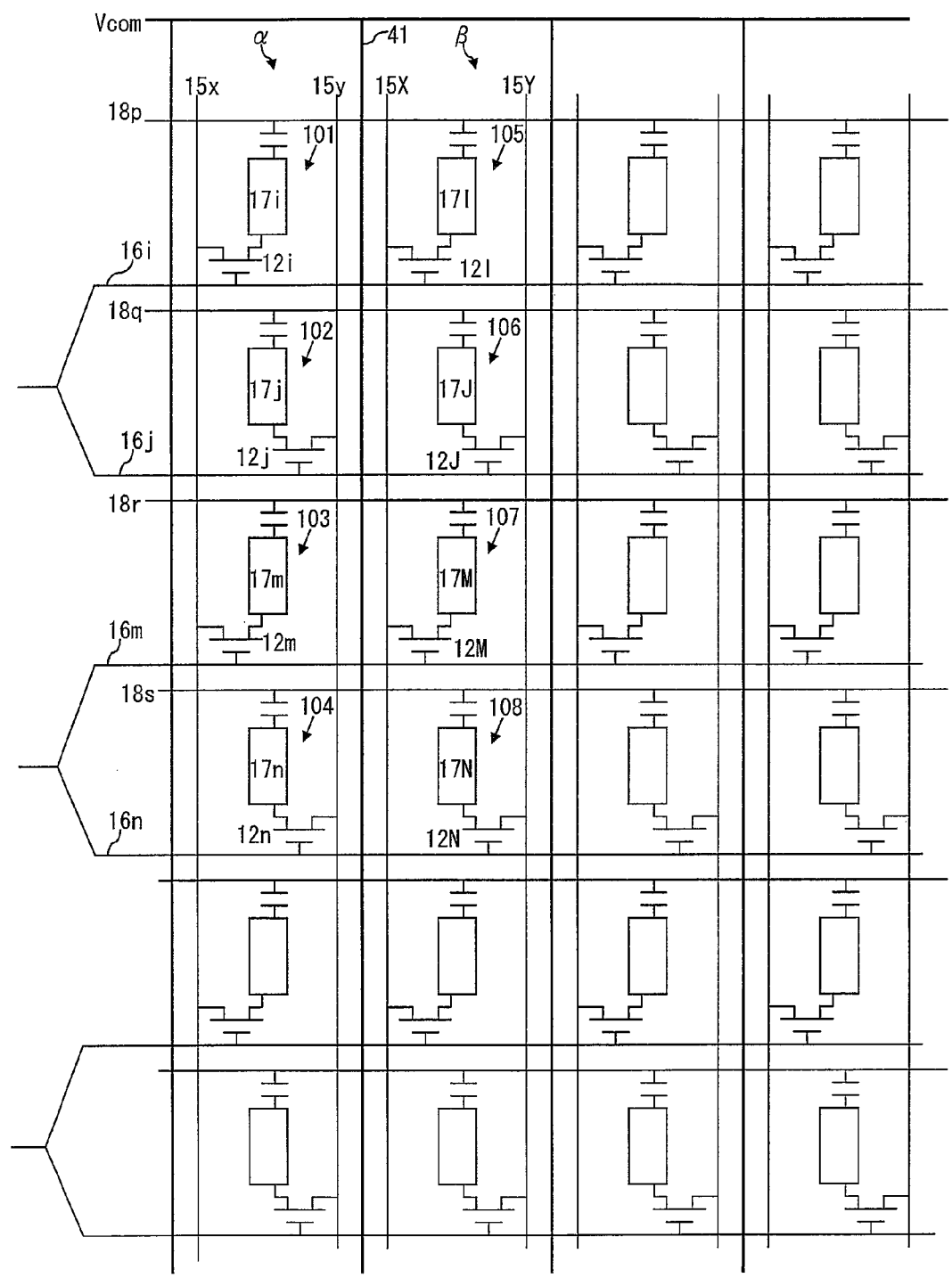
FIG. 3 is an equivalent circuit diagram illustrating an active matrix substrate for use in the liquid crystal panel of FIG. 1.

FIG. 3 is an equivalent circuit diagram partially illustrating an active matrix substrate of Embodiment 1. As illustrated in FIG. 3, the active matrix substrate includes: data signal lines 15$x$, 15$y$, 15X, and 15Y arranged in that order; scanning signal lines 16$i$, 16$j$, 16$m$, and 16$n$ arranged in that order and extending in a row direction (that is, a right-left direction in FIG. 3); a pixel region 101 corresponding to an intersection of the data signal lines 15$x$ and 15$y$ with the scanning signal line 16$i$; a pixel region 102 corresponding to an intersection of the data signal lines 15$x$ and 15$y$ with the scanning signal line 16$j$; a pixel region 103 corresponding to an intersection of the data signal lines 15$x$ and 15$y$ with the scanning signal line 16$m$; a pixel region 104 corresponding to an intersection of the data signal lines 15X and 15$y$ with the scanning signal line 16$n$; a pixel region 105 corresponding to an intersection of the data signal lines 15X and 15Y with the scanning signal line 16$i$; a pixel region 106 corresponding to an intersection of the data signal lines 15X and 15Y with the scanning signal line 16$j$; a pixel region 107 corresponding to an intersection of the data signal lines 15X and 15Y with the scanning signal line 16m; a pixel region 108 corresponding to an intersection of the data signal lines 15X and 15Y with the scanning signal line 16n; a retention capacitor line 18p corresponding to the pixel regions 101 and 105; a retention capacitor line 18q corresponding to the pixel regions 102 and 106; a retention capacitor line 18r corresponding to the pixel regions 103 and 107; and a retention capacitor line 18s corresponding to the pixel regions 104 and 108.

The data signal lines 15x and 15y are provided so as to correspond to a pixel region column α including the pixel regions 101 through 104, whereas the data signal lines 15X and 15Y are provided so as to correspond to a pixel region column β including the pixel regions 101 through 104. Further, there is a gap line 41 (that is, a line present between data signal lines; a shield line) provided between the data signal lines 15y and 15X to which gap line 41a Vcom signal is supplied.

Each pixel includes a single pixel electrode: A pixel electrode 17i in the pixel region 101 is connected to the data signal line 15x via a transistor 12i connected to the scanning signal line 16i. A pixel electrode 17j in the pixel region 102 is connected to the data signal line 15y via a transistor 12j connected to the scanning signal line 16j. A pixel electrode 17m in the pixel region 103 is connected to the data signal line 15x via a transistor 12m connected to the scanning signal line 16m. A pixel electrode 17n in the pixel region 104 is connected to the data signal line 15y via a transistor 12n connected to the scanning signal line 16n. A pixel electrode 17I in the pixel region 105 is connected to the data signal line 15X via a transistor 12I connected to the scanning signal line 16i. A pixel electrode 17J in the pixel region 106 is connected to the data signal line 15Y via a transistor 12J connected to the scanning signal line 16j. A pixel electrode 17M in the pixel region 107 is connected to the data signal line 15X via a transistor 12M connected to the scanning signal line 16m. A pixel electrode 17N in the pixel region 108 is connected to the data signal line 15Y via a transistor 12N connected to the scanning signal line 16n. In other words, (i) each even-numbered pixel region (102 and 104) in the pixel region column α has a pixel electrode connected to the data signal line 15y, (ii) each odd-numbered pixel region (105 and 107) in the pixel region column β has a pixel electrode connected to the data signal line 15X, and (iii) the data signal line 15y and the data signal line 15X are adjacent to each other with the gap line 41 therebetween.

The scanning signal line 16i, to which the pixel electrode 17i in the pixel region 101 and the pixel electrode 17I in the pixel region 105 are connected, and the scanning signal line 16j, to which the pixel electrode 17j in the pixel region 102 and the pixel electrode 17J in the pixel region 106 are connected, are connected to each other inside or outside a panel and simultaneously selected (described below in detail). Further, the scanning signal line 16m, to which the pixel electrode 17m in the pixel region 103 and the pixel electrode 17M in the pixel region 107 are connected, and the scanning signal line 16n, to which the pixel electrode 17n in the pixel region 104 and the pixel electrode 17N in the pixel region 108 are connected, are connected to each other inside or outside the panel and simultaneously selected (described below in detail). Needless to say, the present embodiment can alternatively be arranged such that the scanning signal lines 16i and 16j are not connected to each other inside or outside the panel and that the scanning signal lines 16m and 16n are not connected to each other inside or outside the panel.

The retention capacitor line 18p and the pixel electrode 17i form a retention capacitor i therebetween. The retention capacitor line 18q and the pixel electrode 17j form a retention capacitor j therebetween. The retention capacitor line 18p and the pixel electrode 17I form a retention capacitor I therebetween. The retention capacitor line 18q and the pixel electrode 17J form a retention capacitor J therebetween.

Figure 4:
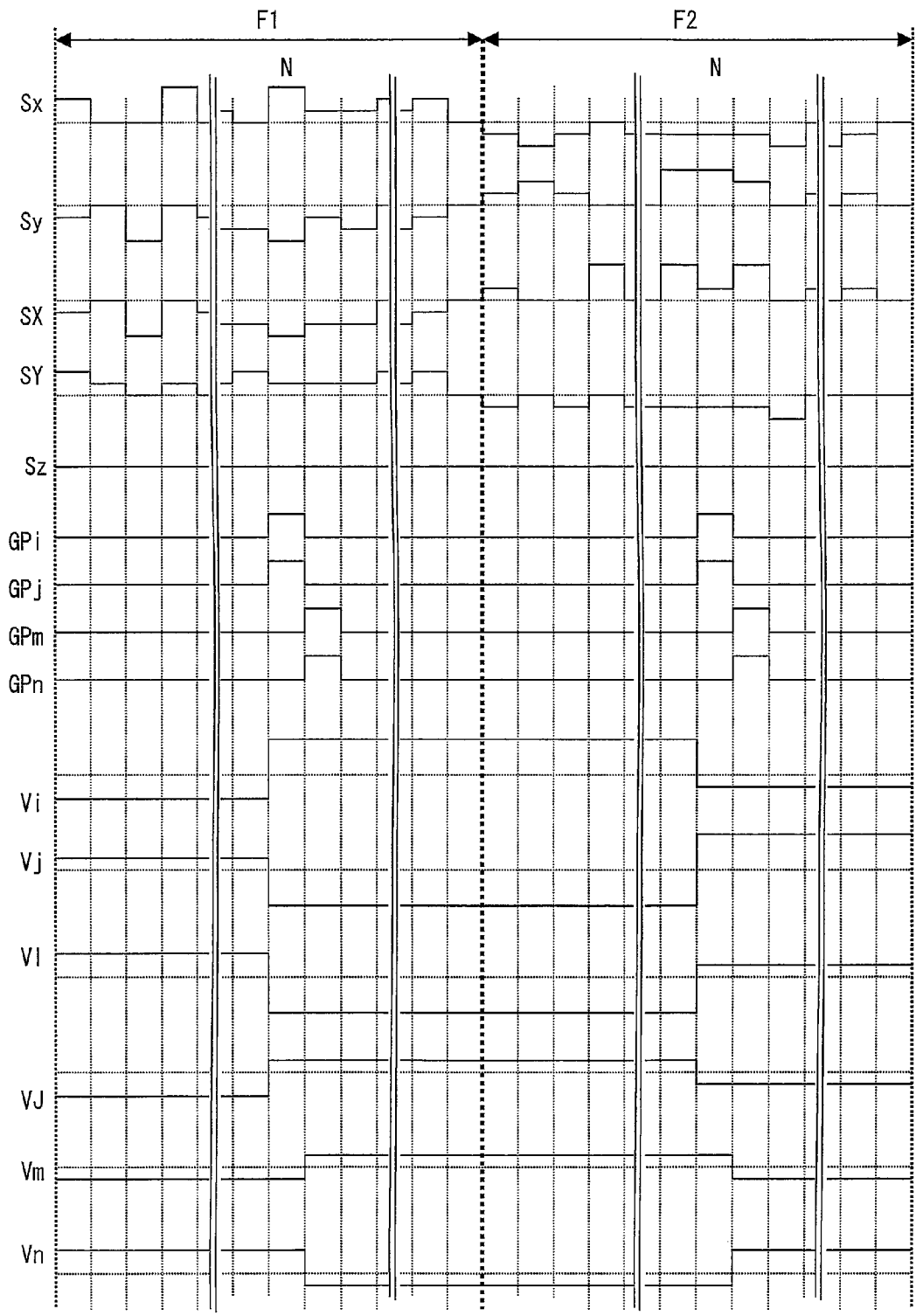
FIG. 4 is a timing chart illustrating a method for driving a liquid crystal panel including the active matrix substrate of FIG. 3.

FIG. 4 is a timing chart illustrating a method (in a normally black mode) for driving a liquid crystal panel of the present embodiment which liquid crystal panel includes the above active matrix substrate. In FIG. 4, Sx, Sy, SX, and SY represent data signals (data signals) supplied to the data signal lines 15x, 15y, 15X, and 15Y, respectively; Sz represents a signal supplied to the gap line; GPi, GPj, GPm, and GPn represent gate signals supplied to the scanning signal lines 16i, 16j, 16m, and 16n, respectively; and Vi, Vj, VI, VJ, Vm, and Vn represent potentials of the pixel electrodes 17i, 17j, 17I, 17J, 17m, and 17n, respectively.

As illustrated in FIG. 4, the driving method is carried out as follows: Two scanning signal lines are simultaneously selected at a time. Each data signal line is supplied with a data signal having a polarity which is inverted every frame period (1 V). Within an identical horizontal scanning period (H), (i) two data signal lines (15x and 15y; 15X and 15Y) corresponding to an identical pixel column are supplied with respective data signals which are opposite to each other in polarity, and (ii) two adjacent data signal lines (15y and 15X) separated from each other by a gap line are supplied with respective data signals which are identical to each other in polarity. The gap line is supplied with a constant potential signal (Vcom signal) having a potential identical to a potential of a common electrode.

Specifically, in F1 of consecutive frames F1 and F2, the data signal lines 15x and 15Y are each supplied with (i) a data signal with a positive polarity during an N-th horizontal scanning period (including a scanning period for the scanning signal lines 16i and 16j) and (ii) a data signal with a positive polarity also during an (N+1)-th horizontal scanning period (including a scanning period for the scanning signal lines 16m and 16n), whereas the data signal lines 15y and 15X are each supplied with (i) a data signal with a negative polarity during the N-th horizontal scanning period (including the scanning period for the scanning signal lines 16i and 16j) and (ii) a data signal with a negative polarity also during the (N+1)-th horizontal scanning period (including the scanning period for the scanning signal lines 16m and 16n).

FIG. 5 illustrates the liquid crystal panel driven as described above. Specifically, a pixel including the pixel electrode 17i has a positive polarity; a pixel including the pixel electrode 17j has a negative polarity; a pixel including the pixel electrode 17m has a positive polarity; a pixel including the pixel electrode 17n has a negative polarity; a pixel including the pixel electrode 17I has a negative polarity; and a pixel including the pixel electrode 17J has a positive polarity. This achieves dot inversion drive in F1.

In F2, the data signal lines 15x and 15Y are each supplied with (i) a data signal with a negative polarity during the N-th horizontal scanning period (including the scanning period for the scanning signal lines 16i and 16j) and (ii) a data signal with a negative polarity also during the (N+1)-th horizontal scanning period (including the scanning period for the scanning signal lines 16m and 16n), whereas the data signal lines 15y and 15X are each supplied with (i) a data signal with a positive polarity during the N-th horizontal scanning period (including the scanning period for the scanning signal lines 16i and 16j) and (ii) a data signal with a positive polarity also during the (N+1)-th horizontal scanning period (including the scanning period for the scanning signal lines 16m and 16n). With this driving, the pixel electrode 17i has a negative polarity; the pixel electrode 17j has a positive polarity; the pixel electrode 17m has a negative polarity; the pixel electrode 17n has a positive polarity; the pixel electrode 17I has a positive polarity; and the pixel electrode 17J has a negative polarity. This achieves dot inversion drive in F2 as well.

Figure 1:
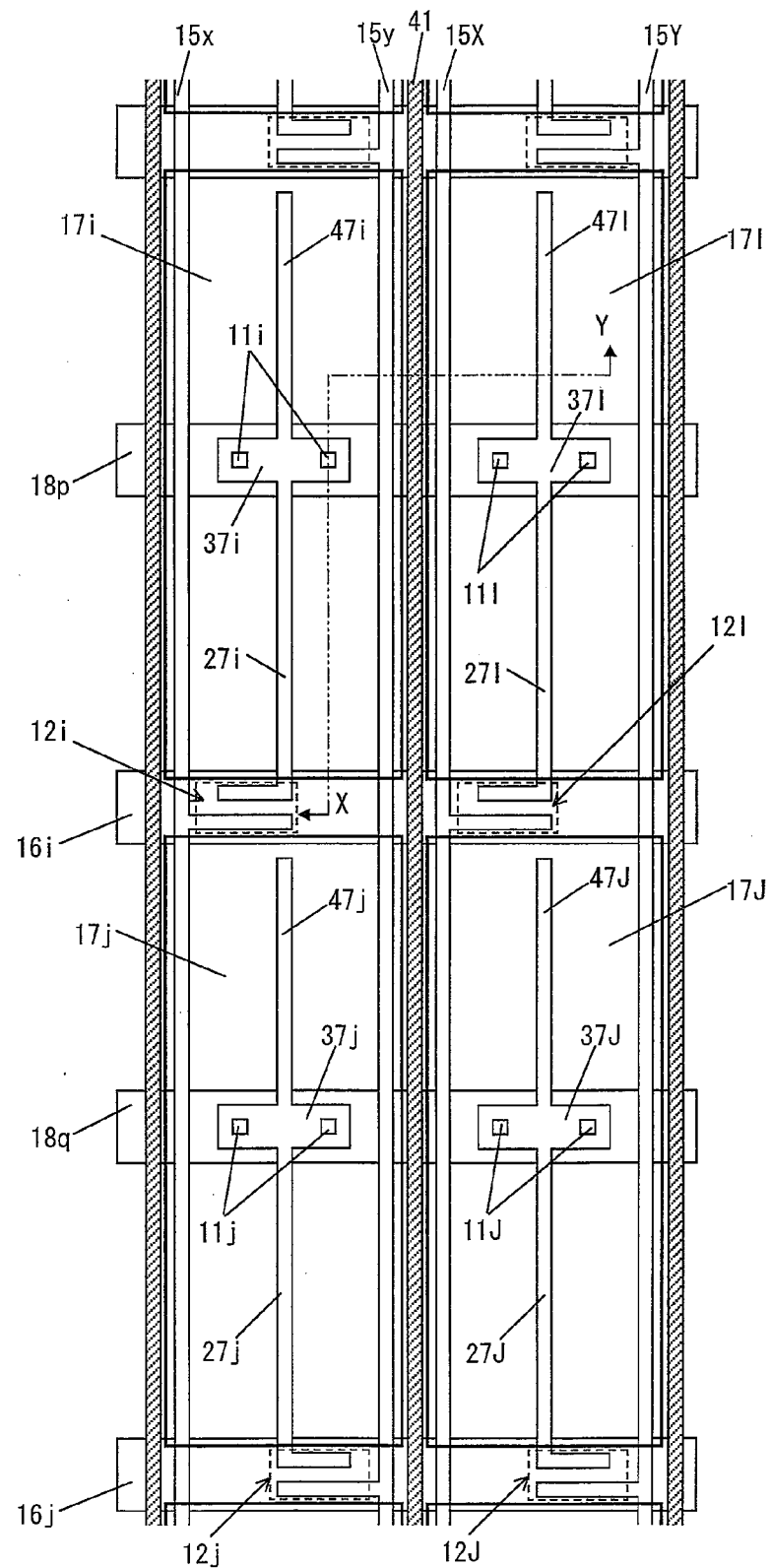
FIG. 1 is a plan view illustrating an example configuration of a liquid crystal panel of Embodiment 1.

FIG. 1 is a plan view partially illustrating a liquid crystal panel including the active matrix substrate of FIG. 3. For ease of view, FIG. 1 omits members provided for a color filter substrate (counter substrate), and thus illustrates only members provided for the active matrix substrate.

The liquid crystal panel of FIG. 1 includes: a first pair of (two) data signal lines 15x and 15y and a second pair of (two) data signal lines 15X and 15Y, the data signal lines 15y and 15X being adjacent to each other; a gap line 41 provided between the data signal lines 15y and 15X; scanning signal lines 16i and 16j extending orthogonally to the data signal lines; a transistor 12i provided in the vicinity of an intersection of the data signal line 15x with the scanning signal line 16i; a transistor 12j provided in the vicinity of an intersection of the data signal line 15y with the scanning signal line 16j; a transistor 12I provided in the vicinity of an intersection of the data signal line 15X with the scanning signal line 16i; and a transistor 12J provided in the vicinity of an intersection of the data signal line 15Y with the scanning signal line 16j.

The liquid crystal panel further includes: a pixel electrode 17i provided so as to (i) overlap the data signal lines 15x and 15y and (ii) have a first edge present downstream in a scanning direction which first edge overlaps a second edge of the scanning signal line 16i which second edge is present upstream in the scanning direction; a pixel electrode 17j provided so as to (i) also overlap the data signal lines 15x and 15y and (ii) have a first edge present downstream in the scanning direction which first edge overlaps a second edge of the scanning signal line 16j which second edge is present upstream in the scanning direction; a pixel electrode 17I provided so as to (i) overlap the data signal lines 15X and 15Y and (ii) have a first edge present downstream in the scanning direction which first edge overlaps the second edge of the scanning signal line 16i which second edge is present upstream in the scanning direction; and a pixel electrode 17J provided so as to (i) also overlap the data signal lines 15X and 15Y and (ii) have a first edge present downstream in the scanning direction which first edge overlaps the second edge of the scanning signal line 16j which second edge is present upstream in the scanning direction.

The liquid crystal panel further includes: a retention capacitor line 18p provided so as to overlap a central portion of the pixel electrode 17i and a central portion of the pixel electrode 17I; and a retention capacitor line 18q provided so as to overlap a central portion of the pixel electrode 17j and a central portion of the pixel electrode 17J.

In a plan view, the pixel electrode 17i has two edges along a column direction a first one of which stretches beyond the data signal line 15x and a second one of which stretches beyond the data signal line 15y. Similarly, the pixel electrode 17j has two edges along the column direction a first one of which stretches beyond the data signal line 15x and a second one of which stretches beyond the data signal line 15y. The pixel electrode 17I has two edges along the column direction a first one of which stretches beyond the data signal line 15X and a second one of which stretches beyond the data signal line 15Y. Similarly, the pixel electrode 17J has two edges along the column direction a first one of which stretches beyond the data signal line 15X and a second one of which stretches beyond the data signal line 15Y. The gap line 41 extends through (i) a gap between the pixel electrodes 17i and 17I and below them and (ii) a gap between the pixel electrodes 17j and 17J and below them.

The scanning signal line 16i functions as a gate electrode of the transistor 12i. The transistor 12i has (i) a source electrode connected to the data signal line 15x and (ii) a drain electrode connected to a capacitor electrode 37i via a drain extracting electrode 27i. The capacitor electrode 37i is positioned above the retention capacitor line 18p and connected to the pixel electrode 17i via two contact holes 11i. The capacitor electrode 37i is provided with an extending line 47i extending therefrom so as to overlap the pixel electrode 17i. The scanning signal line 16j functions as a gate electrode of the transistor 12j. The transistor 12j has (i) a source electrode connected to the data signal line 15y and (ii) a drain electrode connected to a capacitor electrode 37j via a drain extracting electrode 27j. The capacitor electrode 37j is positioned above the retention capacitor line 18q and connected to the pixel electrode 17j via two contact holes 11j. The capacitor electrode 37j is provided with an extending line 47j extending therefrom so as to overlap the pixel electrode 17j.

Similarly, the scanning signal line 16i functions as a gate electrode of the transistor 12I. The transistor 12I has (i) a source electrode connected to the data signal line 15X and (ii) a drain electrode connected to a capacitor electrode 37I via a drain extracting electrode 27I. The capacitor electrode 37I is positioned above the retention capacitor line 18p and connected to the pixel electrode 17I via two contact holes 11I. The capacitor electrode 37I is provided with an extending line 47I extending therefrom so as to overlap the pixel electrode 17I. The scanning signal line 16j functions as a gate electrode of the transistor 12J. The transistor 12J has (i) a source electrode connected to the data signal line 15Y and (ii) a drain electrode connected to a capacitor electrode 37J via a drain extracting electrode 27J. The capacitor electrode 37J is positioned above the retention capacitor line 18q and connected to the pixel electrode 17J via two contact holes 11J. The capacitor electrode 37J is provided with an extending line 47J extending therefrom so as to overlap the pixel electrode 17j.

The liquid crystal panel of the present embodiment is configured such that the retention capacitor line 18p and the capacitor electrode 37i overlap each other via a gate insulating film at a first portion, and thus form the above retention capacitor i at the first portion; the retention capacitor line 18q and the capacitor electrode 37j overlap each other via the gate insulating film at a second portion, and thus form the above retention capacitor j at the second portion; the retention capacitor line 18p and the capacitor electrode 37I overlap each other via the gate insulating film at a third portion, and thus form the above retention capacitor I at the third portion; and the retention capacitor line 18q and the capacitor electrode 37J overlap each other via the gate insulating film at a fourth portion, and thus form the above retention capacitor J at the fourth portion.

FIG. 2 is a cross-sectional view taken along line X-Y of FIG. 1. As illustrated in FIG. 2, the liquid crystal panel of the present embodiment includes: an active matrix substrate 3; a color filter substrate 30 provided so as to face the active matrix substrate 3; and a liquid crystal layer 40 provided between the two substrates (3 and 30). In the active matrix substrate 3, the scanning signal line 16i and the retention capacitor line 18p are formed on a glass substrate 31 and covered by a gate insulating film 43. Formed in a layer above the gate insulating film 43 are the capacitor electrode 37i, the data signal line 15y, the gap line 41, the data signal line 15X, and the extending line 47I. Further formed above the gate insulating film 43 are (although not shown in the cross-sectional view): semiconductor layers (namely, an i layer and an n+ layer) of each transistor; and a source electrode and a drain electrode of each transistor both in contact with the n+ layer. Metal layers including the data signal lines and the gap line 41 are covered by an inorganic interlayer insulating film 25, on which an organic interlayer insulating film 26 is formed that is thicker than the inorganic interlayer insulating film 25. Formed on the organic interlayer insulating film 26 are the pixel electrodes 17i and 17I, which are each covered by an alignment film 9. The inorganic interlayer insulating film 25 and the organic interlayer insulating film 26 are each hollowed at a portion at which a contact hole 11ai is formed. With this arrangement, the pixel electrode 17i is in contact with the capacitor electrode 37i. The retention capacitor line 18p and the capacitor electrode 37i overlap each other via the gate insulating film 43 as described above at a portion, at which the above retention capacitor i is formed.

The color filter substrate 30 includes a black matrix 13 and a colored layer (color filter layer) 14 on a glass substrate 32. The color filter substrate 30 further includes, in a layer above the black matrix 13 and the colored layer 14, a common electrode (com) 28, which is covered by an alignment film 19.

The following description deals with a method for producing the liquid crystal panel of the present embodiment. The method for producing the liquid crystal panel includes: an active matrix substrate production step; a color filter substrate production step; and an assembly step for combining the two substrates with each other and filling a space between the two substrates with liquid crystal.

First, a film is formed by sputtering on a substrate made of a material such as glass and plastic. The film has a thickness ranging from 1000 Å to 3000 Å, and is one of (i) a metal film made of a metal such as titanium, chrome, aluminum, molybdenum, tantalum, tungsten, and copper, (ii) an alloy film of any combination of the above metals, and (iii) a laminate film of any combination of the above metals. Then, patterning is carried out with respect to the film by photolithography (that is, a photo engraving process; hereinafter referred to as "PEP technique" and including an etching step) so that scanning signal lines (that is, a gate electrode of each transistor) and retention capacitor lines are formed.

Next, an inorganic insulating film is formed by CVD (chemical vapor deposition) entirely over the substrate on which the scanning signal lines have been formed. The inorganic insulating film has a thickness ranging approximately from 3000 Å to 5000 Å, and is made of a material such as silicon nitride and silicon oxide. Then, photoresist is removed so that a gate insulating film is formed.

Then, (i) an intrinsic amorphous silicon film (having a thickness ranging from 1000 Å to 3000 Å) and (ii) an n+ amorphous silicon film (having a thickness ranging from 400 Å to 700 Å) doped with phosphorous are sequentially formed on the gate insulating film (entirely over the substrate) by CVD. Then patterning is carried out by the PEP technique with respect to the intrinsic amorphous silicon film and the n+ amorphous silicon film, and photoresist is removed so that a silicon laminate is formed in an island shape on each gate electrode which silicon laminate includes an intrinsic amorphous silicon layer and an n+ amorphous silicon layer.

Next, a film is formed by sputtering entirely over the substrate on which the silicon laminates have been formed. The film has a thickness ranging from 1000 Å to 3000 Å, and is one of (i) a metal film made of a metal such as titanium, chrome, aluminum, molybdenum, tantalum, tungsten, and copper, (ii) an alloy film of any combination of the above metals, and (iii) a laminate film of any combination of the above metals. Then, patterning is carried out with respect to the film by the PEP technique so that data signal lines, a source electrode and a drain electrode of each transistor, drain extracting electrodes, capacitor electrodes, and extending lines are formed. As a result, metal layers are formed. Then resist is removed as necessary.

Then, the n+ amorphous silicon layer in each silicon laminate is removed by etching by using, as a mask, (i) the photoresist made when the metal lines are formed or (ii) the source and drain electrodes, and the photoresist is removed so that channels for the transistors are formed. The semiconductor layers can each alternatively be made of a polysilicon film other than an amorphous silicon film as described above. The amorphous silicon film and the polysilicon film can each be subjected to laser annealing for improving crystallinity. With this arrangement, electrons in the semiconductor layers can move more rapidly, and a property of the transistors (TFTs) can thus be improved.

Next, interlayer insulating films are formed entirely over the substrate on which the data signal lines and the like have been formed. Specifically, an inorganic interlayer insulating film (passivation film) is formed by CVD with use of a gas mixture including $SiH_4$ gas, $NH_3$ gas, and $N_2$ gas. The inorganic interlayer insulating film is made of SiNx, has a thickness of approximately 3000 Å, and entirely covers the substrate. Then, an organic interlayer insulating film is formed by spin coating or die coating which organic interlayer insulating film is made of a positive photosensitive acrylic resin and has a thickness of approximately 3 μm.

Then, patterning is carried out with respect to the organic interlayer insulating film by the PEP technique so that contact holes are formed, and the organic interlayer insulating film is then sintered. Then, (i) the inorganic interlayer insulating film or (ii) the inorganic interlayer insulating film and the gate insulating film are partially removed by etching with use of the pattern of the organic interlayer insulating film so that contact holes are formed.

Next, a transparent conductive film is formed by sputtering on the interlayer insulating films (entirely over the substrate) in which the contact holes are formed. The transparent conductive film is made of a material such as ITO (indium tin oxide), IZO (indium zinc oxide), zinc oxide, and tin oxide, and has a thickness ranging from 1000 Å to 2000 Å. Then, patterning is carried out by the PEP technique with respect to the transparent conductive film, and resist is removed so that pixel electrodes are formed.

Finally, a polyimide resin is printed on the pixel electrodes entirely over the substrate so as to have a thickness ranging from 500 Å to 1000 Å. Then, the polyimide resin is sintered, and rubbing is carried out with respect to the polyimide resin in one direction with use of a rotating cloth so that an alignment film is formed. The active matrix substrate is thus produced.

The following describes the color filter substrate production step.

First, either a chrome thin film or a resin containing a black pigment is formed on a substrate (entirely over the substrate) made of a material such as glass and plastic, and patterning is then carried out with respect to the film or the resin by the PEP technique so that a black matrix is formed. Then, a color filter layer (having a thickness of approximately 2 μm) of red, green, and blue is formed in a pattern in gaps of the black matrix by a method such as pigment diffusing method.

Next, a transparent conductive film is formed on the color filter layer entirely over the substrate. The transparent conductive film is made of a material such as ITO, IZO, zinc oxide, and tin oxide, and has a thickness of approximately 1000 Å. This forms a common electrode (com).

Finally, a polyimide resin is printed on the common electrode entirely over the substrate so as to have a thickness ranging from 500 Å to 1000 Å. Then, the polyimide resin is sintered, and rubbing is carried out with respect to the polyimide resin in one direction with use of a rotating cloth so that an alignment film is formed. The color filter substrate is thus produced.

The following describes the assembly step.

First, a sealing material made of a thermosetting epoxy resin or the like is applied to one of the active matrix substrate and the color filter substrate by screen printing so that the sealing material has a frame-shaped pattern with a cut serving as an inlet for liquid crystal. Further, dispersed on the other of the active matrix substrate and the color filter substrate are spherical spacers made of plastic or silica and each having a diameter equivalent to a thickness of a liquid crystal layer to be formed. Instead of dispersing spacers, spacers can be formed by the PEP technique (i) on the BM of the CF substrate or (ii) on the metal lines of the active matrix substrate.

Next, the active matrix substrate is combined with the color filter substrate, and the sealing material is cured.

Finally, a liquid crystal material is injected by evacuation method into a space defined by the active matrix substrate, the color filter substrate, and the sealing material. Then, a UV curing resin is applied to the inlet for liquid crystal, and the UV curing resin is subjected to UV radiation so that the liquid crystal material is contained and that a liquid crystal layer is thus formed. The liquid crystal panel is thus produced.

The liquid crystal panel includes, between the data signal lines 15y and 15X, the gap line 41 to which the Vcom signal is supplied. As such, it is possible, for example, to reduce a cross talk which occurs between the pixel electrode 17i and the data signal line 15X and which arises from a parasitic capacitance between the pixel electrode 17i and the data signal line 15X. FIG. 6 illustrates equipotential lines (among which LVM is a line corresponding to −0.5 V, and LVP is a line corresponding to +0.5 V) for the liquid crystal panel which is being driven. FIG. 56 illustrates equipotential lines (among which LVM is a line corresponding to −0.5 V, and LVP is a line corresponding to +0.5 V) for a liquid crystal panel including no gap line 41. FIG. 56 illustrates equipotential lines which extend from above the pixel electrode of a first pixel to above a data signal line corresponding to a second pixel adjacent to the first pixel. In contrast, FIG. 6 illustrates no equipotential lines which extend from above the pixel electrode (17i) of a first pixel to above a data signal line (15X) corresponding to a second pixel adjacent to the first pixel. This clearly indicates the above effect of reducing a cross talk. In the present embodiment, a value of the above parasitic capacitance is reduced by approximately 40%, for example.

In a case where data signal lines are driven as illustrated in FIG. 4 in a liquid crystal panel in which each pixel column corresponds to two data signal lines, the pixel electrode of a pixel is subject to respective cross talks between (i) two data signal lines corresponding to the pixel and (ii) itself, the respective cross talks acting in such a direction as to cancel out each other (This is because two data signal lines corresponding to a pixel column are supplied with respective data signals which are opposite to each other in polarity). In a case where there occurs a cross talk between the pixel electrode of a first pixel and a data signal line corresponding to a second pixel adjacent to the first pixel (in the row direction), such a cross talk may disturb the canceling out and make a longitudinal shadow visible as a result.

In a case where, in particular, a pixel column carries out a display of an identical color, two data signal lines corresponding to a first pixel in the pixel column are normally supplied with respective data signals which are opposite to each other in polarity and which are similar to each other in magnitude (that is, in absolute value of voltage). This makes it possible to cause respective cross talks to almost entirely cancel out each other which respective cross talks occur between (i) the pixel electrode of the first pixel and (ii) two data signal lines corresponding to the first pixel. Meanwhile, two pixels adjacent to the first pixel in the row direction each display a color different from a color displayed by the first pixel (For example, the first pixel displays a first color, whereas the two pixels adjacent to the first pixel in the row direction display a second color and a third color, respectively). Thus, while four data signal lines corresponding to the above two adjacent pixels include two data signal lines (adjacent data signal lines for other colors) adjacent to the first pixel, such two data signal lines are each normally supplied with a data signal which is opposite in polarity but not similar in magnitude (that is, in absolute value of voltage) to a data signal supplied to an adjacent one of the two data signal lines corresponding to the first pixel. This makes it difficult to cause respective cross talks to cancel out each other which respective cross talks occur between (i) the pixel electrode of the first pixel (the first color) and (ii) two adjacent data signal lines for other colors (namely, a data signal line for the second color and a data signal line for the third color). As a result, a longitudinal shadow becomes visible.

In view of this, the liquid crystal panel of the present embodiment includes the gap line so as to (i) reduce respective cross talks between the pixel electrode of a first pixel and data signal lines (for example, adjacent data signal lines for other colors) corresponding to pixels adjacent to the first pixel, and thus (ii) prevent appearance of a longitudinal shadow. This effect is particularly significant in a configuration (ultra high aperture ratio configuration), such as the configuration of the liquid crystal panel of the present embodiment, in which each pixel electrode overlaps its corresponding two data signal lines and which thus causes a large cross talk.

The liquid crystal panel of the present embodiment, which includes the gap line 41, reduces a cross talk between two adjacent data signal lines (for example, 15y and 15X) sandwiching the gap line which cross talk arises from a parasitic capacitance between the two adjacent data signal lines. In the present embodiment, a value of such a parasitic capacitance is reduced approximately by half, for example.

The liquid crystal panel of the present embodiment has, above the gap line, a region having a potential equal to a potential of the common electrode which region serves as a dark line DL (see FIG. 6) in the normally black mode. With this arrangement, it is possible to reduce a width of a portion of the black matrix (see the black matrix 13 in FIG. 2) which portion is provided between pixels adjacent to each other in the row direction.

The liquid crystal panel of the present embodiment simultaneously selects two scanning signal lines at a time, and can thus reduce by half a write period for a frame while maintaining a write period for each pixel. The liquid crystal panel is therefore suitable for a high-speed drive such as a double-rate drive (120-Hz drive).

The liquid crystal panel of the present embodiment carries out dot inversion drive while each data signal line is supplied with a data signal of an identical polarity during a vertical scanning period. The liquid crystal panel is therefore suitable not only for reducing power consumption, but also for a large screen and a high-speed drive.

[Embodiment 2]

Figure 7:
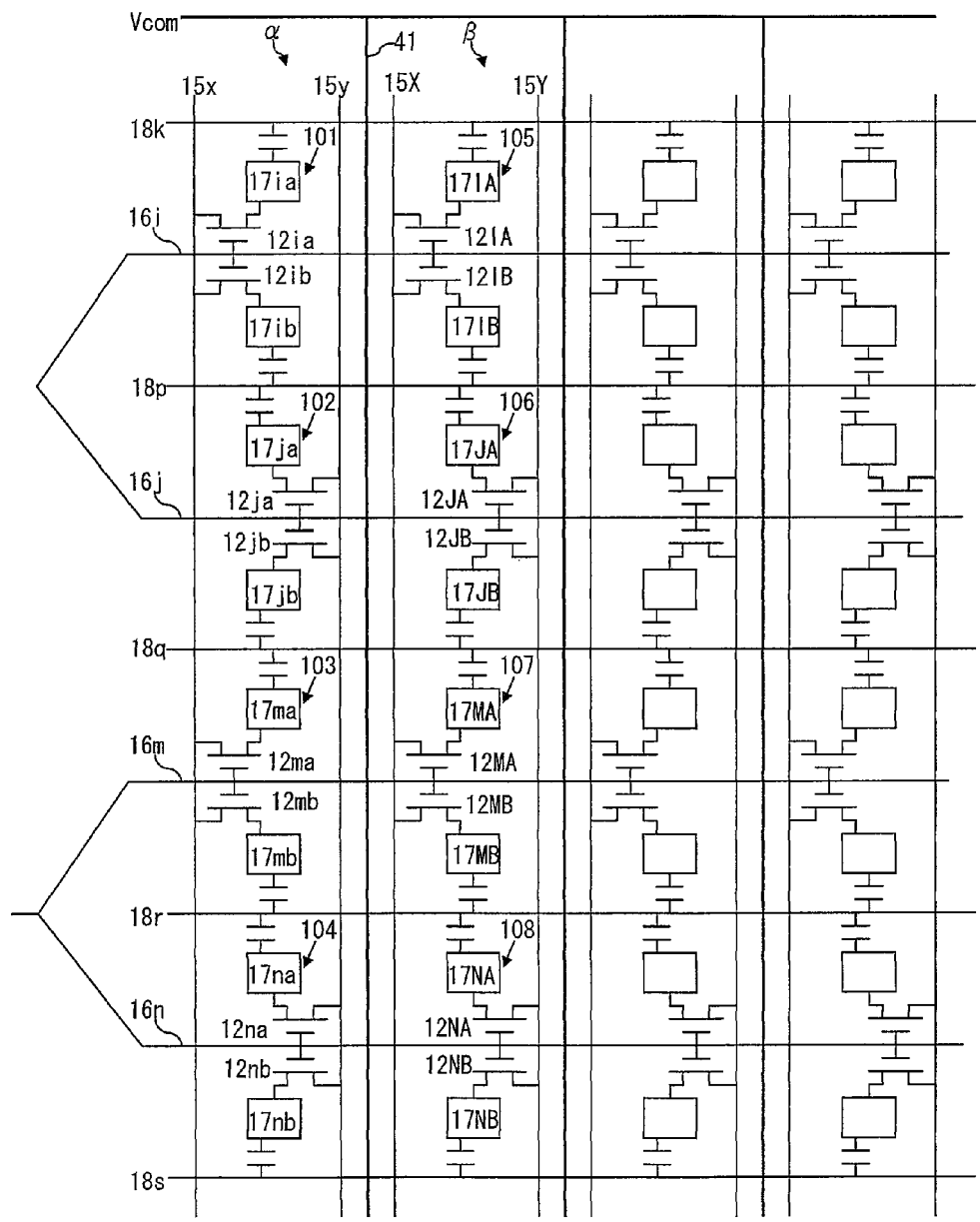
FIG. 7 is an equivalent circuit diagram illustrating an active matrix substrate of Embodiment 2.

FIG. 7 is an equivalent circuit diagram partially illustrating an active matrix substrate of Embodiment 2. As illustrated in FIG. 7, the active matrix substrate includes: data signal lines 15*x*, 15*y*, 15X, and 15Y arranged in that order; scanning signal lines 16*i*, 16*j*, 16*m*, and 16*n* arranged in that order and extending in a row direction (that is, a right-left direction in FIG. 7); a pixel region 101 corresponding to an intersection of the data signal lines 15*x* and 15*y* with the scanning signal line 16*i*; a pixel region 102 corresponding to an intersection of the data signal lines 15*x* and 15*y* with the scanning signal line 16*j*; a pixel region 103 corresponding to an intersection of the data signal lines 15*x* and 15*y* with the scanning signal line 16*m*; a pixel region 104 corresponding to an intersection of the data signal lines 15X and 15Y with the scanning signal line 16*n*; a pixel region 105 corresponding to an intersection of the data signal lines 15X and 15Y with the scanning signal line 16*i*; a pixel region 106 corresponding to an intersection of the data signal lines 15X and 15Y with the scanning signal line 16*j*; a pixel region 107 corresponding to an intersection of the data signal lines 15X and 15Y with the scanning signal line 16*m*; a pixel region 108 corresponding to an intersection of the data signal lines 15X and 15Y with the scanning signal line 16*n*; a retention capacitor line 18*k* corresponding to the pixel regions 101 and 105; a retention capacitor line 18*p* corresponding to the pixel regions 101, 105, 102, and 106; a retention capacitor line 18*q* corresponding to the pixel regions 102, 106, 103, and 107; a retention capacitor line 18*r* corresponding to the pixel regions 103, 107, 104, and 108; and a retention capacitor line 18*s* corresponding to the pixel regions 104 and 108.

The data signal lines 15*x* and 15*y* are provided so as to correspond to a pixel region column α including the pixel regions 101 through 104, whereas the data signal lines 15X and 15Y are provided so as to correspond to a pixel region column β including the pixel regions 101 through 104. Further, there is a gap line 41 provided between the data signal lines 15*y* and 15X to which gap line 41 a Vcom signal is supplied.

Each pixel includes two pixel electrodes: A pixel electrode 17*ia* in the pixel region 101 is connected to the data signal line 15*x* via a transistor 12*ia* connected to the scanning signal line 16*i*. A pixel electrode 17*ib* in the pixel region 101 is connected to the data signal line 15*x* via a transistor 12*ib* connected to the scanning signal line 16*i*. A pixel electrode 17*ja* in the pixel region 102 is connected to the data signal line 15*y* via a transistor 12*ja* connected to the scanning signal line 16*j*. A pixel electrode 17*jb* in the pixel region 102 is connected to the data signal line 15*y* via a transistor 12*jb* connected to the scanning signal line 16*j*. A pixel electrode 17*ma* in the pixel region 103 is connected to the data signal line 15*x* via a transistor 12*ma* connected to the scanning signal line 16*m*. A pixel electrode 17*mb* in the pixel region 103 is connected to the data signal line 15*x* via a transistor 12*mb* connected to the scanning signal line 16*m*. A pixel electrode 17*na* in the pixel region 104 is connected to the data signal line 15*y* via a transistor 12*na* connected to the scanning signal line 16*n*. A pixel electrode 17*nb* in the pixel region 104 is connected to the data signal line 15*y* via a transistor 12*nb* connected to the scanning signal line 16*n*. A pixel electrode 17IA in the pixel region 105 is connected to the data signal line 15X via a transistor 12IA connected to the scanning signal line 16*i*. A pixel electrode 17IB in the pixel region 105 is connected to the data signal line 15X via a transistor 12IB connected to the scanning signal line 16*i*. A pixel electrode 17JA in the pixel region 106 is connected to the data signal line 15Y via a transistor 12JA connected to the scanning signal line 16*j*. A pixel electrode 17JB in the pixel region 106 is connected to the data signal line 15Y via a transistor 12JB connected to the scanning signal line 16*j*. In other words, (i) each even-numbered pixel region (102 and 104) in the pixel region column α has pixel electrodes connected to the data signal line 15*y*, (ii) each odd-numbered pixel region (105 and 107) in the pixel region column β has pixel electrodes connected to the data signal line 15X, and (iii) the data signal line 15*y* and the data signal line 15X are adjacent to each other with the gap line 41 therebetween.

The scanning signal lines 16*i* and 16*i* are connected to each other inside or outside a panel and simultaneously selected (described below in detail). The scanning signal lines 16*m* and 16*n* are connected to each other inside or outside the panel and simultaneously selected (described below in detail).

The pixel electrode 17*ia* and the retention capacitor line 18*k* form a retention capacitor is therebetween. The pixel electrode 17*ib* and the retention capacitor line 18*p* form a retention capacitor ib therebetween. The pixel electrode 17*ja* and the retention capacitor line 18*p* form a retention capacitor ja therebetween. The pixel electrode 17*jb* and the retention capacitor line 18*q* form a retention capacitor jb therebetween. The pixel electrode 17*ma* and the retention capacitor line 18*q* form a retention capacitor ma therebetween. The pixel electrode 17*mb* and the retention capacitor line 18*r* form a retention capacitor mb therebetween. The pixel electrode 17*na* and the retention capacitor line 18*r* form a retention capacitor na therebetween. The pixel electrode 17*nb* and the retention capacitor line 18*s* form a retention capacitor nb therebetween. The pixel electrode 17IA and the retention capacitor line 18*k* form a retention capacitor IA therebetween. The pixel electrode 17IB and the retention capacitor line 18*p* form a retention capacitor IB therebetween. The pixel electrode 17JA and the retention capacitor line 18*p* form a retention capacitor JA therebetween. The pixel electrode 17JB and the retention capacitor line 18*q* form a retention capacitor JB therebetween.

Figure 8:
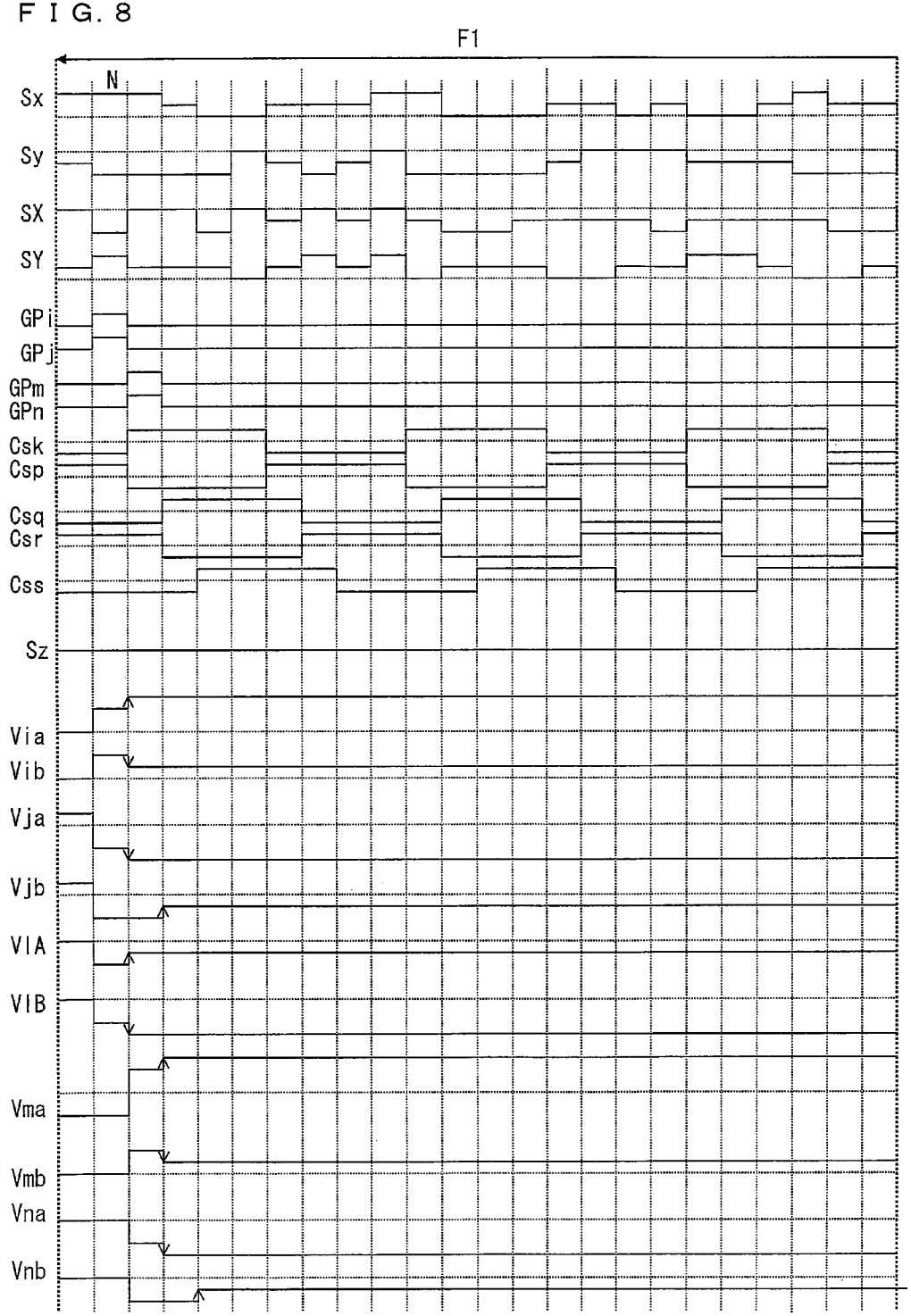
FIG. 8 is a timing chart illustrating a method for driving a liquid crystal panel including the active matrix substrate of FIG. 7.
Figure 10:
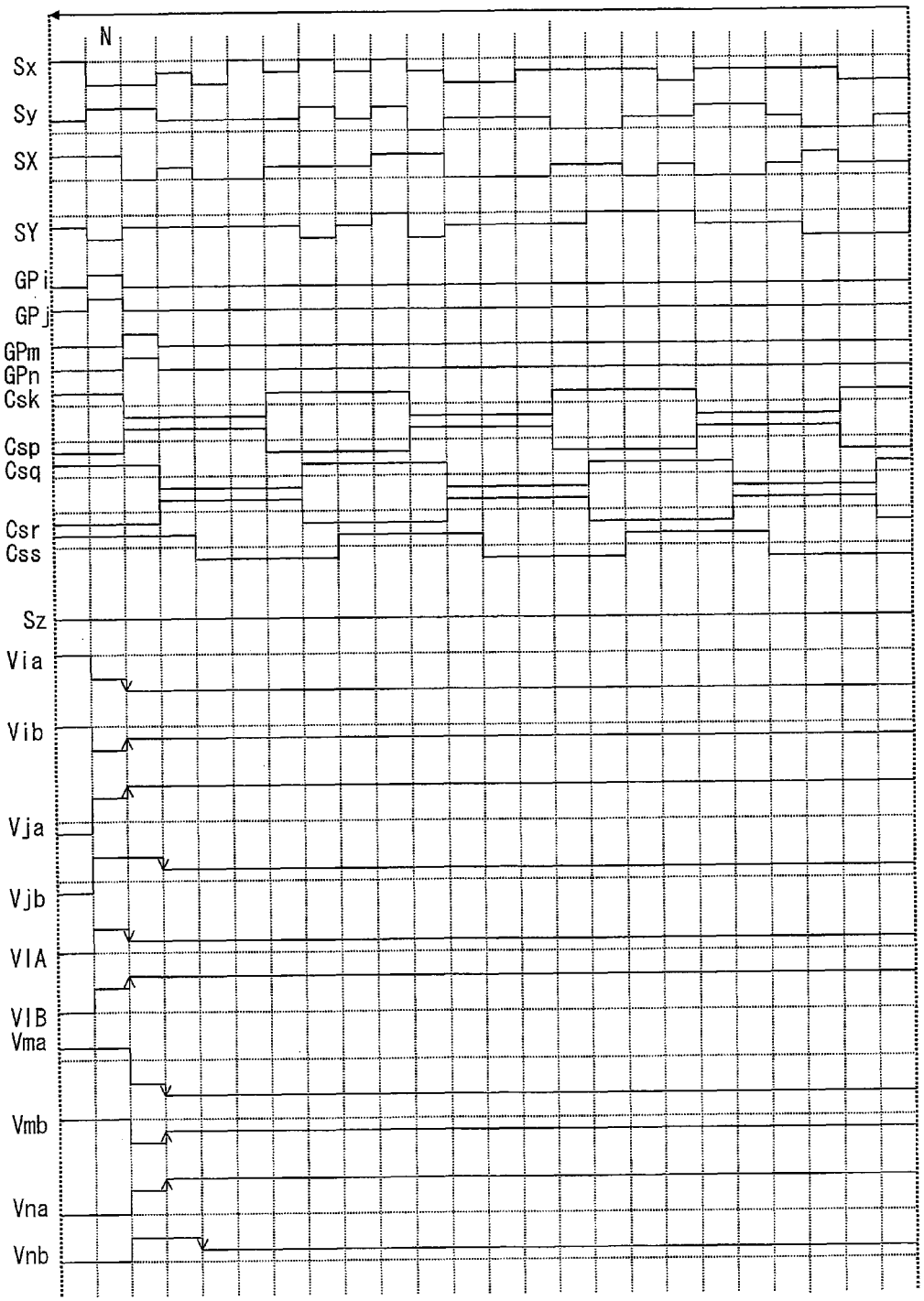
FIG. 10 is a timing chart illustrating a method for driving a liquid crystal panel including the active matrix substrate of FIG. 7.

FIGS. 8 and 10 are each a timing chart illustrating a method (in a normally black mode) for driving a liquid crystal panel of the present embodiment which liquid crystal panel includes the above active matrix substrate. In FIGS. 8 and 10, Sx, Sy, SX, and SY represent data signals (data signals) supplied to the data signal lines 15*x*, 15*y*, 15X, and 15Y, respectively; Sz represents a signal supplied to the gap line; GPi, GPj, GPm, and GPn represent gate signals supplied to the scanning signal lines 16*i*, 16*j*, 16*m*, and 16*n*, respectively; Csk, Csp, Csq, Csr, and Css represent retention capacitor line signals (CS signals) supplied to the retention capacitor lines 18*k*, 18*p*, 18*q*, 18*r*, and 18*s*, respectively; and Via, Vib, Vja, Vjb, VIA, VIB, Vma, Vmb, Vna, and Vnb represent potentials of the pixel electrodes 17*ia*, 17*ib*, 17*ja*, 17*jb*, 17IA, 17IB, 17*ma*, 17*mb*, 17*na*, and 17*nb*, respectively. Although each pixel electrode has a potential which is periodically changed after it is supplied with a data signal, FIGS. 8 and 10 each show an effective value (constant value) for each potential.

As illustrated in FIG. 8, the driving method is carried out as follows: Two scanning signal lines are simultaneously selected at a time. Each data signal line is supplied with a data signal having a polarity which is inverted every frame period (1 V). Within an identical horizontal scanning period, (i) two data signal lines (15*x* and 15*y*; 15X and 15Y) corresponding to an identical pixel column are supplied with respective data signals which are opposite to each other in polarity, and (ii) two adjacent data signal lines (15*y* and 15X) sandwiching a gap line are supplied with respective data signals which are identical to each other in polarity. The gap line is supplied with a constant potential signal (Vcom signal) having a potential identical to a potential of a common electrode. Each retention capacitor line is supplied with a retention capacitor line signal having a polarity which is inverted every plurality of horizontal scanning periods.

Specifically, in F1 of consecutive frames F1 and F2, the data signal lines 15x and 15Y are each supplied with (i) a data signal with a positive polarity during an N-th horizontal scanning period (including a scanning period for the scanning signal lines 16i and 16j) and (ii) a data signal with a positive polarity also during an (N+1)-th horizontal scanning period (including a scanning period for the scanning signal lines 16m and 16n), whereas the data signal lines 15y and 15X are each supplied with (i) a data signal with a negative polarity during the N-th horizontal scanning period (including the scanning period for the scanning signal lines 16i and 16j) and (ii) a data signal with a negative polarity also during the (N+1)-th horizontal scanning period (including the scanning period for the scanning signal lines 16m and 16n). Further, the retention capacitor line 18k is supplied with a retention capacitor line signal having a polarity which is inverted every 4H and which is inverted from a negative polarity to a positive polarity at an end of the N-th horizontal scanning period. The retention capacitor line 18p is supplied with a retention capacitor line signal having a polarity which is inverted every 4H and which is inverted from a positive polarity to a negative polarity at the end of the N-th horizontal scanning period. The retention capacitor line 18q is supplied with a retention capacitor line signal having a polarity which is inverted every 4H and which is inverted from a negative polarity to a positive polarity at an end of the (N+1)-th horizontal scanning period. The retention capacitor line 18r is supplied with a retention capacitor line signal having a polarity which is inverted every 4H and which is inverted from a positive polarity to a negative polarity at the end of the (N+1)-th horizontal scanning period. The retention capacitor line 18s is supplied with a retention capacitor line signal having a polarity which is inverted every 4H and which is inverted from a negative polarity to a positive polarity at an end of an (N+2)-th horizontal scanning period.

As illustrated in FIG. 8, the above arrangement achieves the following operation: While the pixel electrode 17ia has a potential with a positive polarity, a polarity of the retention capacitor line 18k is first changed in a positive direction after a data signal is written. This causes an effective potential to be higher than a potential of the data signal written (absolute value of an effective potential based on Vcom>absolute value of a data signal based on Vcom). While the pixel electrode 17ib has a potential with a positive polarity, a polarity of the retention capacitor line 18p is first changed in a negative direction after a data signal is written. This causes an effective potential to be lower than a potential of the data signal written (absolute value of an effective potential<absolute value of a data signal). While the pixel electrode 17ja has a potential with a negative polarity, a polarity of the retention capacitor line 18p is first changed in a negative direction after a data signal is written. This causes an effective potential to be lower than a potential of the data signal written (absolute value of an effective potential>absolute value of a data signal). While the pixel electrode 17jb has a potential with a negative polarity, a polarity of the retention capacitor line 18q is first changed in the positive direction after a data signal is written. This causes an effective potential to be higher than a potential of the data signal written (absolute value of an effective potential<absolute value of a data signal). While the pixel electrode 17IA has a potential with a negative polarity, a polarity of the retention capacitor line 18k is first changed in the positive direction after a data signal is written. This causes an effective potential to be higher than a potential of the data signal written (absolute value of an effective potential<absolute value of a data signal). While the pixel electrode 17IB has a potential with a negative polarity, a polarity of the retention capacitor line 18p is first changed in the negative direction after a data signal is written. This causes an effective potential to be lower than a potential of the data signal written (absolute value of an effective potential>absolute value of a data signal). While the pixel electrode 17ma has a potential with a positive polarity, a polarity of the retention capacitor line 18q is first changed in the positive direction after a data signal is written. This causes an effective potential to be higher than a potential of the data signal written (absolute value of an effective potential>absolute value of a data signal). While the pixel electrode 17mb has a potential with a positive polarity, a polarity of the retention capacitor line 18r is first changed in the negative direction after a data signal is written. This causes an effective potential to be lower than a potential of the data signal written (absolute value of an effective potential<absolute value of a data signal). While the pixel electrode 17na has a potential with a negative polarity, a polarity of the retention capacitor line 18r is first changed in the negative direction after a data signal is written. This causes an effective potential to be lower than a potential of the data signal written (absolute value of an effective potential>absolute value of a data signal). While the pixel electrode 17nb has a potential with a negative polarity, a polarity of the retention capacitor line 18s is first changed in the positive direction after a data signal is written. This causes an effective potential to be higher than a potential of the data signal written (absolute value of an effective potential<absolute value of a data signal).

The above operation in F1 achieves a state illustrated in FIG. 9. Specifically, a sub-pixel including the pixel electrode 17ia serves as a bright sub-pixel having a positive polarity; a sub-pixel including the pixel electrode 17ib serves as a dark sub-pixel having a positive polarity; a sub-pixel including the pixel electrode 17ja serves as a bright sub-pixel having a negative polarity; a sub-pixel including the pixel electrode 17jb serves as a dark sub-pixel having a negative polarity; a sub-pixel including the pixel electrode 17ma serves as a bright sub-pixel having a positive polarity; a sub-pixel including the pixel electrode 17mb serves as a dark sub-pixel having a positive polarity; a sub-pixel including the pixel electrode 17na serves as a bright sub-pixel having a negative polarity; a sub-pixel including the pixel electrode 17nb serves as a dark sub-pixel having a negative polarity; a sub-pixel including the pixel electrode 17IA serves as a dark sub-pixel having a negative polarity; and a sub-pixel including the pixel electrode 17IB serves as a bright sub-pixel having a negative polarity. The present embodiment thus achieves, in F1, dot inversion drive and bright-and-dark checkered-pattern display (in which sub-pixels are alternately bright and dark in both the row direction and the column direction).

As illustrated in FIG. 10, in the frame F2, the data signal lines 15x and 15Y are each supplied with (i) a data signal with a negative polarity during the N-th horizontal scanning period (including the scanning period for the scanning signal lines 16i and 16j) and (ii) a data signal with a negative polarity also during the (N+1)-th horizontal scanning period (including the scanning period for the scanning signal lines 16m and 16n), whereas the data signal lines 15y and 15X are each supplied with (i) a data signal with a positive polarity during the N-th horizontal scanning period (including the scanning period for the scanning signal lines 16i and 16j) and (ii) a data signal with a positive polarity also during the (N+1)-th horizontal scanning period (including the scanning period for the scanning signal lines 16m and 16n). Further, the retention capacitor line 18k is supplied with a retention capacitor line signal having a polarity which is inverted every 4H and which is inverted from a positive polarity to a negative polarity at an end of the N-th horizontal scanning period. The retention capacitor line 18p is supplied with a retention capacitor line signal having a polarity which is inverted every 4H and which is inverted from a negative polarity to a positive polarity at the end of the N-th horizontal scanning period. The retention capacitor line 18q is supplied with a retention capacitor line signal having a polarity which is inverted every 4H and which is inverted from a positive polarity to a negative polarity at an end of the (N+1)-th horizontal scanning period. The retention capacitor line 18r is supplied with a retention capacitor line signal having a polarity which is inverted every 4H and which is inverted from a negative polarity to a positive polarity at the end of the (N+1)-th horizontal scanning period. The retention capacitor line 18s is supplied with a retention capacitor line signal having a polarity which is inverted every 4H and which is inverted from a positive polarity to a negative polarity at an end of an (N+2)-th horizontal scanning period.

The above operation in F2 achieves a state in which the sub-pixel including the pixel electrode 17ia serves as a bright sub-pixel having a negative polarity; the sub-pixel including the pixel electrode 17ib serves as a dark sub-pixel having a negative polarity; the sub-pixel including the pixel electrode 17ja serves as a bright sub-pixel having a positive polarity; the sub-pixel including the pixel electrode 17jb serves as a dark sub-pixel having a positive polarity; the sub-pixel including the pixel electrode 17IA serves as a dark sub-pixel having a positive polarity; the sub-pixel including the pixel electrode 17IB serves as a bright sub-pixel having a positive polarity; the sub-pixel including the pixel electrode 17ma serves as a bright sub-pixel having a negative polarity; the sub-pixel including the pixel electrode 17mb serves as a dark sub-pixel having a negative polarity; the sub-pixel including the pixel electrode 17na serves as a bright sub-pixel having a positive polarity; and the sub-pixel including the pixel electrode 17nb serves as a dark sub-pixel having a positive polarity. The present embodiment thus achieves, in F2 as well, dot inversion drive and bright-and-dark checkered-pattern display (in which sub-pixels are alternately bright and dark in both the row direction and the column direction).

The liquid crystal panel of the present embodiment, which includes bright sub-pixels and dark sub-pixels, can display a halftone and thus improve a viewing angle characteristic. Further, the liquid crystal panel, which carries out a bright-and-dark checkered-pattern display, can prevent appearance of stripe-shaped unevenness arising from presence of consecutive bright sub-pixels or dark sub-pixels.

Figure 12:
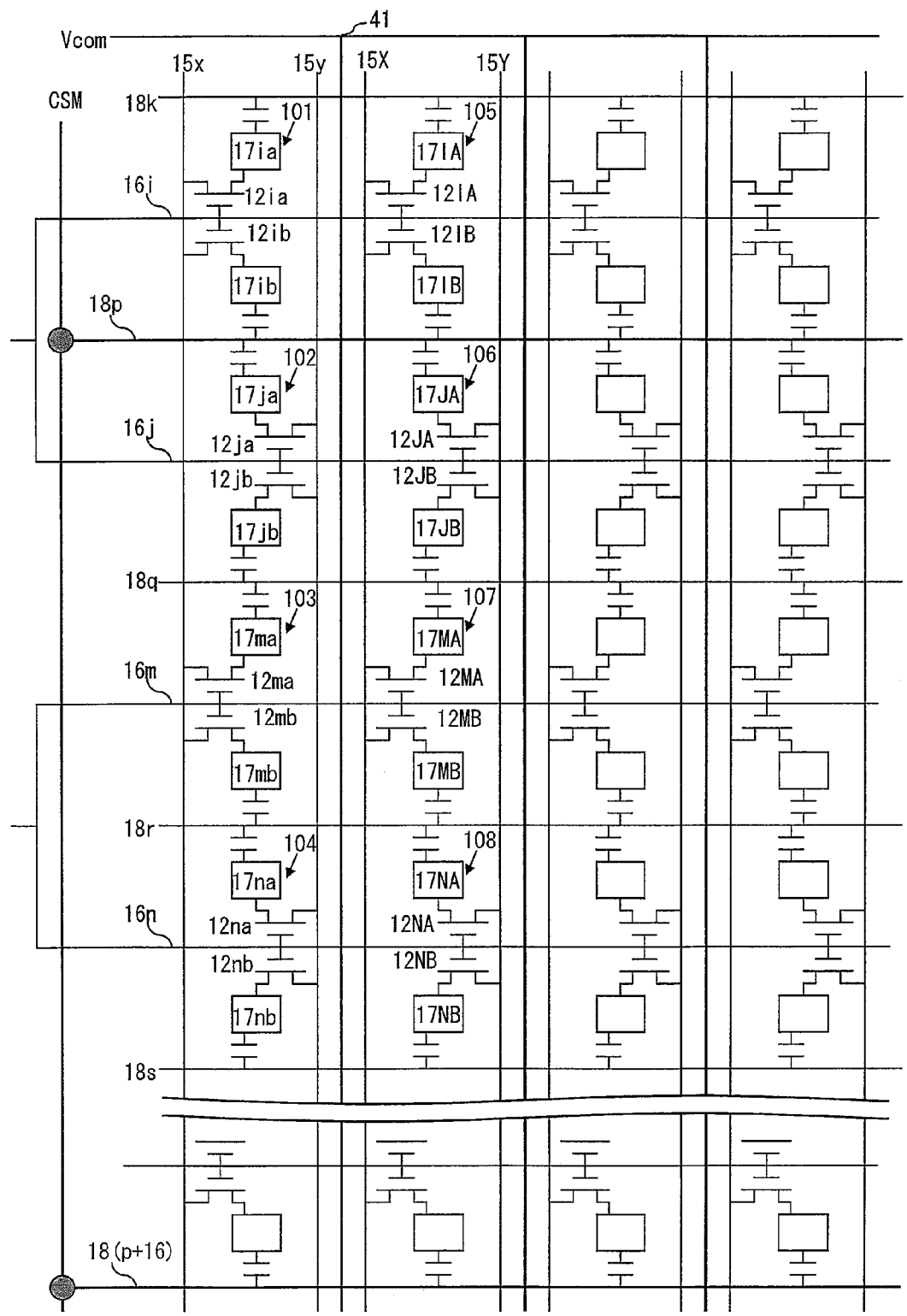
FIG. 12 is an equivalent circuit diagram illustrating a variation of the active matrix substrate of FIG. 7.

As illustrated in FIG. 11, in the driving method of the present embodiment, the retention capacitor line 18k, for example, is supplied with a retention capacitor line signal Csk which is identical in phase to a retention capacitor line signal Cs(k+16) supplied to a retention capacitor line that is present 16 retention capacitor lines downstream from the retention capacitor line 18k in a scanning direction. Similarly, the retention capacitor line 18p is supplied with a retention capacitor line signal Csp which is identical in phase to a retention capacitor line signal Cs(p+16) supplied to a retention capacitor line that is present 16 retention capacitor lines downstream from the retention capacitor line 18p in the scanning direction. Thus, as illustrated in FIG. 12, the liquid crystal panel of the present embodiment can further include a trunk line CSM which is connected to, for example, (i) the retention capacitor line 18p, (ii) a retention capacitor line (for example, a retention capacitor line 18(p+16)) which is present 16×K (where K=1, 2, 3 . . . ) retention capacitor lines downstream from the retention capacitor line 18p in the scanning direction, and (iii) a retention capacitor line which is present 16×K (where K=1, 2, 3 . . . ) retention capacitor lines upstream from the retention capacitor line 18p in the scanning direction.

Figure 13:
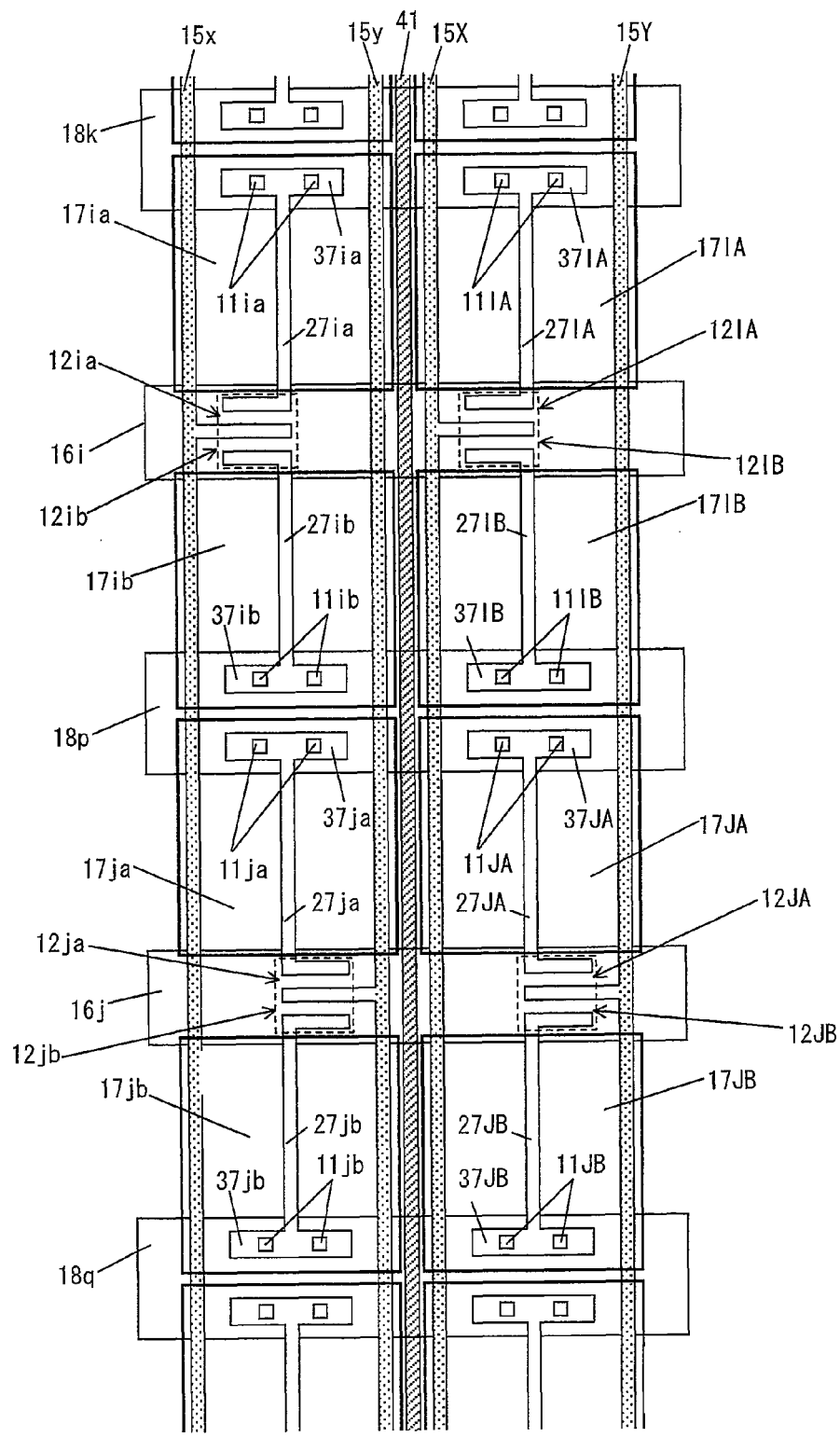
FIG. 13 is a plan view illustrating a specific example of a liquid crystal panel including the active matrix substrate of FIG. 7.

FIG. 13 is a plan view partially illustrating a liquid crystal panel including the active matrix substrate of FIG. 7. For ease of view, FIG. 13 omits members provided for a color filter substrate (counter substrate), and thus illustrates only members provided for the active matrix substrate.

The liquid crystal panel of FIG. 13 includes: a first pair of (two) data signal lines 15x and 15y and a second pair of (two) data signal lines 15X and 15Y, the data signal lines 15y and 15X being adjacent to each other; a gap line 41 provided between the data signal lines 15y and 15X; scanning signal lines 16i and 16j extending orthogonally to the data signal lines; transistors 12ia and 12ib provided in the vicinity of an intersection of the data signal line 15x with the scanning signal line 16i; transistors 12ja and 12jb provided in the vicinity of an intersection of the data signal line 15y with the scanning signal line 16j; transistors 12IA and 12IB provided in the vicinity of an intersection of the data signal line 15x with the scanning signal line 16i; and transistors 12JA and 12JB provided in the vicinity of an intersection of the data signal line 15Y with the scanning signal line 16j.

The liquid crystal panel further includes: a pixel electrode 17ia provided so as to overlap (i) a first edge of the scanning signal line 16i which first edge is present upstream in the scanning direction and (ii) the data signal lines 15x and 15y; a pixel electrode 17ib provided so as to overlap (i) a second edge of the scanning signal line 16i which second edge is present downstream in the scanning direction and (ii) the data signal lines 15x and 15y; a pixel electrode 17ja provided so as to overlap (i) a first edge of the scanning signal line 16j which first edge is present upstream in the scanning direction and (ii) the data signal lines 15x and 15y; a pixel electrode 17jb provided so as to overlap (i) a second edge of the scanning signal line 16j which second edge is present downstream in the scanning direction and (ii) the data signal lines 15x and 15y; a pixel electrode 17IA provided so as to overlap (i) the first edge of the scanning signal line 16i which first edge is present upstream in the scanning direction and (ii) the data signal lines 15X and 15Y; a pixel electrode 17IB provided so as to overlap (i) the second edge of the scanning signal line 16i which second edge is present downstream in the scanning direction and (ii) the data signal lines 15X and 15Y; a pixel electrode 17JA provided so as to overlap (i) the first edge of the scanning signal line 16j which first edge is present upstream in the scanning direction and (ii) the data signal lines 15X and 15Y; and a pixel electrode 17JB provided so as to overlap (i) the second edge of the scanning signal line 16j which second edge is present downstream in the scanning direction and (ii) the data signal lines 15X and 15Y.

The liquid crystal panel includes: a retention capacitor line 18k provided so as to overlap the pixel electrodes 17ia and 17IA; a retention capacitor line 18p provided so as to overlap the pixel electrodes 17ib, 17IB, 17ja, and 17JA; and a retention capacitor line 18q provided so as to overlap the pixel electrodes 17jb and 17JB.

In a plan view, the pixel electrode 17ia has two edges along a column direction a first one of which stretches beyond the data signal line 15x and a second one of which stretches beyond the data signal line 15y; the pixel electrode 17ib has two edges along the column direction a first one of which stretches beyond the data signal line 15x and a second one of which stretches beyond the data signal line 15y; the pixel electrode 17ja has two edges along the column direction a first one of which stretches beyond the data signal line 15*x* and a second one of which stretches beyond the data signal line 15*y*; the pixel electrode 17*jb* has two edges along the column direction a first one of which stretches beyond the data signal line 15*x* and a second one of which stretches beyond the data signal line 15*y*; the pixel electrode 17IA has two edges along the column direction a first one of which stretches beyond the data signal line 15X and a second one of which stretches beyond the data signal line 15Y; the pixel electrode 17IB has two edges along the column direction a first one of which stretches beyond the data signal line 15X and a second one of which stretches beyond the data signal line 15Y; the pixel electrode 17JA has two edges along the column direction a first one of which stretches beyond the data signal line 15X and a second one of which stretches beyond the data signal line 15Y; and the pixel electrode 17JB has two edges along the column direction a first one of which stretches beyond the data signal line 15X and a second one of which stretches beyond the data signal line 15Y.

The gap line 41 extends through (i) a gap between the pixel electrodes 17*ia* and 17Ia and below them, (ii) a gap between the pixel electrodes 17*ib* and 17IB and below them, (iii) a gap between the pixel electrodes 17*ja* and 17JA and below them, and (iv) a gap between the pixel electrodes 17*jb* and 17JB and below them.

The scanning signal line 16*i* functions as a gate electrode of the transistor 12*ia*. The transistor 12*ia* has (i) a source electrode connected to the data signal line 15*x* and (ii) a drain electrode connected to a capacitor electrode 37*ia* via a drain extracting electrode 27*ia*. The capacitor electrode 37*ia* is positioned above the retention capacitor line 18*k* and connected to the pixel electrode 17*ia* via two contact holes 11*ia*. The scanning signal line 16*i* functions as a gate electrode of the transistor 12*ib*. The transistor 12*ib* has (i) a source electrode connected to the data signal line 15*x* and (ii) a drain electrode connected to a capacitor electrode 37*ib* via a drain extracting electrode 27*ib*. The capacitor electrode 37*ib* is positioned above the retention capacitor line 18*p* and connected to the pixel electrode 17*ib* via two contact holes 11*ib*. The scanning signal line 16*j* functions as a gate electrode of the transistor 12*ja*. The transistor 12*ja* has (i) a source electrode connected to the data signal line 15*y* and (ii) a drain electrode connected to a capacitor electrode 37*ja* via a drain extracting electrode 27*ja*. The capacitor electrode 37*ja* is positioned above the retention capacitor line 18*p* and connected to the pixel electrode 17*ja* via two contact holes 11*ja*. The scanning signal line 16*j* functions as a gate electrode of the transistor 12*jb*. The transistor 12*jb* has (i) a source electrode connected to the data signal line 15*y* and (ii) a drain electrode connected to a capacitor electrode 37*jb* via a drain extracting electrode 27*jb*. The capacitor electrode 37*jb* is positioned above the retention capacitor line 18*q* and connected to the pixel electrode 17*jb* via two contact holes 11*jb*.

Similarly, the scanning signal line 16*i* functions as a gate electrode of the transistor 12IA. The transistor 12IA has (i) a source electrode connected to the data signal line 15X and (ii) a drain electrode connected to a capacitor electrode 37IA via a drain extracting electrode 27IA. The capacitor electrode 37IA is positioned above the retention capacitor line 18*k* and connected to the pixel electrode 17IA via two contact holes 11IA. The scanning signal line 16*i* functions as a gate electrode of the transistor 12IB. The transistor 12IB has (i) a source electrode connected to the data signal line 15X and (ii) a drain electrode connected to a capacitor electrode 37IB via a drain extracting electrode 27IB. The capacitor electrode 37IB is positioned above the retention capacitor line 18*p* and connected to the pixel electrode 17IB via two contact holes 11IB. The scanning signal line 16*j* functions as a gate electrode of the transistor 12JA. The transistor 12JA has (i) a source electrode connected to the data signal line 15Y and (ii) a drain electrode connected to a capacitor electrode 37JA via a drain extracting electrode 27JA. The capacitor electrode 37JA is positioned above the retention capacitor line 18*p* and connected to the pixel electrode 17JA via two contact holes 11JA. The scanning signal line 16*j* functions as a gate electrode of the transistor 12JB. The transistor 12JB has (i) a source electrode connected to the data signal line 15Y and (ii) a drain electrode connected to a capacitor electrode 37JB via a drain extracting electrode 27JB. The capacitor electrode 37JB is positioned above the retention capacitor line 18*q* and connected to the pixel electrode 17JB via two contact holes 11JB.

The liquid crystal panel of the present embodiment is configured such that the retention capacitor line 18*k* and the capacitor electrode 37*ia* overlap each other via a gate insulating film at a first portion, and thus form the above retention capacitor is at the first portion; the retention capacitor line 18*p* and the capacitor electrode 37*ib* overlap each other via the gate insulating film at a second portion, and thus form the above retention capacitor ib at the second portion; the retention capacitor line 18*p* and the capacitor electrode 37*ja* overlap each other via the gate insulating film at a third portion, and thus form the above retention capacitor ja at the third portion; the retention capacitor line 18*q* and the capacitor electrode 37*jb* overlap each other via the gate insulating film at a fourth portion, and thus form the above retention capacitor jb at the fourth portion; the retention capacitor line 18*k* and the capacitor electrode 37IA overlap each other via the gate insulating film at a fifth portion, and thus form the above retention capacitor IA at the fifth portion; the retention capacitor line 18*p* and the capacitor electrode 37IB overlap each other via the gate insulating film at a sixth portion, and thus form the above retention capacitor IB at the sixth portion; the retention capacitor line 18*p* and the capacitor electrode 37JA overlap each other via the gate insulating film at a seventh portion, and thus form the above retention capacitor JA at the seventh portion; and the retention capacitor line 18*q* and the capacitor electrode 37JB overlap each other via the gate insulating film at an eighth portion, and thus form the above retention capacitor JB at the eighth portion.

Figure 14:
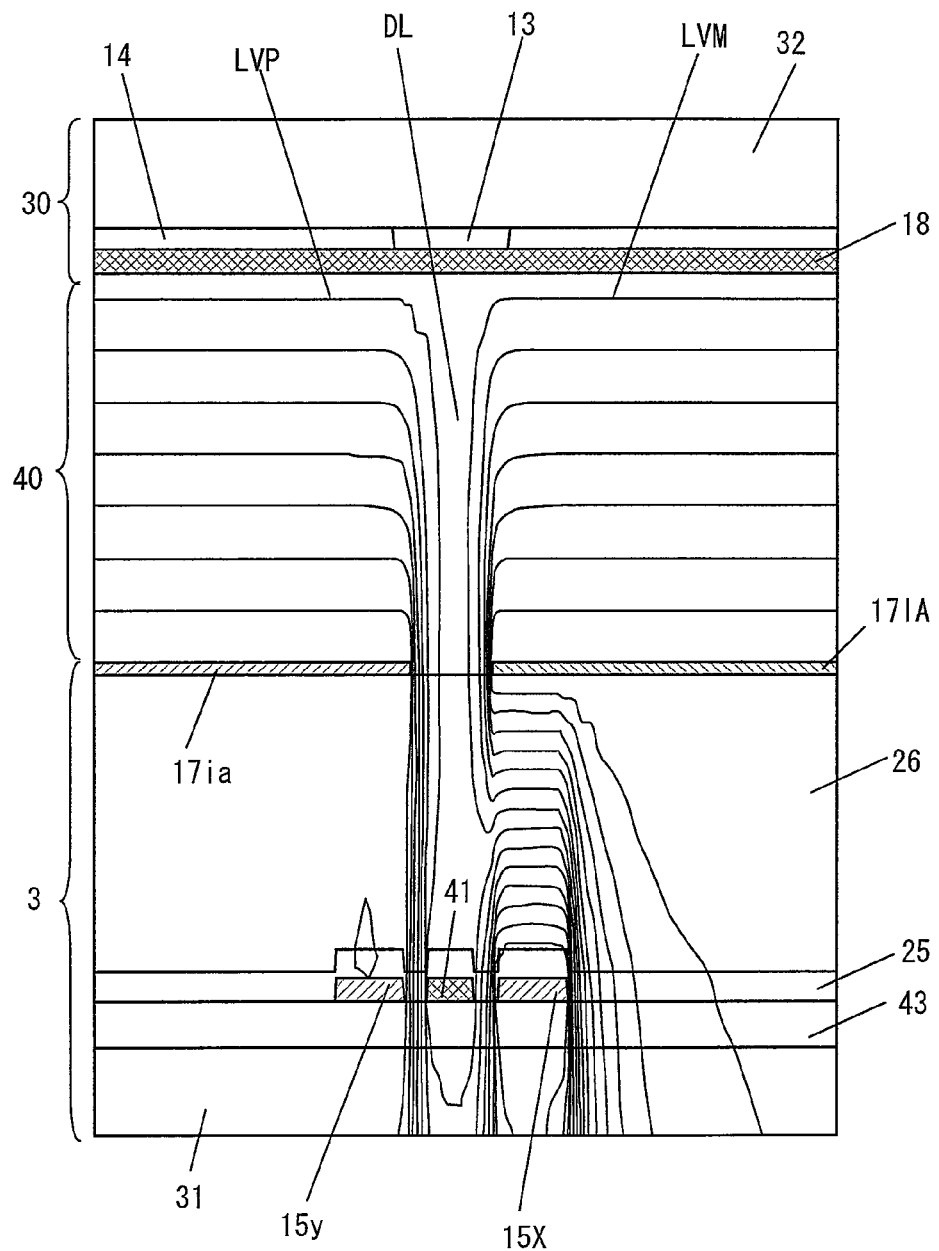
FIG. 14 is a cross-sectional view illustrating how equipotential lines are distributed in the vicinity of a gap line when the liquid crystal panel is being driven.

The liquid crystal panel includes, between the data signal lines 15*y* and 15X, the gap line 41 to which the Vcom signal is supplied. As such, it is possible, for example, to (i) reduce a cross talk which arises between the pixel electrode 17*ia* and the data signal line 15X from a parasitic capacitance therebetween, and thus (ii) prevent appearance of a longitudinal shadow. FIG. 14 illustrates equipotential lines (among which LVM is a line corresponding to −0.5 V, and LVP is a line corresponding to +0.5 V) for the liquid crystal panel which is being driven. FIG. 14 illustrates no equipotential lines which extend from above a pixel electrode (17*ia*) of a first pixel to above a data signal line (15X) corresponding to a second pixel adjacent to the first pixel. This clearly indicates the above effect of reducing a cross talk. In the present embodiment, a value of the above parasitic capacitance is reduced by approximately 40%, for example. The effect of reducing a cross talk is particularly significant in a pixel division system, as in the liquid crystal panel of the present embodiment, which controls each pixel so that the pixel has two luminances. This is because a cross talk affects display quality more severely in such a pixel division system than in a pixel non-division system illustrated in FIG. 3.

The liquid crystal panel of the present embodiment, which includes the gap line 41, further reduces a cross talk between two adjacent data signal lines (for example, 15*y* and 15X) separated from each other by the gap line which cross talk arises from a parasitic capacitance between the two adjacent data signal lines. In the present embodiment, a value of such a parasitic capacitance is reduced approximately by half, for example.

Figure 15:
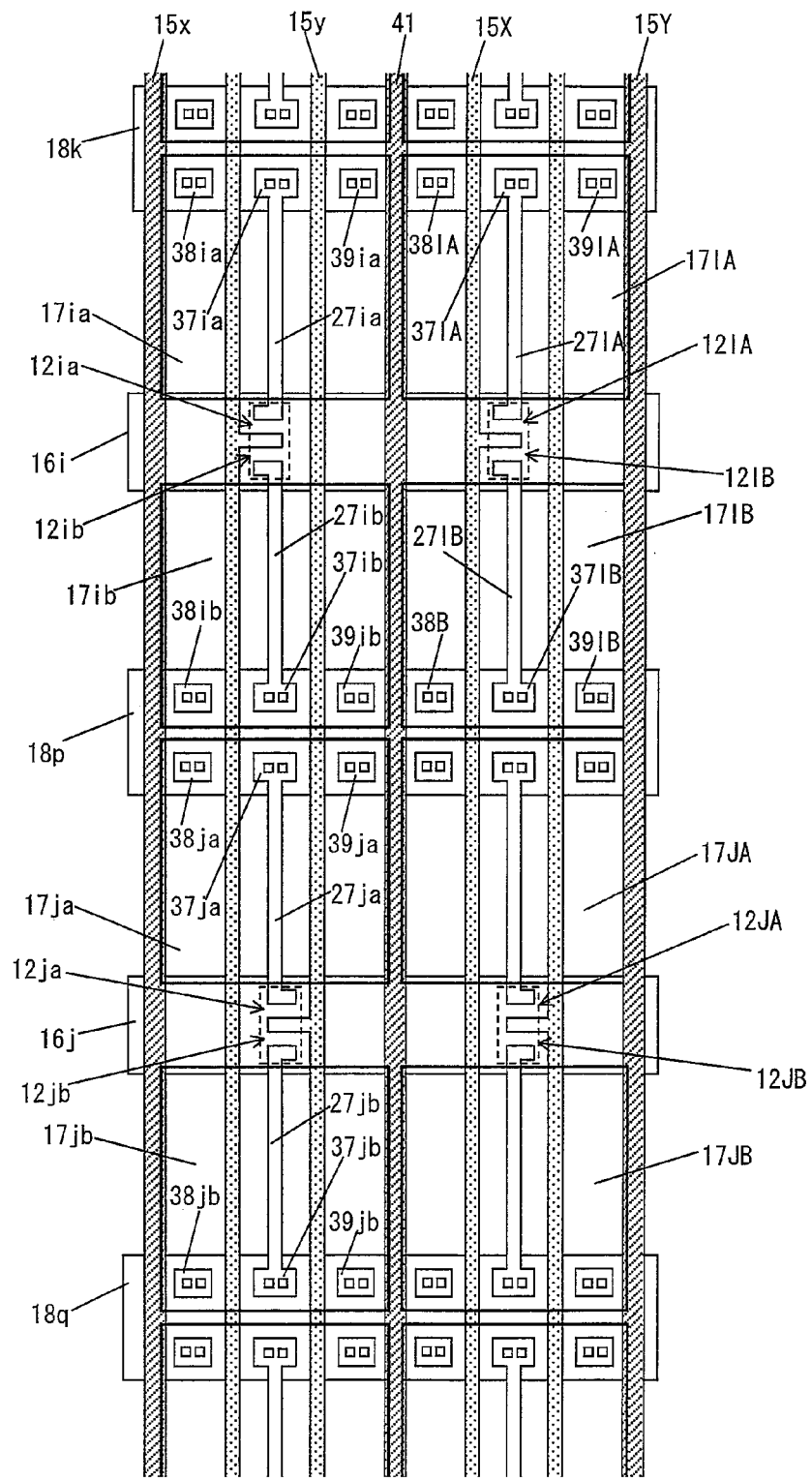
FIG. 15 is a plan view illustrating another configuration of the liquid crystal panel of Embodiment 2.

The liquid crystal panel of FIG. 13 can be varied as in FIG. 15. Specifically, as compared to the liquid crystal panel of FIG. 13, (i) two data signal lines corresponding to a pixel region column are separated from each other by a small distance (that is, a distance is small between data signal lines forming a pair), and (ii) the data signal lines 15*y* and 15X which are adjacent to each other and which sandwich the gap line 41 are separated from each other by a large distance. For example, assuming that the data signal lines 15*x* and 15*y* are separated from each other by a first distance expressed as 100, the data signal line 15*y* is separated from the gap line 41 by a second distance of 2 to 198, preferably 80 to 120, or more preferably 95 to 105 (that is, the first and second distances are substantially equal to each other).

The above configuration includes, in addition to the capacitor electrode 37*ia* provided between the data signal lines 15*x* and 15*y*, two capacitor electrodes 38*ia* and 39*ia* provided above the retention capacitor line 18*k* and outside a region between the data signal lines 15*x* and 15*y*. The capacitor electrodes 38*ia* and 39*ia* are each connected to the pixel electrode 17*ia* via two contact holes. The above configuration also includes, in addition to the capacitor electrode 37*ib* provided between the data signal lines 15*x* and 15*y*, two capacitor electrodes 38*ib* and 39*ib* provided above the retention capacitor line 18*k* and outside the region between the data signal lines 15*x* and 15*y*. The capacitor electrodes 38*ib* and 39*ib* are each connected to the pixel electrode 17*ib* via two contact holes. The above configuration further includes, in addition to the capacitor electrode 37*ia* provided between the data signal lines 15X and 15Y, two capacitor electrodes 38IA and 39IA provided above the retention capacitor line 18*k* and outside a region between the data signal lines 15X and 15Y. The capacitor electrodes 38IA and 39IA are each connected to the pixel electrode 17IA via two contact holes. Further, the gap line 41 overlaps respective edges of the pixel electrodes 17*ia*, 17*ib*, 17*ja*, 17*jb*, 17IA, IB, 17JA, and JB provided on opposite sides of the gap line 41.

The liquid crystal panel includes, between the data signal lines 15*y* and 15X, the gap line 41 to which the Vcom signal is supplied. As such, it is possible, for example, to (i) greatly reduce a cross talk which arises between the pixel electrode 17*ia* and the data signal line 15X from a parasitic capacitance therebetween, and thus (ii) prevent appearance of a longitudinal shadow. FIG. 16 illustrates equipotential lines (among which LVM is a line corresponding to −0.5 V, and LVP is a line corresponding to +0.5 V) for the liquid crystal panel which is being driven. FIG. 16 illustrates no equipotential lines which extend from above a pixel electrode (17*ia*) of a first pixel to above a data signal line (15X) corresponding to a second pixel adjacent to the first pixel. This clearly indicates the above effect of reducing a cross talk (shield effect). In the present embodiment, a value of the above parasitic capacitance is reduced by approximately 70%, for example.

The liquid crystal panel can also substantially equalize (i) the distance between data signal lines forming a pair and (ii) the distance between a data signal line and a gap line. The liquid crystal panel can thus greatly reduce a cross talk between two adjacent data signal lines (for example, 15*y* and 15X) separated from each other by a gap line which cross talk arises from a parasitic capacitance between the two adjacent data signal lines. In the present embodiment, a value of such a parasitic capacitance is reduced approximately by 90%, for example. Further, the liquid crystal panel can prevent a short circuit between a data signal line and a gap line.

The driving method illustrated in FIGS. 8 and 10 inverts the polarity of a retention capacitor line signal every 4H. The driving method can alternatively invert the polarity every 10H or 12H, for example. This reduces influence caused by a dull waveform of the potential of a retention capacitor line upon the luminance of a sub-pixel, and thus improves display quality.

Figure 17:
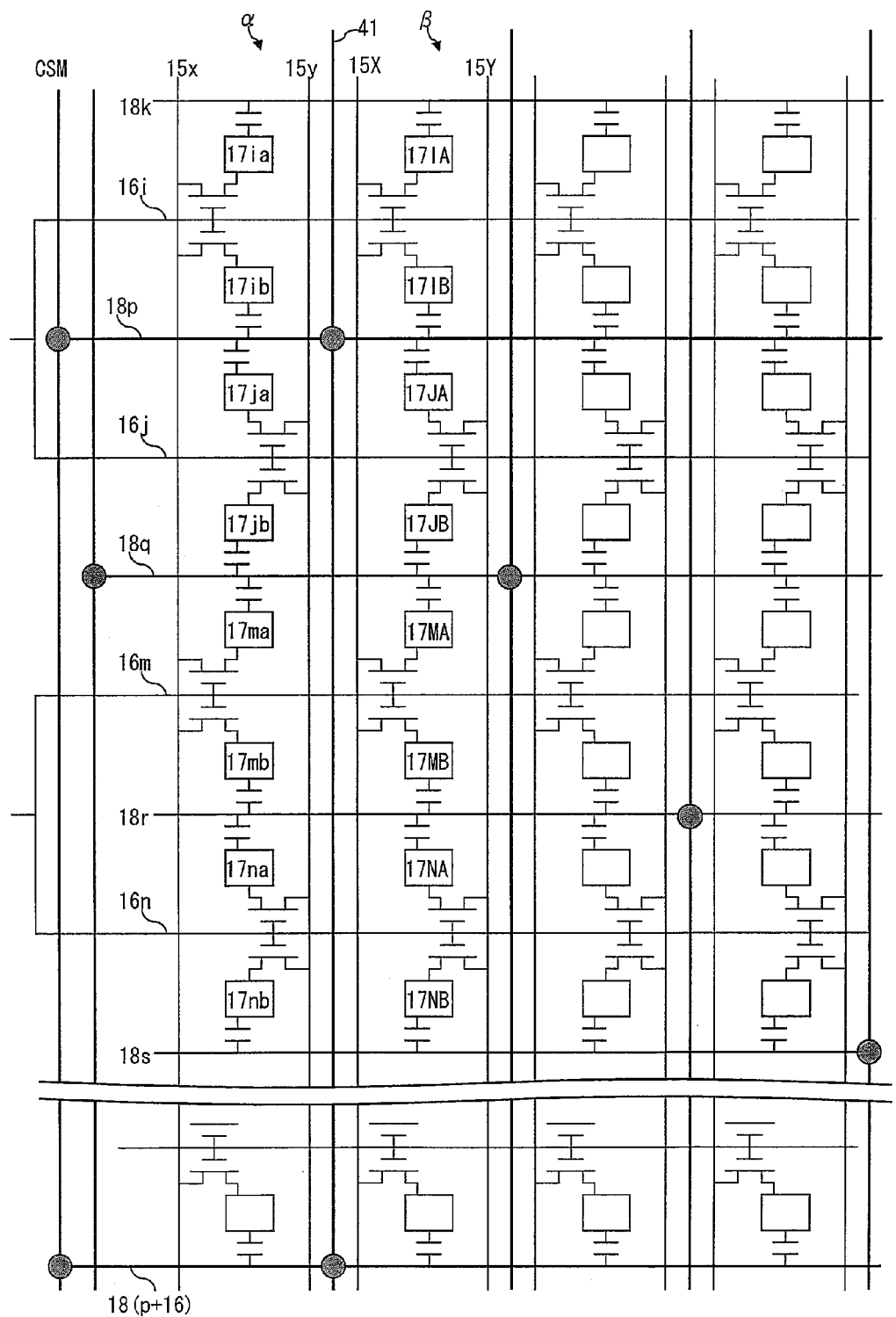
FIG. 17 is an equivalent circuit diagram illustrating another configuration of the active matrix substrate of Embodiment 2.
Figure 18:
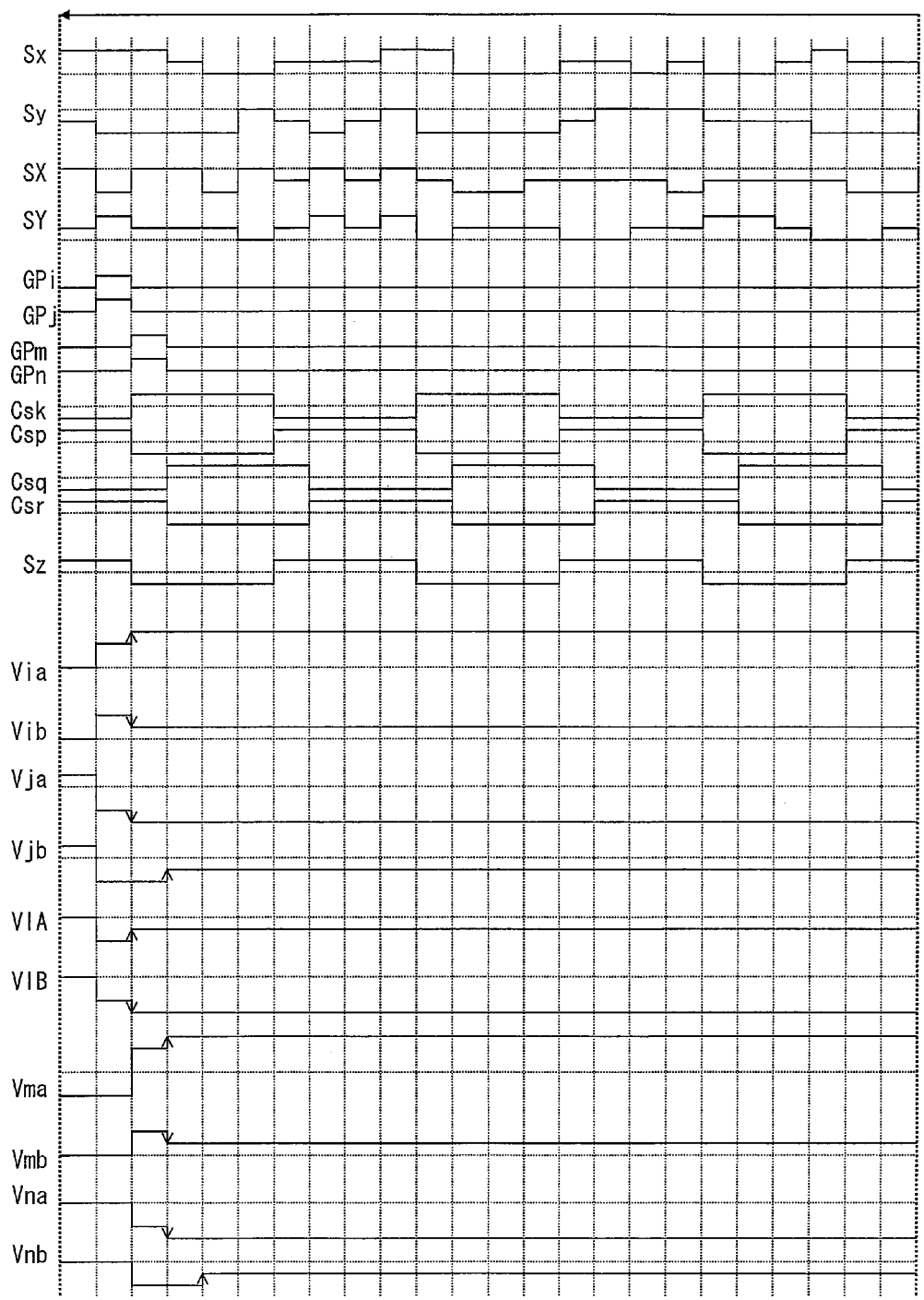
FIG. 18 is a timing chart illustrating a method for driving a liquid crystal panel including the active matrix substrate of FIG. 17.

In the configuration of FIG. 7 and its driving method illustrated in FIG. 8, the gap line is supplied with a Vcom signal (that is, the potential Sz of the gap line is maintained at Vcom). The present invention is, however, not limited to this. The gap line can alternatively be driven as illustrated in FIGS. 17 and 18, for example. FIG. 17 illustrates a configuration of an active matrix substrate. FIG. 18 illustrates a method for driving a liquid crystal panel including the active matrix substrate. The gap line can, specifically, be connected to retention capacitor lines and a trunk line, and thus supplied with a retention capacitor line signal (CS signal).

Figure 19:
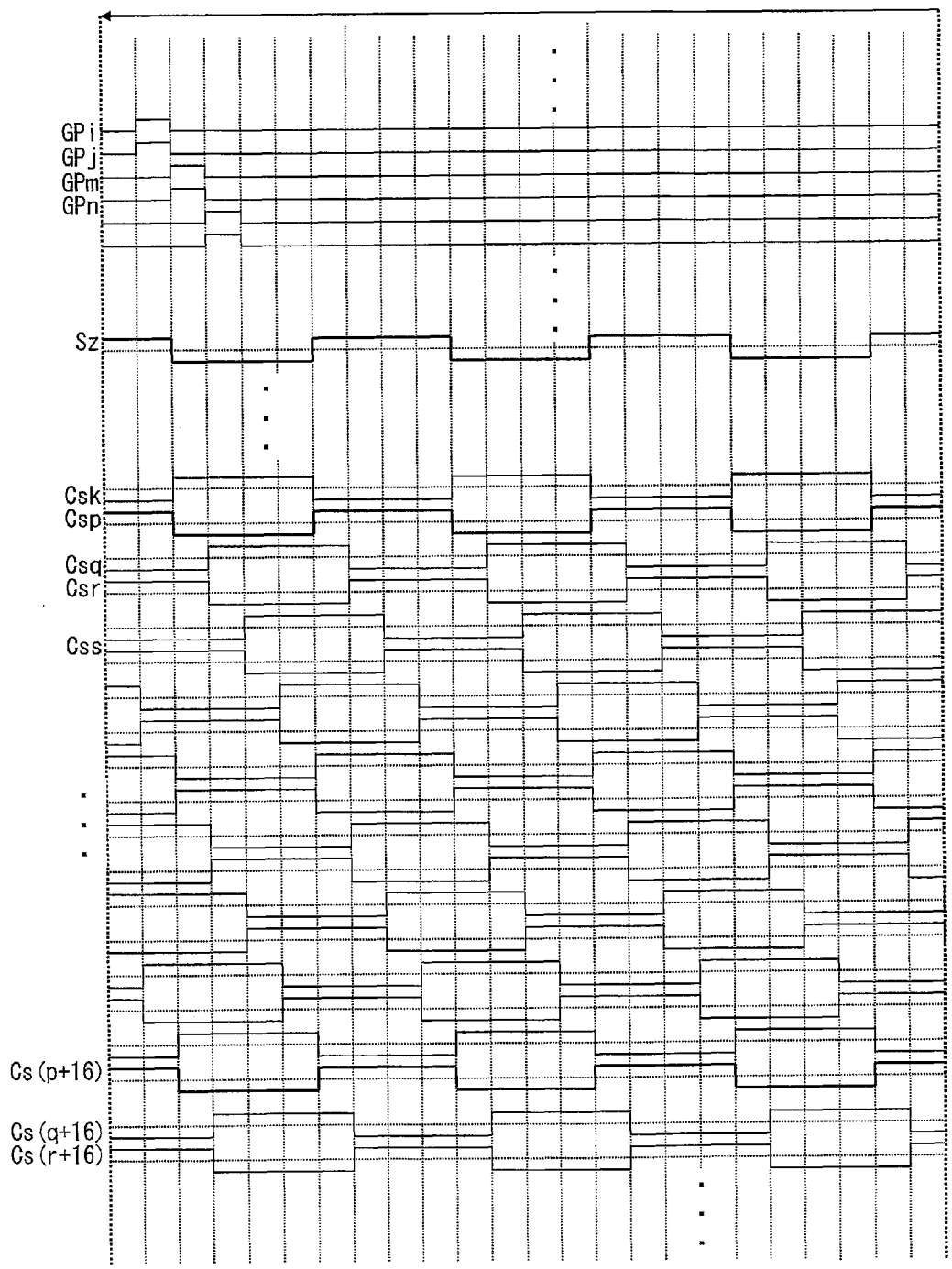
FIG. 19 is a timing chart illustrating a signal supplied to a gap line, gate ON pulses, and retention capacitor line signals in the driving method of FIG. 18.

More specifically, the liquid crystal panel is arranged such that the gap line 41 and a trunk line CSM are connected to, for example, (i) the retention capacitor line 18*p*, (ii) a retention capacitor line (for example, a retention capacitor line 18(p+16)) which is present 16×K (where K=1, 2, 3 . . . ) retention capacitor lines downstream from the retention capacitor line 18*p* in the scanning direction, and (iii) a retention capacitor line which is present 16×K (where K=1, 2, 3 . . . ) retention capacitor lines upstream from the retention capacitor line 18*p* in the scanning direction. FIG. 19 illustrates (i) respective gate signals supplied to the scanning signal lines 16*i*, 16*j*, 16*m*, and 16*n* and (ii) respective retention capacitor line signals supplied to the individual retention capacitor lines.

Since the liquid crystal panel is driven so that the gap line 41 is supplied with a retention capacitor line Csp, the gap line 41 has a potential Sz having a polarity which is inverted every 4H as illustrated in FIG. 18. Except for this point, the driving method is identical to that illustrated in FIG. 8.

Figure 20:
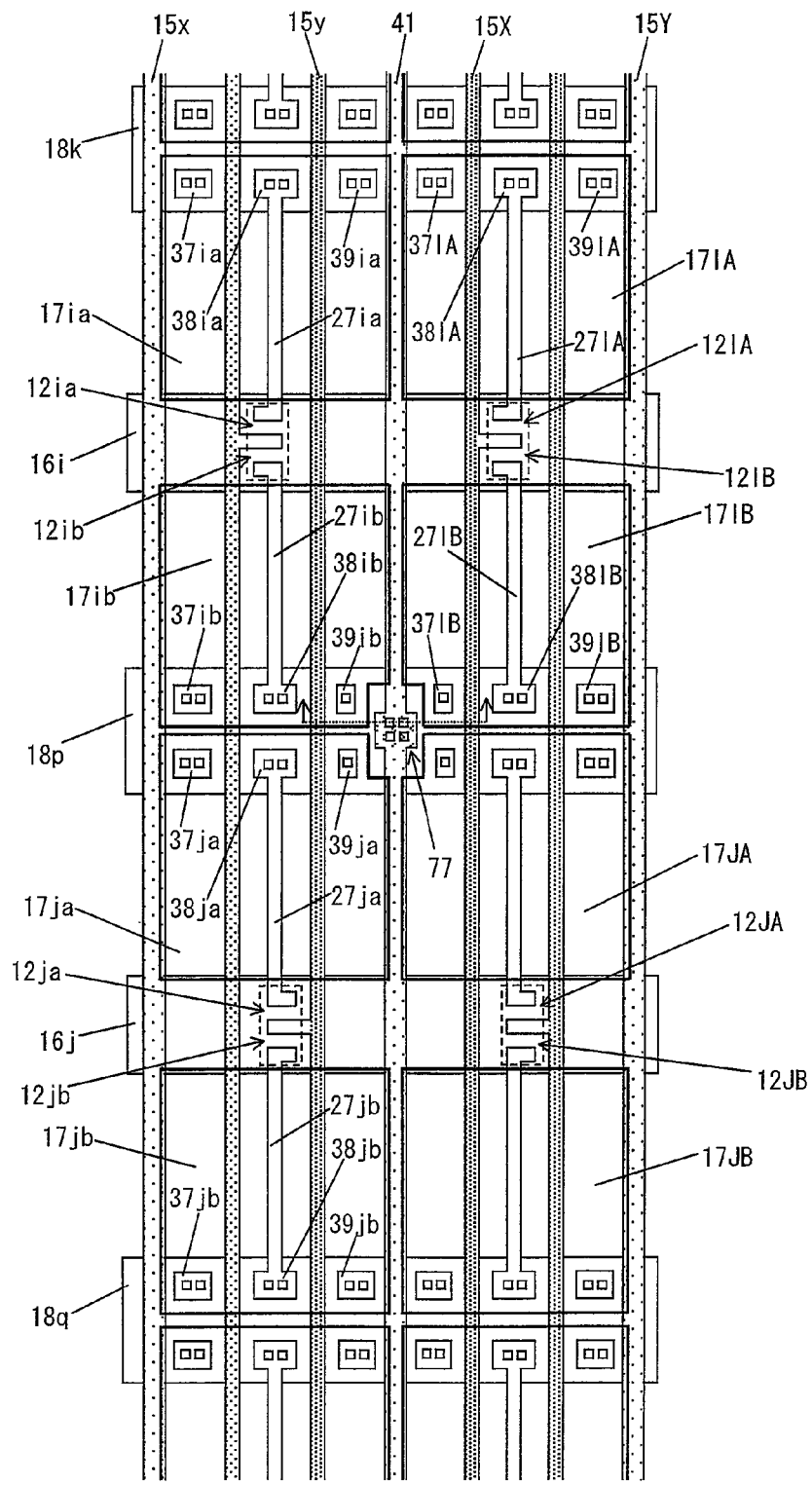
FIG. 20 is a plan view illustrating still another configuration of the liquid crystal panel of Embodiment 2.

FIG. 20 is a plan view illustrating a specific example of a liquid crystal panel including the active matrix substrate of FIG. 17. For ease of view, FIG. 20 omits members provided for a color filter substrate (counter substrate), and thus illustrates only members provided for the active matrix substrate. FIG. 20 illustrates a configuration which is identical to that of FIG. 15 except that the retention capacitor line 18*p* is connected to the gap line 41. Specifically, the configuration of FIG. 20 is such that the retention capacitor line 18*p* and the gap line 41 intersect with each other in a region 77 and connected to each other in the region 77 via four contact holes.

FIG. 21 is a cross-sectional view illustrating a portion of the liquid crystal panel which portion includes the region 77. As illustrated in FIG. 21, in the active matrix substrate 3, the retention capacitor line 18*p* is formed on a glass substrate 31 and substantially covered by a gate insulating film 43. Formed in a layer above the gate insulating film 43 are the data signal line 15*y*, the gap line 41, and the data signal line 15X. Further formed above the gate insulating film 43 are (although not shown in the cross-sectional view): semiconductor layers (namely, an i layer and an n+ layer) of each transistor; and a source electrode and a drain electrode of each transistor both in contact with the n+ layer. Metal layers such as the data signal lines and the gap line are covered by an inorganic interlayer insulating film 25, on which an organic interlayer insulating film 26 is formed that is thicker than the inorganic interlayer insulating film 25. Formed on the organic interlayer insulating film 26 are the pixel electrodes 17*ib* and 17IB, which are each covered by an alignment film 9. The gate insulating film 43 is hollowed at a portion in the region 77 at which portion the contact holes are provided. With this arrangement, the gap line 41 is in contact with the retention capacitor line 18*p*.

The liquid crystal panel includes, between the data signal lines 15*y* and 15X, the gap line 41 to which a signal with an effective potential of Vcom is supplied. As such, it is possible, for example, to (i) greatly reduce a cross talk which arises between the pixel electrode 17*ia* and the data signal line 15X from a parasitic capacitance therebetween, and thus (ii) prevent appearance of a longitudinal shadow. FIG. 22 illustrates equipotential lines (among which LVM is a line corresponding to −0.5 V, and LVP is a line corresponding to +0.5 V) for the liquid crystal panel which is being driven. FIG. 22 illustrates no equipotential lines which extend from above a pixel electrode (17*ia*) of a first pixel to above a data signal line (15X) corresponding to a second pixel adjacent to the first pixel. This clearly indicates the above effect of reducing a cross talk (shield effect). In the present embodiment, a value of the above parasitic capacitance is reduced by approximately 70%, for example.

The liquid crystal panel eliminates the need to separately generate a Vcom signal to be supplied to the gap line 41. The liquid crystal panel can also substantially equalize (i) the distance between data signal lines forming a pair and (ii) the distance between a data signal line and a gap line. The liquid crystal panel can thus greatly reduce a cross talk between two adjacent data signal lines (for example, 15*y* and 15X) sandwiching a gap line which cross talk arises from a parasitic capacitance between the two adjacent data signal lines. In the present embodiment, a value of such a parasitic capacitance is reduced approximately by 90%, for example. Further, the liquid crystal panel can prevent a short circuit between a data signal line and a gap line.

The liquid crystal panel, in which retention capacitor lines are connected to one another via a gap line, can reduce resistance of the retention capacitor lines. With this arrangement, it is possible to (i) prevent a potential waveform for a retention capacitor line from becoming dull, and thus (ii) improve display quality. Further, it is also possible to (i) reduce a width of the retention capacitor trunk line (CSM) connected to the retention capacitor lines which are in turn connected to one another via the gap line, or (ii) eliminate the retention capacitor trunk line altogether by arranging the liquid crystal panel so that the gap line is supplied with a retention capacitor line signal. As a result, it is possible to reduce external dimensions of the liquid crystal panel.

The above arrangement, which causes the potential of the gap line to change, may bring about a cross talk between pixel electrodes and the gap line. Such a cross talk, however, does not substantially affect display quality because (i) the retention capacitor line signals each have a polarity that is inverted in a cycle (4H; alternatively, 10H or 12H as described above), which does not allow liquid crystal to respond, and also (ii) the retention capacitor line signals each have an effective potential of 0 (Vcom).

[Embodiment 3]

Figure 23:
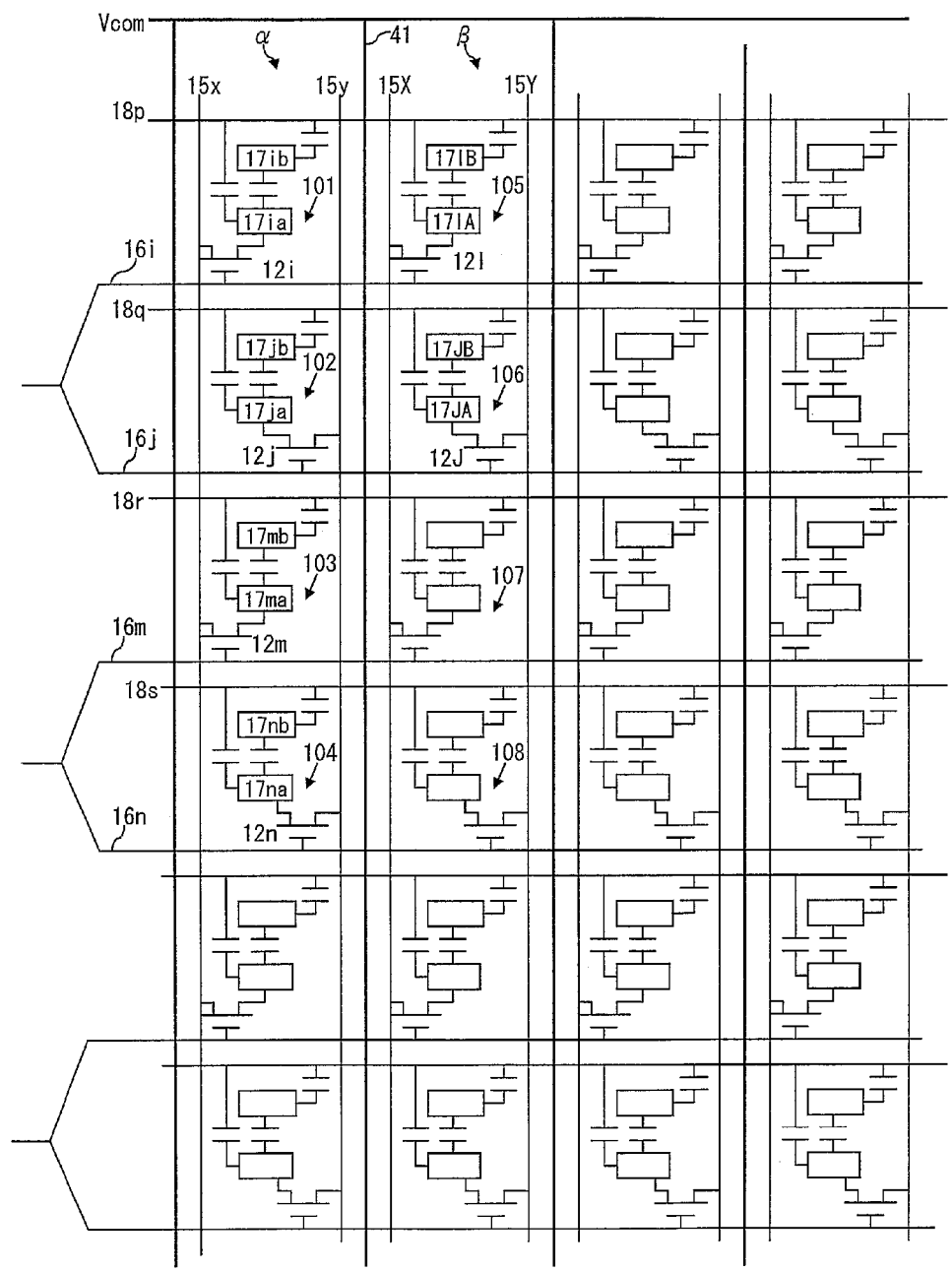
FIG. 23 is an equivalent circuit diagram illustrating a configuration of an active matrix substrate of Embodiment 3.

FIG. 23 is an equivalent circuit diagram partially illustrating an active matrix substrate of Embodiment 3. As illustrated in FIG. 23, the active matrix substrate includes: data signal lines 15*x*, 15*y*, 15X, and 15Y arranged in that order; scanning signal lines 16*i*, 16*j*, 16*m*, and 16*n* arranged in that order and extending in a row direction (that is, a right-left direction in FIG. 23); a pixel region 101 corresponding to an intersection of the data signal lines 15*x* and 15*y* with the scanning signal line 16*i*; a pixel region 102 corresponding to an intersection of the data signal lines 15*x* and 15*y* with the scanning signal line 16*j*; a pixel region 103 corresponding to an intersection of the data signal lines 15*x* and 15*y* with the scanning signal line 16*m*; a pixel region 104 corresponding to an intersection of the data signal lines 15X and 15*y* with the scanning signal line 16*n*; a pixel region 105 corresponding to an intersection of the data signal lines 15X and 15Y with the scanning signal line 16*i*; a pixel region 106 corresponding to an intersection of the data signal lines 15X and 15Y with the scanning signal line 16*j*; a pixel region 107 corresponding to an intersection of the data signal lines 15X and 15Y with the scanning signal line 16*m*; a pixel region 108 corresponding to an intersection of the data signal lines 15X and 15Y with the scanning signal line 16*n*; a retention capacitor line 18*p* corresponding to the pixel regions 101 and 105; a retention capacitor line 18*q* corresponding to the pixel regions 102 and 106; a retention capacitor line 18*r* corresponding to the pixel regions 103 and 107; and a retention capacitor line 18*s* corresponding to the pixel regions 104 and 108.

The data signal lines 15*x* and 15*y* are provided so as to correspond to a pixel region column α including the pixel regions 101 through 104, whereas the data signal lines 15X and 15Y are provided so as to correspond to a pixel region column β including the pixel regions 101 through 104. Further, there is a gap line 41 provided between the data signal lines 15*y* and 15X to which gap line 41 a Vcom signal is supplied.

Each pixel includes two pixel electrodes: A pixel electrode 17*ia* in the pixel region 101 is connected to the data signal line 15*x* via a transistor 12*i* connected to the scanning signal line 16*i*. A pixel electrode 17*ib* in the pixel region 101 is connected to the pixel electrode 17*ia* via a capacitor. A pixel electrode 17*ja* in the pixel region 102 is connected to the data signal line 15*y* via a transistor 12*j* connected to the scanning signal line 16*j*. A pixel electrode 17*jb* in the pixel region 102 is connected to the pixel electrode 17*ja* via a capacitor. A pixel electrode 17*ma* in the pixel region 103 is connected to the data signal line 15*x* via a transistor 12*m* connected to the scanning signal line 16*m*. A pixel electrode 17 mb in the pixel region 103 is connected to the pixel electrode 17*ma* via a capacitor. A pixel electrode 17*na* in the pixel region 104 is connected to the data signal line 15*y* via a transistor 12*n* connected to the scanning signal line 16*n*. A pixel electrode 17*nb* in the pixel region 104 is connected to the pixel electrode 17*na* via a capacitor. A pixel electrode 17IA in the pixel region 105 is connected to the data signal line 15X via a transistor 12I connected to the scanning signal line 16*i*. A pixel electrode 17IB in the pixel region 105 is connected to the pixel electrode 17IA via a capacitor. A pixel electrode 17JA in the pixel region 106 is connected to the data signal line 15Y via a transistor 12J connected to the scanning signal line 16*j*. A pixel electrode 17JB in the pixel region 106 is connected to the pixel electrode 17JA via a capacitor. In other words, (i) each even-numbered pixel region (102 and 104) in the pixel region column α has pixel electrodes connected to the data signal line 15*y*, (ii) each odd-numbered pixel region (105 and 107) in the pixel region column β has pixel electrodes connected to the data signal line 15X, and (iii) the data signal line 15*y* is adjacent to the data signal line 15X with the gap line 41 therebetween.

The scanning signal lines 16*i* and 16*j* are connected to each other inside or outside a panel and simultaneously selected (described below in detail). The scanning signal lines 16*m* and 16*n* are connected to each other inside or outside the panel and simultaneously selected (described below in detail).

The pixel electrode 17ia and the retention capacitor line 18p form a retention capacitor is therebetween. The pixel electrode 17ib and the retention capacitor line 18p form a retention capacitor ib therebetween. The pixel electrodes 17ia and 17ib form a coupling capacitor iab therebetween. The pixel electrode 17ja and the retention capacitor line 18q form a retention capacitor ja therebetween. The pixel electrode 17jb and the retention capacitor line 18q form a retention capacitor jb therebetween. The pixel electrodes 17ja and 17jb form a coupling capacitor jab therebetween. The pixel electrode 17IA and the retention capacitor line 18p form a retention capacitor IA therebetween. The pixel electrode 17IB and the retention capacitor line 18p form a retention capacitor IB therebetween. The pixel electrodes 17IA and 17IB form a coupling capacitor IAB therebetween. The pixel electrode 17JA and the retention capacitor line 18q form a retention capacitor JA therebetween. The pixel electrode 17JB and the retention capacitor line 18q form a retention capacitor JB therebetween. The pixel electrode 17JA and the pixel electrode 17JB form a coupling capacitor JAB therebetween.

Figure 24:
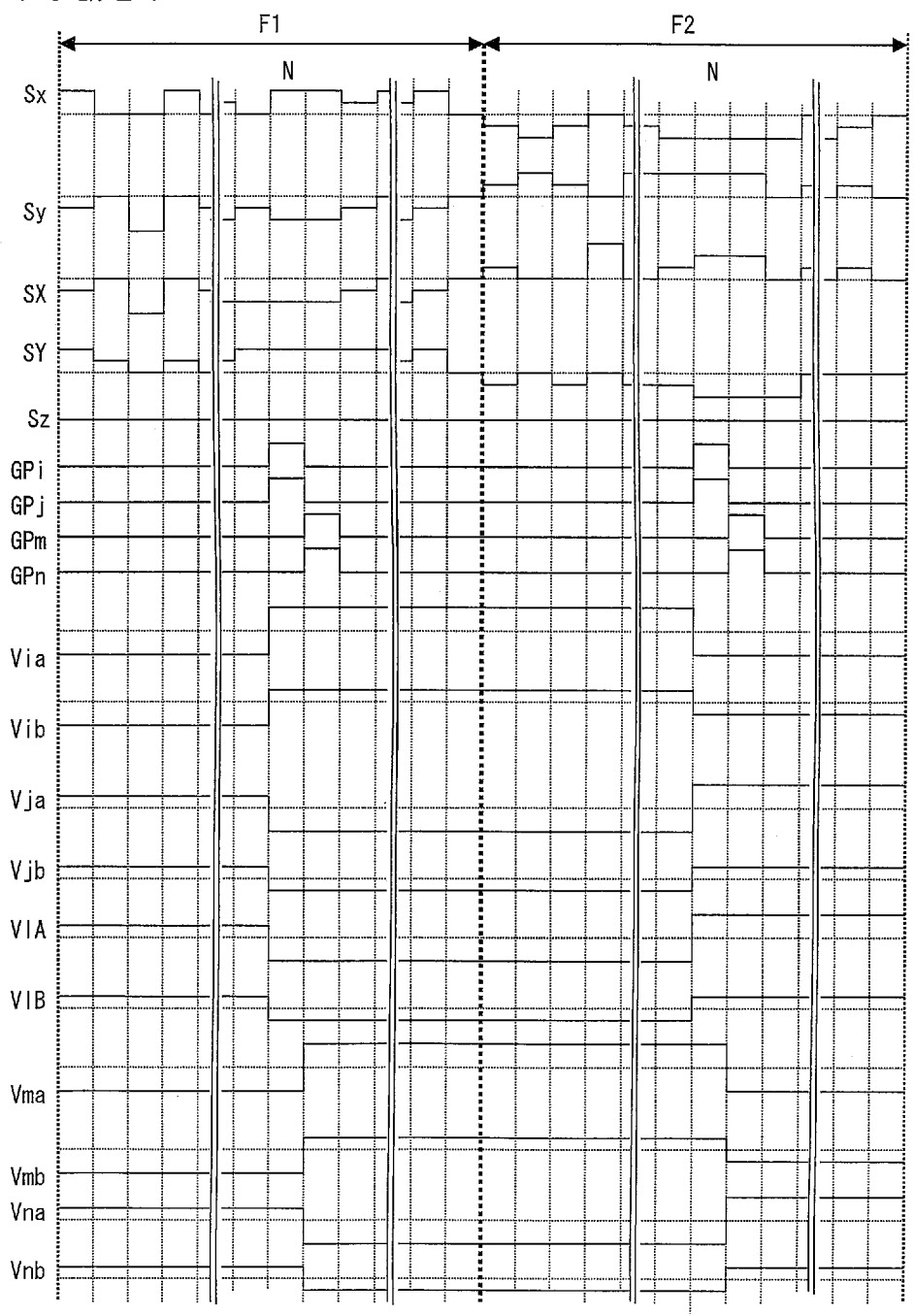
FIG. 24 is a timing chart illustrating a method for driving a liquid crystal panel including the active matrix substrate of FIG. 23.

FIG. 24 is a timing chart illustrating a method (in a normally black mode) for driving a liquid crystal panel of the present embodiment which liquid crystal panel includes the above active matrix substrate. In FIG. 24, Sx, Sy, SX, and SY represent data signals (data signals) supplied to the data signal lines 15x, 15y, 15X, and 15Y, respectively; Sz represents a signal supplied to the gap line; GPi, GPj, GPm, and GPn represent gate signals supplied to the scanning signal lines 16i, 16j, 16m, and 16n, respectively; and Via, Vib, Vja, Vjb, VIA, VIB, Vma, Vmb, Vna, and Vnb represent potentials of the pixel electrodes 17ia, 17ib, 17ja, 17jb, 17IA, 17IB, 17ma, 17mb, 17na, and 17nb, respectively.

As illustrated in FIG. 24, the driving method is carried out as follows: Two scanning signal lines are simultaneously selected at a time. Each data signal line is supplied with a data signal having a polarity which is inverted every frame period (1 V). Within an identical horizontal scanning period, (i) two data signal lines (15x and 15y; 15X and 15Y) corresponding to an identical pixel column are supplied with respective data signals which are opposite to each other in polarity, and (ii) two adjacent data signal lines (15y and 15X) sandwiching a gap line are supplied with respective data signals which are identical to each other in polarity. The gap line is supplied with a constant potential signal (Vcom signal) having a potential identical to a potential of a common electrode.

Specifically, in F1 of consecutive frames F1 and F2, the data signal lines 15x and 15Y are each supplied with (i) a data signal with a positive polarity during an N-th horizontal scanning period (including a scanning period for the scanning signal lines 16i and 16j) and (ii) a data signal with a positive polarity also during an (N+1)-th horizontal scanning period (including a scanning period for the scanning signal lines 16m and 16n), whereas the data signal lines 15y and 15X are each supplied with (i) a data signal with a negative polarity during the N-th horizontal scanning period (including the scanning period for the scanning signal lines 16i and 16j) and (ii) a data signal with a negative polarity also during the (N+1)-th horizontal scanning period (including the scanning period for the scanning signal lines 16m and 16n).

The above driving method achieves the following operation: As illustrated in FIG. 24, the pixel electrode 17ia has a potential that is positive in polarity and that is equal to a data signal, whereas the pixel electrode 17ib, which is connected to the pixel electrode 17ia via a capacitor, has a potential that is positive in polarity and that is not greater in absolute value than the data signal. The pixel electrode 17ja has a potential that is negative in polarity and that is equal to a data signal, whereas the pixel electrode 17jb, which is connected to the pixel electrode 17ja via a capacitor, has a potential that is negative in polarity and that is not greater in absolute value than the data signal. The pixel electrode 17ma has a potential that is positive in polarity and that is equal to a data signal, whereas the pixel electrode 17mb, which is connected to the pixel electrode 17ma via a capacitor, has a potential that is positive in polarity and that is not greater in absolute value than the data signal. The pixel electrode 17na has a potential that is negative in polarity and that is equal to a data signal, whereas the pixel electrode 17nb, which is connected to the pixel electrode 17na via a capacitor, has a potential that is negative in polarity and that is not greater in absolute value than the data signal. The pixel electrode 17IA has a potential that is negative in polarity and that is equal to a data signal, whereas the pixel electrode 17IB, which is connected to the pixel electrode 17IA via a capacitor, has a potential that is negative in polarity and that is not greater in absolute value than the data signal. The pixel electrode 17JA has a potential that is positive in polarity and that is equal to a data signal, whereas the pixel electrode 17JB, which is connected to the pixel electrode 17JA via a capacitor, has a potential that is positive in polarity and that is not greater in absolute value than the data signal.

Figure 25:
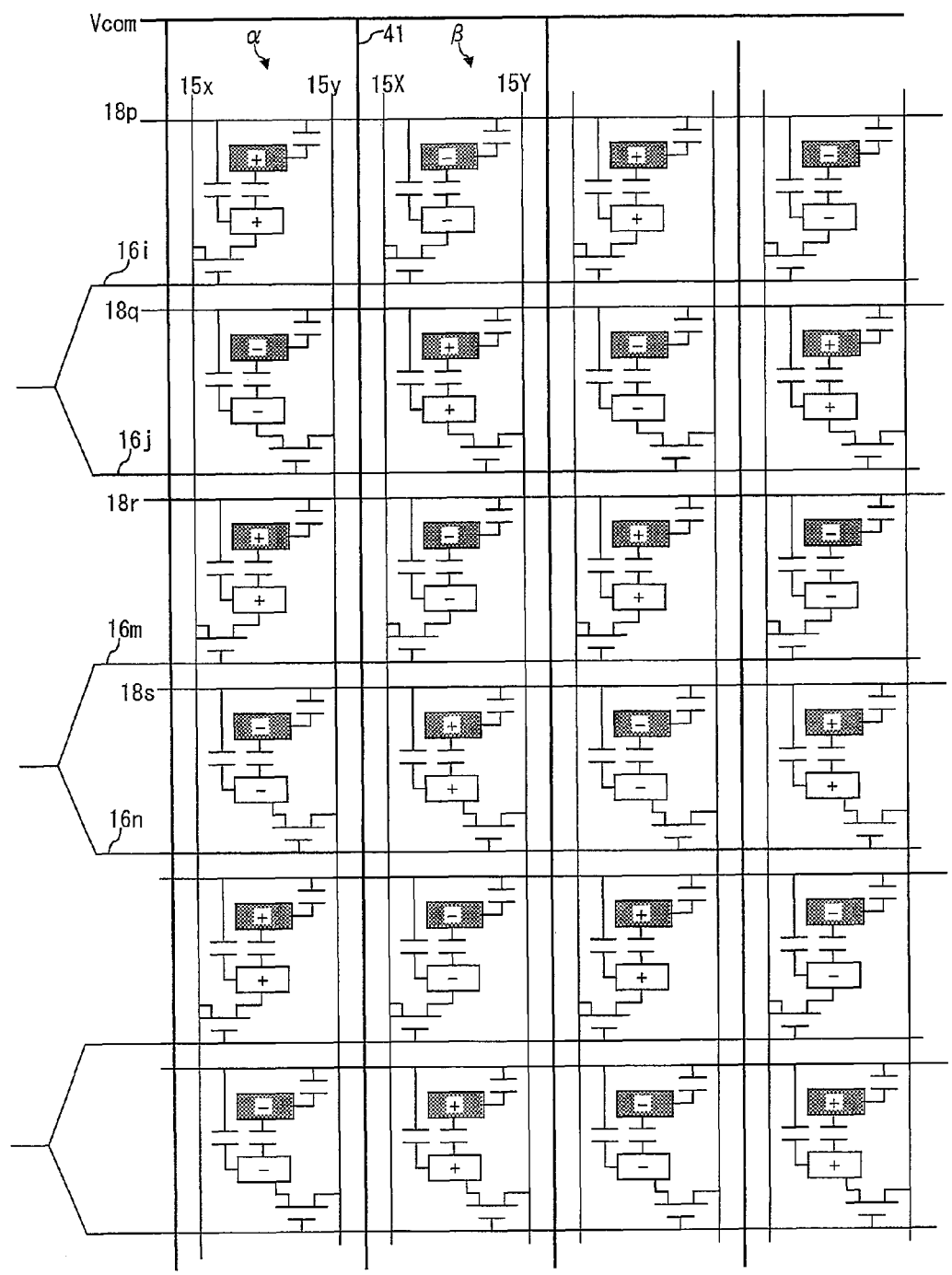
FIG. 25 is a diagram schematically illustrating a display state of the liquid crystal panel being driven by the method of FIG. 24.

The above operation in F1 achieves a state illustrated in FIG. 25. Specifically, a sub-pixel including the pixel electrode 17ia serves as a bright sub-pixel having a positive polarity; a sub-pixel including the pixel electrode 17ib serves as a dark sub-pixel having a positive polarity; a sub-pixel including the pixel electrode 17ja serves as a bright sub-pixel having a negative polarity; a sub-pixel including the pixel electrode 17jb serves as a dark sub-pixel having a negative polarity; a sub-pixel including the pixel electrode 17ma serves as a bright sub-pixel having a positive polarity; a sub-pixel including the pixel electrode 17mb serves as a dark sub-pixel having a positive polarity; a sub-pixel including the pixel electrode 17na serves as a bright sub-pixel having a negative polarity; a sub-pixel including the pixel electrode 17nb serves as a dark sub-pixel having a negative polarity; a sub-pixel including the pixel electrode 17IA serves as a bright sub-pixel having a negative polarity; and a sub-pixel including the pixel electrode 17IB serves as a dark sub-pixel having a negative polarity. The present embodiment thus achieves dot inversion drive in F1.

As illustrated in FIG. 24, in the frame F2, the data signal lines 15x and 15Y are each supplied with (i) a data signal with a negative polarity during the N-th horizontal scanning period (including the scanning period for the scanning signal lines 16i and 16j) and (ii) a data signal with a negative polarity also during the (N+1)-th horizontal scanning period (including the scanning period for the scanning signal lines 16m and 16n), whereas the data signal lines 15y and 15X are each supplied with (i) a data signal with a positive polarity during the N-th horizontal scanning period (including the scanning period for the scanning signal lines 16i and 16j) and (ii) a data signal with a positive polarity also during the (N+1)-th horizontal scanning period (including the scanning period for the scanning signal lines 16m and 16n).

The above operation in F2 achieves a state in which the sub-pixel including the pixel electrode 17ia serves as a bright sub-pixel having a negative polarity; the sub-pixel including the pixel electrode 17ib serves as a dark sub-pixel having a negative polarity; the sub-pixel including the pixel electrode 17ja serves as a bright sub-pixel having a positive polarity; the sub-pixel including the pixel electrode 17jb serves as a dark sub-pixel having a positive polarity; the sub-pixel including the pixel electrode 17ma serves as a bright sub-pixel having a negative polarity; the sub-pixel including the pixel electrode 17mb serves as a dark sub-pixel having a negative polarity; the sub-pixel including the pixel electrode 17na serves as a bright sub-pixel having a positive polarity; the sub-pixel including the pixel electrode 17nb serves as a dark sub-pixel having a positive polarity; the sub-pixel including the pixel electrode 17IA serves as a bright sub-pixel having a positive polarity; and the sub-pixel including the pixel electrode 17IB serves as a dark sub-pixel having a positive polarity. The present embodiment thus achieves dot inversion drive in F2 as well.

The liquid crystal panel of the present embodiment, which includes bright sub-pixels and dark sub-pixels, can display a halftone as described above, and thus improve a viewing angle characteristic.

Figure 26:
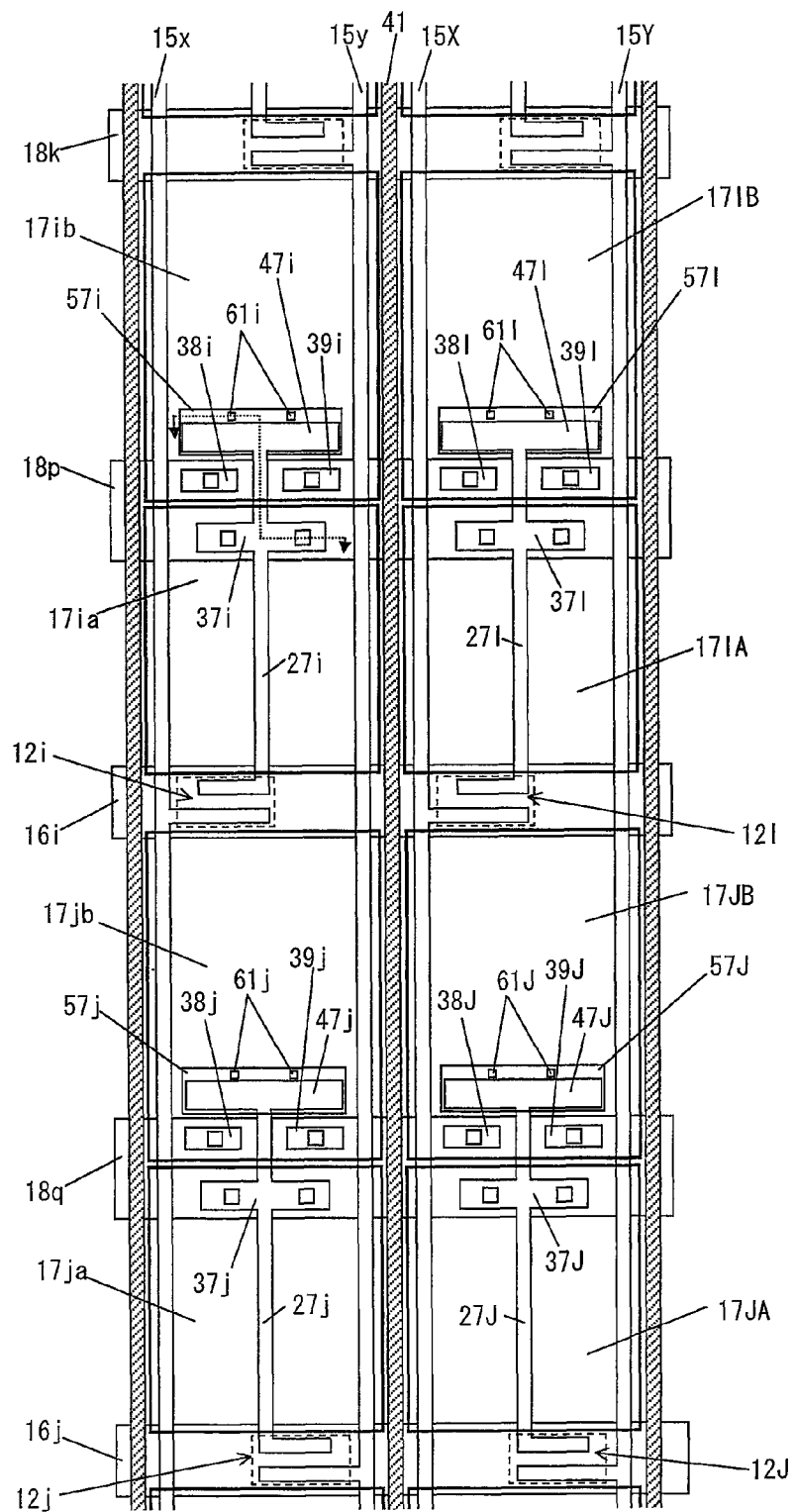
FIG. 26 is a plan view illustrating a configuration of the liquid crystal panel of Embodiment 3.

FIG. 26 is a plan view partially illustrating a liquid crystal panel including the active matrix substrate of FIG. 23. For ease of view, FIG. 26 omits members provided for a color filter substrate (counter substrate), and thus illustrates only members provided for the active matrix substrate.

The liquid crystal panel of FIG. 26 includes: a first pair of (two) data signal lines 15x and 15y and a second pair of (two) data signal lines 15X and 15Y, the data signal lines 15y and 15X being adjacent to each other; a gap line 41 provided between the data signal lines 15y and 15X; scanning signal lines 16i and 16j extending orthogonally to the data signal lines; a transistor 12i provided in the vicinity of an intersection of the data signal line 15x with the scanning signal line 16i; a transistor 12j provided in the vicinity of an intersection of the data signal line 15y with the scanning signal line 16j; a transistor 12I provided in the vicinity of an intersection of the data signal line 15X with the scanning signal line 16i; and a transistor 12J provided in the vicinity of an intersection of the data signal line 15Y with the scanning signal line 16j.

The liquid crystal panel further includes: a pixel electrode 17ia provided so as to overlap (i) a first edge of the scanning signal line 16i which first edge is present upstream in a scanning direction and (ii) the data signal lines 15x and 15y; a pixel electrode 17ib provided upstream from the pixel electrode 17ia in the scanning direction; a pixel electrode 17ja provided so as to overlap (i) a first edge of the scanning signal line 16j which first edge is present upstream in the scanning direction and (ii) the data signal lines 15x and 15y; a pixel electrode 17jb provided upstream from the pixel electrode 17ja in the scanning direction; a pixel electrode 17IA provided so as to overlap (i) the first edge of the scanning signal line 16i which first edge is present upstream in the scanning direction and (ii) the data signal lines 15X and 15Y; a pixel electrode 17IB provided upstream from the pixel electrode 17IA in the scanning direction; a pixel electrode 17JA provided so as to overlap (i) the first edge of the scanning signal line 16j which first edge is present upstream in the scanning direction and (ii) the data signal lines 15X and 15Y; and a pixel electrode 17JB provided upstream from the pixel electrode 17JA in the scanning direction.

The liquid crystal panel includes: a retention capacitor line 18p provided so as to overlap the pixel electrodes 17ia, 17ib, 17IA, and 17IB; and a retention capacitor line 18q provided so as to overlap the pixel electrodes 17ja, 17jb, 17JA, and 17JB.

In a plan view, the pixel electrode 17ia has two edges along a column direction a first one of which stretches beyond the data signal line 15x and a second one of which stretches beyond the data signal line 15y; the pixel electrode 17ib has two edges along the column direction a first one of which stretches beyond the data signal line 15x and a second one of which stretches beyond the data signal line 15y; the pixel electrode 17ja has two edges along the column direction a first one of which stretches beyond the data signal line 15x and a second one of which stretches beyond the data signal line 15y; the pixel electrode 17jb has two edges along the column direction a first one of which stretches beyond the data signal line 15x and a second one of which stretches beyond the data signal line 15y; the pixel electrode 17IA has two edges along the column direction a first one of which stretches beyond the data signal line 15X and a second one of which stretches beyond the data signal line 15Y; the pixel electrode 17IB has two edges along the column direction a first one of which stretches beyond the data signal line 15X and a second one of which stretches beyond the data signal line 15Y; the pixel electrode 17JA has two edges along the column direction a first one of which stretches beyond the data signal line 15X and a second one of which stretches beyond the data signal line 15Y; and the pixel electrode 17JB has two edges along the column direction a first one of which stretches beyond the data signal line 15X and a second one of which stretches beyond the data signal line 15Y.

The gap line 41 extends through (i) a gap between the pixel electrodes 17ia and 17Ia and below them, (ii) a gap between the pixel electrodes 17ib and 17IB and below them, (iii) a gap between the pixel electrodes 17ja and 17JA and below them, and (iv) a gap between the pixel electrodes 17jb and 17JB and below them.

The scanning signal line 16i functions as a gate electrode of the transistor 12i. The transistor 12i has (i) a source electrode connected to the data signal line 15x and (ii) a drain electrode connected to a capacitor electrode 37i via a drain extracting electrode 27i. The capacitor electrode 37i is positioned above the retention capacitor line 18p and connected to the pixel electrode 17ia via two contact holes. The liquid crystal panel includes above the retention capacitor line 18p capacitor electrodes 38i and 39i, each of which is connected to the pixel electrode 17ib via a contact hole. The liquid crystal panel further includes: a capacitor electrode 57i provided below the pixel electrode 17ib in a layer in which the scanning signal line is provided; and a capacitor electrode 47i that is provided in a layer in which the capacitor electrode 37i is provided, that is connected to the capacitor electrode 37i, and that overlaps the capacitor electrode 57i. The scanning signal line 16j functions as a gate electrode of the transistor 12j. The transistor 12j has (i) a source electrode connected to the data signal line 15y and (ii) a drain electrode connected to a capacitor electrode 37j via a drain extracting electrode 27j. The capacitor electrode 37j is positioned above the retention capacitor line 18q and connected to the pixel electrode 17ja via two contact holes. The liquid crystal panel includes above the retention capacitor line 18q capacitor electrodes 38j and 39j, each of which is connected to the pixel electrode 17jb via a contact hole. The liquid crystal panel further includes: a capacitor electrode 57j provided below the pixel electrode 17jb in a layer in which the scanning signal line is provided; and a capacitor electrode 47j that is provided in a layer in which the capacitor electrode 37j is provided, that is connected to the capacitor electrode 37j, and that overlaps the capacitor electrode 57j.

Similarly, the scanning signal line 16i functions as a gate electrode of the transistor 12I. The transistor 12I has (i) a source electrode connected to the data signal line 15X and (ii) a drain electrode connected to a capacitor electrode 37I via a drain extracting electrode 27I. The capacitor electrode 37I is positioned above the retention capacitor line 18p and connected to the pixel electrode 17IA via two contact holes. The liquid crystal panel includes above the retention capacitor line 18p capacitor electrodes 38I and 39I, each of which is connected to the pixel electrode 17IB via a contact hole. The liquid crystal panel further includes: a capacitor electrode 57I provided, below the pixel electrode 17IB, in a layer in which the scanning signal line is provided; and a capacitor electrode 47I that is provided in a layer in which the capacitor electrode 37I is provided, that is connected to the capacitor electrode 37I, and that overlaps the capacitor electrode 57I. The scanning signal line 16j functions as a gate electrode of the transistor 12J. The transistor 12J has (i) a source electrode connected to the data signal line 15Y and (ii) a drain electrode connected to a capacitor electrode 37J via a drain extracting electrode 27J. The capacitor electrode 37J is positioned above the retention capacitor line 18q and connected to the pixel electrode 17JA via two contact holes. The liquid crystal panel includes above the retention capacitor line 18q capacitor electrodes 38J and 39J, each of which is connected to the pixel electrode 17JB via a contact hole. The liquid crystal panel further includes: a capacitor electrode 57J provided, below the pixel electrode 17JB, in a layer in which the scanning signal line is provided; and a capacitor electrode 47J that is provided in a layer in which the capacitor electrode 37J is provided, that is connected to the capacitor electrode 37J, and that overlaps the capacitor electrode 57J.

The liquid crystal panel of the present embodiment is configured such that the retention capacitor line 18p and the capacitor electrode 37i overlap each other via a gate insulating film at a first portion, and thus form the above retention capacitor is at the first portion; the retention capacitor line 18p and the capacitor electrodes 38i and 39i overlap each other via the gate insulating film at a second portion, and thus form the above retention capacitor ib at the second portion; and the capacitor electrodes 47i and 57i overlap each other via the gate insulating film at a third portion, and thus form the above coupling capacitor iab at the third portion. The liquid crystal panel is further configured such that the retention capacitor line 18q and the capacitor electrode 37j overlap each other via the gate insulating film at a fourth portion, and thus form the above retention capacitor ja at the fourth portion; the retention capacitor line 18q and the capacitor electrodes 38j and 39j overlap each other via the gate insulating film at a fifth portion, and thus form the above retention capacitor jb at the fifth portion; and the capacitor electrodes 47j and 57j overlap each other via the gate insulating film at a sixth portion, and thus form the above coupling capacitor jab at the sixth portion. The liquid crystal panel is further configured such that the retention capacitor line 18p and the capacitor electrode 37I overlap each other via the gate insulating film at a seventh portion, and thus form the above retention capacitor IA at the seventh portion; the retention capacitor line 18p and the capacitor electrodes 38I and 39I overlap each other via the gate insulating film at an eighth portion, and thus form the above retention capacitor IB at the eighth portion; and the capacitor electrodes 47I and 57I overlap each other via the gate insulating film at a ninth portion, and thus form the above coupling capacitor IAB at the ninth portion. The liquid crystal panel is further configured such that the retention capacitor line 18q and the capacitor electrode 37J overlap each other via the gate insulating film at a tenth portion, and thus form the above retention capacitor JA at the tenth portion; the retention capacitor line 18q and the capacitor electrodes 38J and 39J overlap each other via the gate insulating film at an eleventh portion, and thus form the above retention capacitor JB at the eleventh portion; and the capacitor electrodes 47J and 57J overlap each other via the gate insulating film at a twelfth portion, and thus form the above coupling capacitor JAB at the twelfth portion.

Figure 27:
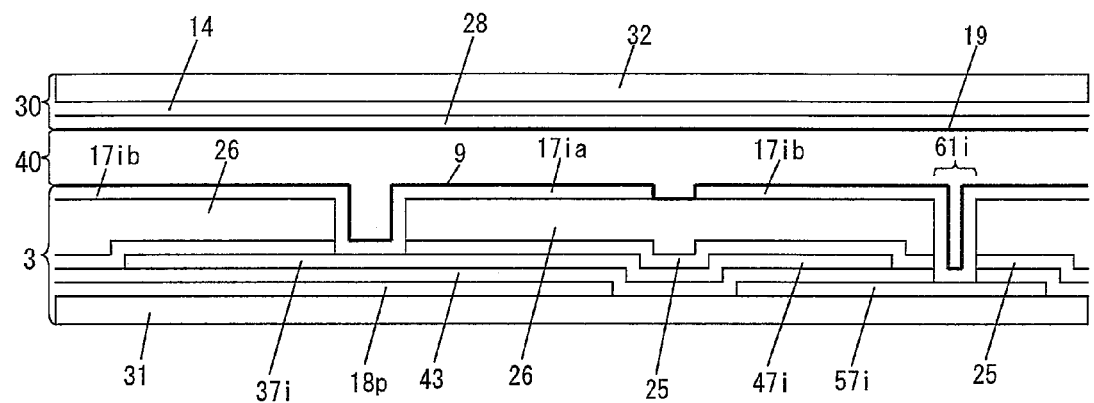
FIG. 27 is a cross-sectional view, taken along a line, of the liquid crystal panel of FIG. 26.

FIG. 27 is a cross-sectional view taken along a line of FIG. 26. As illustrated in FIG. 27, in the active matrix substrate 3, the retention capacitor line 18p and the capacitor electrode 57i are formed on a glass substrate 31 and covered by a gate insulating film 43. The active matrix substrate 3 further includes (although not shown in the cross-sectional view) scanning signal lines below the gate insulating film 43. Formed in a layer above the gate insulating film 43 are the capacitor electrodes 37i and 47i. Further formed above the gate insulating film 43 are (although not shown in the cross-sectional view): semiconductor layers (namely, an i layer and an n+ layer) of each transistor; a source electrode and a drain electrode of each transistor both in contact with the n+ layer; data signal lines; gap lines; and capacitor electrodes. Metal layers including the capacitor electrodes 37i and 47i are covered by an inorganic interlayer insulating film 25, on which an organic interlayer insulating film 26 is formed that is thicker than the inorganic interlayer insulating film 25. Formed on the organic interlayer insulating film 26 are the pixel electrodes 17ia and 17ib, which are each covered by an alignment film 9. The gate insulating film 43, the inorganic interlayer insulating film 25, and the organic interlayer insulating film 26 are each hollowed at a portion at which a contact hole 61i is formed. With this arrangement, the pixel electrode 17ib is in contact with the capacitor electrode 57i. The retention capacitor line 18p and the capacitor electrode 37i overlap each other via the gate insulating film 43 as described above at a portion, at which the above retention capacitor is formed. The capacitor electrodes 47i and 57i overlap each other via the gate insulating film 43 at a portion, at which the above coupling capacitor iab is formed.

Figure 28:
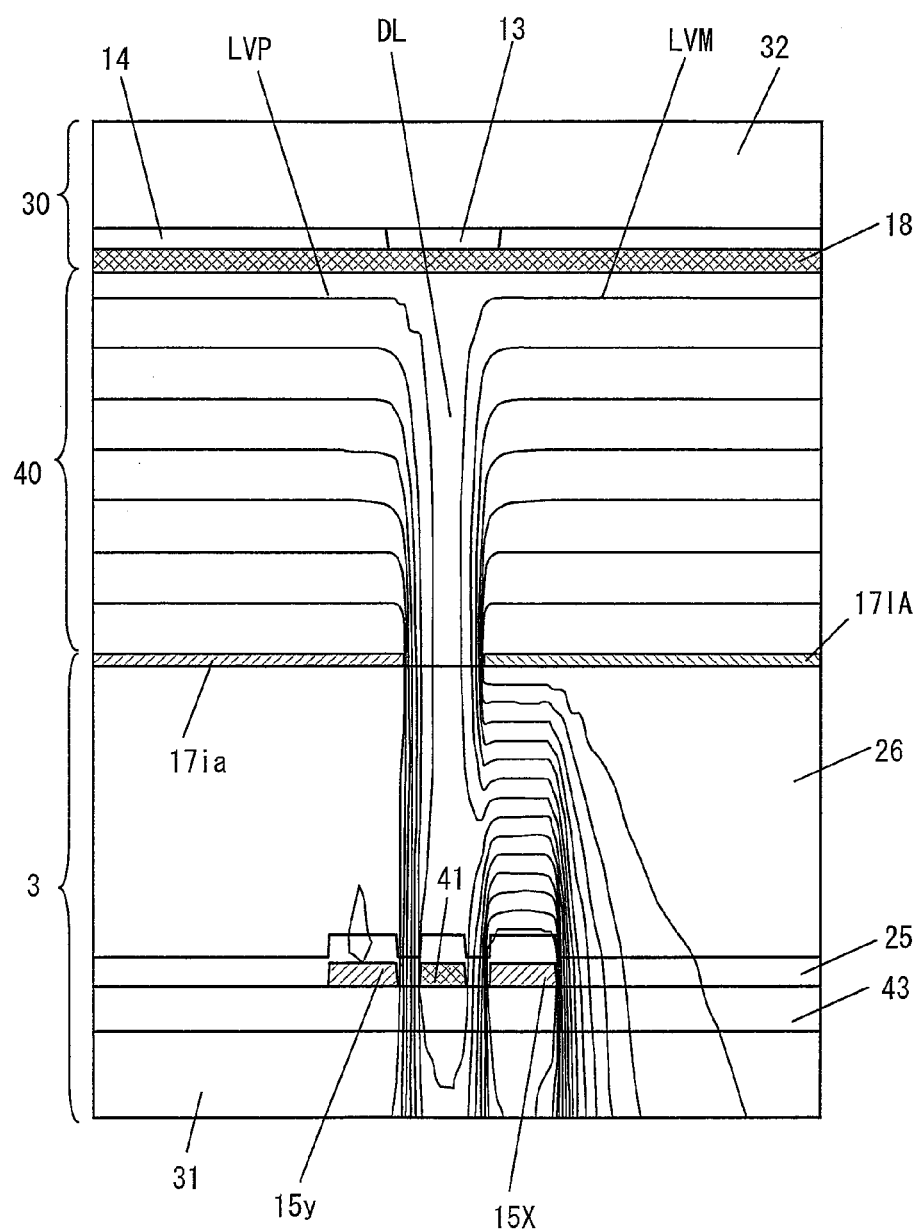
FIG. 28 is a cross-sectional view illustrating how equipotential lines are distributed in the vicinity of a gap line when the liquid crystal panel is being driven.

The liquid crystal panel includes, between the data signal lines 15y and 15X, the gap line 41 to which the Vcom signal is supplied. As such, it is possible, for example, to (i) reduce a cross talk which arises between the pixel electrode 17ia and the data signal line 15X from a parasitic capacitance therebetween, and thus (ii) prevent appearance of a longitudinal shadow. FIG. 28 illustrates equipotential lines (among which LVM is a line corresponding to −0.5 V, and LVP is a line corresponding to +0.5 V) for the liquid crystal panel which is being driven. FIG. 28 illustrates no equipotential lines which extend from above a pixel electrode (17ia) of a first pixel to above a data signal line (15X) corresponding to a second pixel adjacent to the first pixel. This clearly indicates the above effect of reducing a cross talk (shield effect). In the present embodiment, a value of the above parasitic capacitance is reduced by approximately 40%, for example. The effect of reducing a cross talk is particularly significant in a pixel division system, as in the liquid crystal panel of the present embodiment, which controls each pixel so that the pixel has two luminances. This is because a cross talk affects display quality more severely in such a pixel division system than in a pixel non-division system illustrated in FIG. 3.

The liquid crystal panel of the present embodiment, which includes the gap line 41, further reduces a cross talk between two adjacent data signal lines (for example, 15y and 15X) sandwiching the gap line which cross talk arises from a parasitic capacitance between the two adjacent data signal lines. In the present embodiment, a value of such a parasitic capacitance is reduced approximately by half, for example.

[Embodiment 4]

Figure 29:
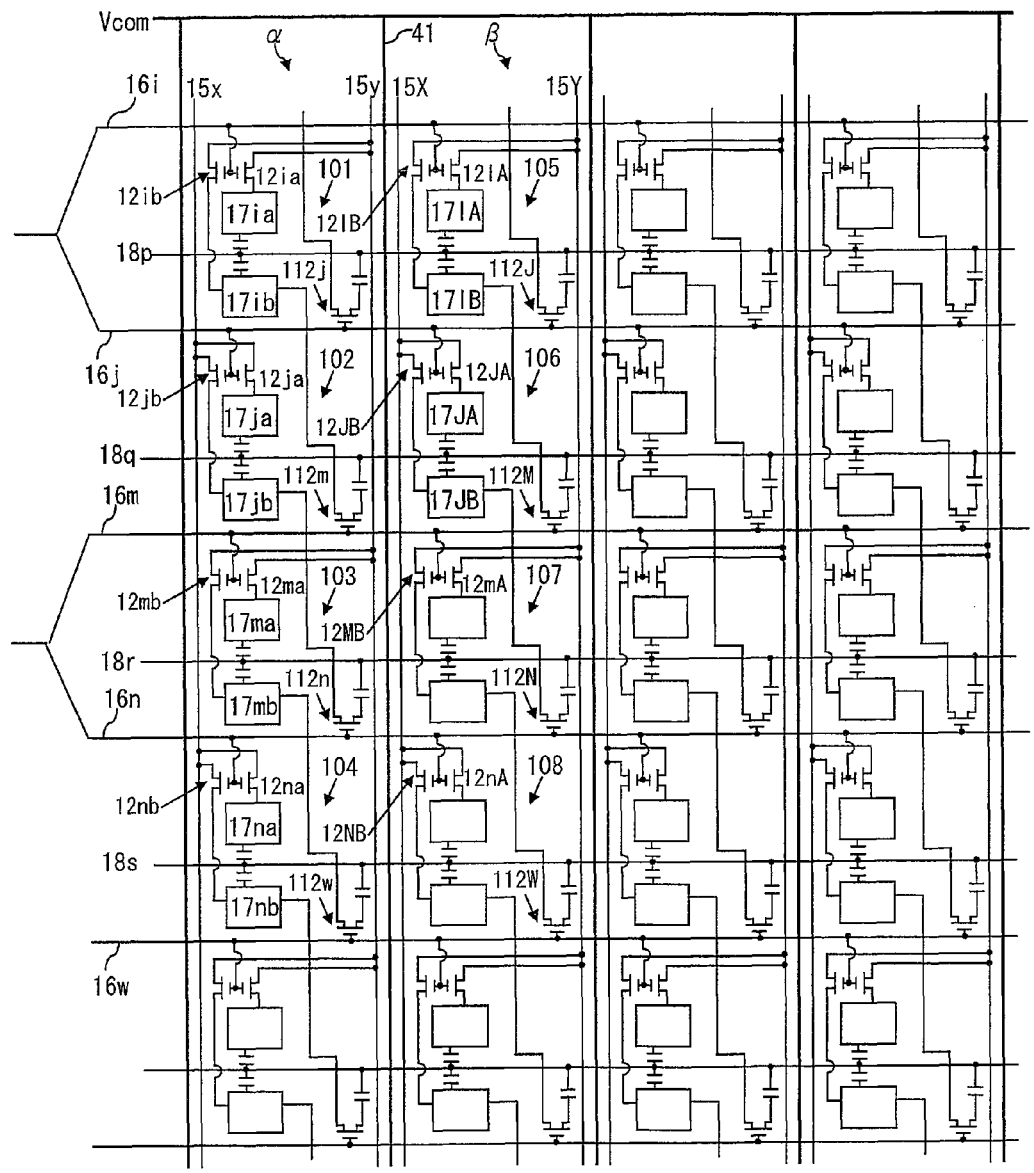
FIG. 29 is an equivalent circuit diagram illustrating a configuration of an active matrix substrate of Embodiment 4.

FIG. 29 is an equivalent circuit diagram partially illustrating an active matrix substrate of Embodiment 4. As illustrated in FIG. 29, the active matrix substrate includes: data signal lines 15x, 15y, 15X, and 15Y arranged in that order; scanning signal lines 16i, 16j, 16m, 16n, and 16w arranged in that order and extending in a row direction (that is, a right-left direction in FIG. 29); a pixel region 101 corresponding to an intersection of the data signal lines 15*x* and 15*y* with the scanning signal line 16*i*; a pixel region 102 corresponding to an intersection of the data signal lines 15*x* and 15*y* with the scanning signal line 16*j*; a pixel region 103 corresponding to an intersection of the data signal lines 15*x* and 15*y* with the scanning signal line 16*m*; a pixel region 104 corresponding to an intersection of the data signal lines 15X and 15*y* with the scanning signal line 16*n*; a pixel region 105 corresponding to an intersection of the data signal lines 15X and 15Y with the scanning signal line 16*i*; a pixel region 106 corresponding to an intersection of the data signal lines 15X and 15Y with the scanning signal line 16*j*; a pixel region 107 corresponding to an intersection of the data signal lines 15X and 15Y with the scanning signal line 16*m*; a pixel region 108 corresponding to an intersection of the data signal lines 15X and 15Y with the scanning signal line 16*n*; a retention capacitor line 18*p* corresponding to the pixel regions 101 and 105; a retention capacitor line 18*q* corresponding to the pixel regions 102 and 106; a retention capacitor line 18*r* corresponding to the pixel regions 103 and 107; and a retention capacitor line 18*s* corresponding to the pixel regions 104 and 108.

The data signal lines 15*x* and 15*y* are provided so as to correspond to a pixel region column α including the pixel regions 101 through 104, whereas the data signal lines 15X and 15Y are provided so as to correspond to a pixel region column β including the pixel regions 105 through 108. Further, there is a gap line 41 provided between the data signal lines 15*y* and 15X to which gap line 41 a Vcom signal is supplied.

Each pixel includes two pixel electrodes: A pixel electrode 17*ia* in the pixel region 101 is connected to the data signal line 15*y* via a transistor 12*ia* connected to the scanning signal line 16*i*. A pixel electrode 17*ib* in the pixel region 101 is connected to the data signal line 15*y* via a transistor 12*ib* connected to the scanning signal line 16*i*. A pixel electrode 17*ja* in the pixel region 102 is connected to the data signal line 15*x* via a transistor 12*ja* connected to the scanning signal line 16*j*. A pixel electrode 17*jb* in the pixel region 102 is connected to the data signal line 15*x* via a transistor 12*jb* connected to the scanning signal line 16*j*. A pixel electrode 17*ma* in the pixel region 103 is connected to the data signal line 15*y* via a transistor 12*ma* connected to the scanning signal line 16*m*. A pixel electrode 17*mb* in the pixel region 103 is connected to the data signal line 15*y* via a transistor 12*mb* connected to the scanning signal line 16*m*. A pixel electrode 17*na* in the pixel region 104 is connected to the data signal line 15*x* via a transistor 12*na* connected to the scanning signal line 16*n*. A pixel electrode 17*nb* in the pixel region 104 is connected to the data signal line 15*x* via a transistor 12*nb* connected to the scanning signal line 16*n*. A pixel electrode 17IA in the pixel region 105 is connected to the data signal line 15Y via a transistor 12IA connected to the scanning signal line 16*i*. A pixel electrode 17IB in the pixel region 105 is connected to the data signal line 15Y via a transistor 12IB connected to the scanning signal line 16*i*. A pixel electrode 17JA in the pixel region 106 is connected to the data signal line 15X via a transistor 12JA connected to the scanning signal line 16*j*. A pixel electrode 17JB in the pixel region 106 is connected to the data signal line 15X via a transistor 12JB connected to the scanning signal line 16*j*. In other words, (i) each odd-numbered pixel region (101 and 103) in the pixel region column α has pixel electrodes connected to the data signal line 15*y*, (ii) each even-numbered pixel region (106 and 108) in the pixel region column β has pixel electrodes connected to the data signal line 15X, and (iii) the data signal line 15*y* and the data signal line 15X are adjacent to each other with the gap line 41 therebetween.

The pixel electrode 17*ib* is connected, via a transistor 112*m* connected to the scanning signal line 16*m*, to a first capacitor electrode which forms a first capacitor together with the retention capacitor line 18*q*. The pixel electrode 17*jb* is connected, via a transistor 112*n* connected to the scanning signal line 16*n*, to a second capacitor electrode which forms a second capacitor together with the retention capacitor line 18*r*. The pixel electrode 17*mb* is connected, via a transistor 112*w* connected to the scanning signal line 16*w*, to a third capacitor electrode which forms a third capacitor together with the retention capacitor line 18*s*. The pixel electrode 17IB is connected, via a transistor 112M connected to the scanning signal line 16*m*, to a fourth capacitor electrode which forms a fourth capacitor together with the retention capacitor line 18*q*. The pixel electrode 17JB is connected, via a transistor 112N connected to the scanning signal line 16*n*, to a fifth capacitor electrode which forms a fifth capacitor together with the retention capacitor line 18*r*.

The scanning signal lines 16*i* and 16*i* are connected to each other inside or outside a panel and simultaneously selected (described below in detail). The scanning signal lines 16*m* and 16*n* are connected to each other inside or outside the panel and simultaneously selected (described below in detail).

The pixel electrode 17*ia* and the retention capacitor line 18*p* form a retention capacitor is therebetween. The pixel electrode 17*ib* and the retention capacitor line 18*p* form a retention capacitor ib therebetween. The first capacitor electrode connected to the pixel electrode 17*ib* via the transistor 112*m* forms a control capacitor ibq together with the retention capacitor line 18*q*. The pixel electrode 17*ja* and the retention capacitor line 18*q* form a retention capacitor ja therebetween. The pixel electrode 17*jb* and the retention capacitor line 18*q* form a retention capacitor jb therebetween. The second capacitor electrode connected to the pixel electrode 17*jb* via the transistor 112*n* forms a control capacitor jbr together with the retention capacitor line 18*r*. The pixel electrode 17*ma* and the retention capacitor line 18*r* form a retention capacitor ma therebetween. The pixel electrode 17*mb* and the retention capacitor line 18*r* form a retention capacitor mb therebetween. The third capacitor electrode connected to the pixel electrode 17*mb* via the transistor 112*w* forms a control capacitor mbs together with the retention capacitor line 18*s*.

Figure 30:
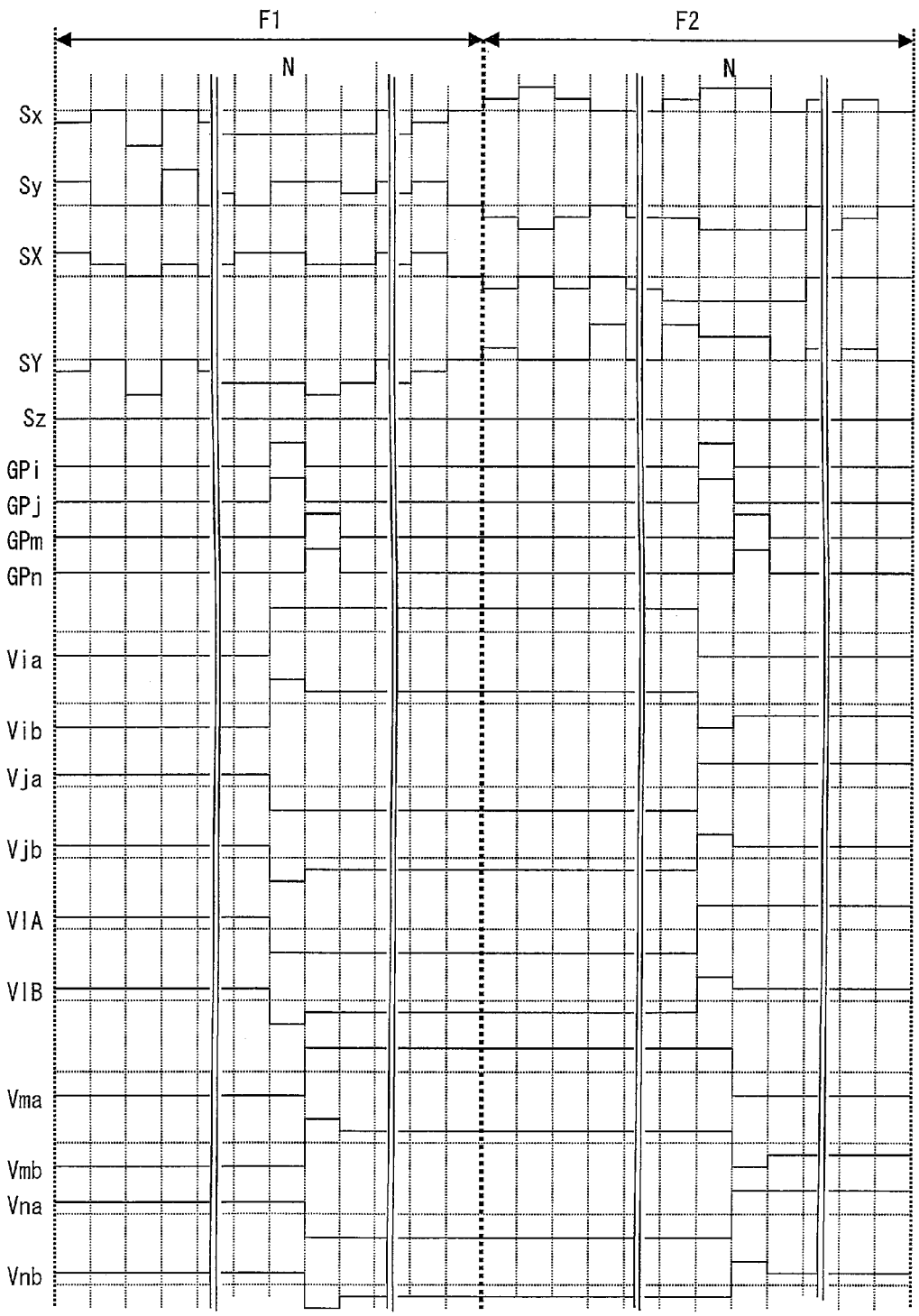
FIG. 30 is a timing chart illustrating a method for driving a liquid crystal panel including the active matrix substrate of FIG. 29.

FIG. 30 is a timing chart illustrating a method (in a normally black mode) for driving a liquid crystal panel of the present embodiment which liquid crystal panel includes the above active matrix substrate. In FIG. 30, Sx, Sy, SX, and SY represent data signals (data signals) supplied to the data signal lines 15*x*, 15*y*, 15X, and 15Y, respectively; Sz represents a signal supplied to the gap line; GPi, GPj, GPm, and GPn represent gate signals supplied to the scanning signal lines 16*i*, 16*j*, 16*m*, and 16*n*, respectively; and Via, Vib, Vja, Vjb, VIA, VIB, Vma, Vmb, Vna, and Vnb represent potentials of the pixel electrodes 17*ia*, 17*ib*, 17*ja*, 17*jb*, 17IA, 17IB, 17*ma*, 17*mb*, 17*na*, and 17*nb*, respectively.

As illustrated in FIG. 30, the driving method is carried out as follows: Two scanning signal lines are simultaneously selected at a time. Each data signal line is supplied with a data signal having a polarity which is inverted every frame period (1 V). Within an identical horizontal scanning period (H), (i) two data signal lines (15*x* and 15*y*; 15X and 15Y) corresponding to an identical pixel column are supplied with respective data signals which are opposite to each other in polarity, and (ii) two adjacent data signal lines (15*y* and 15X) sandwiching a gap line are supplied with respective data signals which are identical to each other in polarity. The gap line is supplied with a constant potential signal (Vcom signal) having a potential identical to a potential of a common electrode. Each retention capacitor line is also supplied with the Vcom signal.

Specifically, in F1 of consecutive frames F1 and F2, the data signal lines 15x and 15Y are each supplied with (i) a data signal with a negative polarity during an N-th horizontal scanning period (including a scanning period for the scanning signal lines 16i and 16j) and (ii) a data signal with a negative polarity also during an (N+1)-th horizontal scanning period (including a scanning period for the scanning signal lines 16m and 16n), whereas the data signal lines 15y and 15X are each supplied with (i) a data signal with a positive polarity during the N-th horizontal scanning period (including the scanning period for the scanning signal lines 16i and 16j) and (ii) a data signal with a positive polarity also during the (N+1)-th horizontal scanning period (including the scanning period for the scanning signal lines 16m and 16n).

The above driving method achieves the following operation: As illustrated in FIG. 30, the pixel electrode 17ia has a potential that is positive in polarity and that is equal to a data signal, whereas the pixel electrode 17ib, which is connected to a retention capacitor line (having a potential of Vcom) via a control capacitor during the (N+1)-th horizontal scanning period, has a potential that is positive in polarity and that is not greater in absolute value than the data signal. The pixel electrode 17ja has a potential that is negative in polarity and that is equal to a data signal, whereas the pixel electrode 17jb, which is connected to a retention capacitor line via a control capacitor during the (N+1)-th horizontal scanning period, has a potential that is negative in polarity and that is not greater in absolute value than the data signal. The pixel electrode 17ma has a potential that is positive in polarity and that is equal to a data signal, whereas the pixel electrode 17mb, which is connected to a retention capacitor line via a control capacitor during an (N+2)-th horizontal scanning period, has a potential that is positive in polarity and that is not greater in absolute value than the data signal. The pixel electrode 17na has a potential that is negative in polarity and that is equal to a data signal, whereas the pixel electrode 17nb, which is connected to a retention capacitor line via a control capacitor during the (N+2)-th horizontal scanning period, has a potential that is negative in polarity and that is not greater in absolute value than the data signal. The pixel electrode 17IA has a potential that is negative in polarity and that is equal to a data signal, whereas the pixel electrode 17IB, which is connected to a retention capacitor line via a control capacitor during the (N+1)-th horizontal scanning period, has a potential that is negative in polarity and that is not greater in absolute value than the data signal.

The above operation in F1 achieves a state illustrated in FIG. 31. Specifically, a sub-pixel including the pixel electrode 17ia serves as a bright sub-pixel having a positive polarity; a sub-pixel including the pixel electrode 17ib serves as a dark sub-pixel having a positive polarity; a sub-pixel including the pixel electrode 17ja serves as a bright sub-pixel having a negative polarity; a sub-pixel including the pixel electrode 17jb serves as a dark sub-pixel having a negative polarity; a sub-pixel including the pixel electrode 17ma serves as a bright sub-pixel having a positive polarity; a sub-pixel including the pixel electrode 17mb serves as a dark sub-pixel having a positive polarity; a sub-pixel including the pixel electrode 17na serves as a bright sub-pixel having a negative polarity; a sub-pixel including the pixel electrode 17nb serves as a dark sub-pixel having a negative polarity; a sub-pixel including the pixel electrode 17IA serves as a bright sub-pixel having a negative polarity; and a sub-pixel including the pixel electrode 17IB serves as a dark sub-pixel having a negative polarity. The present embodiment thus achieves dot inversion drive in F1.

As illustrated in FIG. 30, in the frame F2, the data signal lines 15x and 15Y are each supplied with (i) a data signal with a positive polarity during the N-th horizontal scanning period (including the scanning period for the scanning signal lines 16i and 16j) and (ii) a data signal with a positive polarity also during the (N+1)-th horizontal scanning period (including the scanning period for the scanning signal lines 16m and 16n), whereas the data signal lines 15y and 15X are each supplied with (i) a data signal with a negative polarity during the N-th horizontal scanning period (including the scanning period for the scanning signal lines 16i and 16j) and (ii) a data signal with a negative polarity also during the (N+1)-th horizontal scanning period (including the scanning period for the scanning signal lines 16m and 16n).

The above operation in F2 achieves a state in which the sub-pixel including the pixel electrode 17ia serves as a bright sub-pixel having a negative polarity; the sub-pixel including the pixel electrode 17ib serves as a dark sub-pixel having a negative polarity; the sub-pixel including the pixel electrode 17ja serves as a bright sub-pixel having a positive polarity; the sub-pixel including the pixel electrode 17jb serves as a dark sub-pixel having a positive polarity; the sub-pixel including the pixel electrode 17ma serves as a bright sub-pixel having a negative polarity; the sub-pixel including the pixel electrode 17mb serves as a dark sub-pixel having a negative polarity; the sub-pixel including the pixel electrode 17na serves as a bright sub-pixel having a positive polarity; the sub-pixel including the pixel electrode 17nb serves as a dark sub-pixel having a positive polarity; the sub-pixel including the pixel electrode 17IA serves as a bright sub-pixel having a positive polarity; and the sub-pixel including the pixel electrode 17IB serves as a dark sub-pixel having a positive polarity. The present embodiment thus achieves dot inversion drive in F2 as well.

The liquid crystal panel of FIG. 31, which includes bright sub-pixels and dark sub-pixels, can display a halftone as described above, and thus improve a viewing angle characteristic. Further, unlike in the liquid crystal panel illustrated in FIG. 25, pixel electrodes for dark sub-pixels in the liquid crystal panel of FIG. 31 are not electrically floating. As such, it is possible to prevent, for example, image sticking in pixels.

Figure 32:
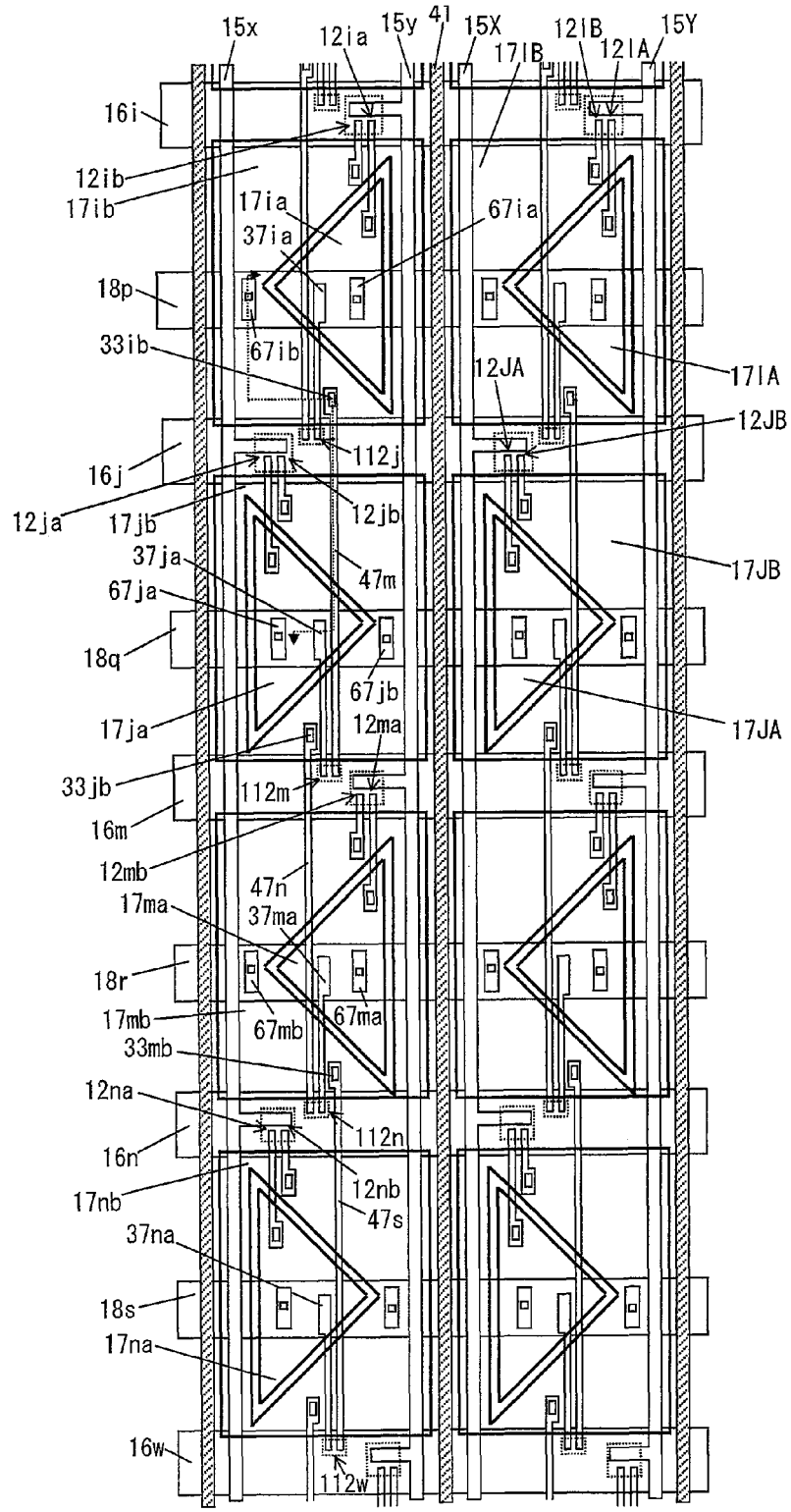
FIG. 32 is a plan view illustrating a configuration of the liquid crystal panel of Embodiment 4.

FIG. 32 is a plan view partially illustrating a liquid crystal panel including the active matrix substrate of FIG. 29. For ease of view, FIG. 32 omits members provided for a color filter substrate (counter substrate), and thus illustrates only members provided for the active matrix substrate.

The liquid crystal panel of FIG. 32 includes: a first pair of (two) data signal lines 15x and 15y and a second pair of (two) data signal lines 15X and 15Y, the data signal lines 15y and 15X being adjacent to each other; a gap line 41 provided between the data signal lines 15y and 15X; scanning signal lines 16i, 16j, 16m, 16n, and 16w provided in that order and extending orthogonally to the data signal lines; transistors 12ia and 12ib provided in the vicinity of an intersection of the data signal line 15y with the scanning signal line 16i; transistors 12ja and 12jb provided in the vicinity of an intersection of the data signal line 15x with the scanning signal line 16j; transistors 12IA and 12IB provided in the vicinity of an intersection of the data signal line 15Y with the scanning signal line 16i; transistors 12JA and 12JB provided in the vicinity of an intersection of the data signal line 15X with the scanning signal line 16j; a transistor 112j provided, above the scanning signal line 16j, between the data signal lines 15x and

15y; a transistor 112m provided, above the scanning signal line 16m, between the data signal lines 15x and 15y; a transistor 112n provided, above the scanning signal line 16n, between the data signal lines 15x and 15y; and a transistor 112w provided above the scanning signal line 16w between the data signal lines 15x and 15y.

The liquid crystal panel includes a pixel electrode 17ia and a pixel electrode 17ib. The pixel electrode 17ia is in a shape of a right triangle having (i) a first leg which forms an angle of 45° with respect to the scanning signal lines (that is, counterclockwise from a scanning signal line likened to a clock hand pointing in a direction indicative of three o'clock) and (ii) a second leg which forms an angle of 315° with respect to the scanning signal lines. The pixel electrode 17ib is in such a shape as to (i) surround the pixel electrode 17ia and (ii) overlap the data signal lines 15x and 15y. The pixel electrode 17ib has a first edge present upstream in a scanning direction which first edge overlaps a second edge of the scanning signal line 16i which second edge is present downstream in the scanning direction. The liquid crystal panel further includes a pixel electrode 17ja and a pixel electrode 17jb. The pixel electrode 17ja is in a shape of a right triangle having (i) a first leg which forms an angle of 135° with respect to the scanning signal lines (that is, counterclockwise from a scanning signal line likened to a clock hand pointing in the direction indicative of three o'clock) and (ii) a second leg which forms an angle of 225° with respect to the scanning signal lines. The pixel electrode 17jb is in such a shape as to (i) surround the pixel electrode 17ja and (ii) overlap the data signal lines 15x and 15y. The pixel electrode 17jb has a first edge present upstream in the scanning direction which first edge overlaps a second edge of the scanning signal line 16j which second edge is present downstream in the scanning direction. The liquid crystal panel includes a pixel electrode 17ma and a pixel electrode 17mb. The pixel electrode 17ma is in the shape of a right triangle having (i) a first leg which forms an angle of 45° with respect to the scanning signal lines and (ii) a second leg which forms an angle of 315° with respect to the scanning signal lines. The pixel electrode 17mb is in such a shape as to (i) surround the pixel electrode 17ma and (ii) overlap the data signal lines 15x and 15y. The pixel electrode 17mb has a first edge present upstream in the scanning direction which first edge overlaps a second edge of the scanning signal line 16m which second edge is present downstream in the scanning direction. The liquid crystal panel further includes a pixel electrode 17na and a pixel electrode 17nb. The pixel electrode 17na is in the shape of a right triangle having (i) a first leg which forms an angle of 135° with respect to the scanning signal lines and (ii) a second leg which forms an angle of 225° with respect to the scanning signal lines. The pixel electrode 17nb is in such a shape as to (i) surround the pixel electrode 17na and (ii) overlap the data signal lines 15x and 15y. The pixel electrode 17nb has a first edge present upstream in the scanning direction which first edge overlaps a second edge of the scanning signal line 16n which second edge is present downstream in the scanning direction. The liquid crystal panel includes a pixel electrode 17IA and a pixel electrode 17IB. The pixel electrode 17IA is in the shape of a right triangle having (i) a first leg which forms an angle of 45° with respect to the scanning signal lines and (ii) a second leg which forms an angle of 315° with respect to the scanning signal lines. The pixel electrode 17IB is in such a shape as to (i) surround the pixel electrode 17IA and (ii) overlap the data signal lines 15X and 15Y. The pixel electrode 17IB has a first edge present upstream in the scanning direction which first edge overlaps the second edge of the scanning signal line 16i which second edge is present downstream in the scanning direction. The liquid crystal panel further includes a pixel electrode 17JA and a pixel electrode 17JB. The pixel electrode 17JA is in the shape of a right triangle having (i) a first leg which forms an angle of 135° with respect to the scanning signal lines and (ii) a second leg which forms an angle of 225° with respect to the scanning signal lines. The pixel electrode 17JB is in such a shape as to (i) surround the pixel electrode 17JA and (ii) overlap the data signal lines 15X and 15Y. The pixel electrode 17JB has a first edge present upstream in the scanning direction which first edge overlaps the second edge of the scanning signal line 16j which second edge is present downstream in the scanning direction.

The liquid crystal panel includes: a retention capacitor line 18p provided so as to overlap the pixel electrodes 17ia, 17ib, 17IA, and 17IB; a retention capacitor line 18q provided so as to overlap the pixel electrodes 17ja, 17jb, 17JA, and 17JB; and a retention capacitor line 18r provided so as to overlap the pixel electrodes 17ma and 17mb.

In a plan view, the pixel electrode 17ib has two edges along a column direction a first one of which stretches beyond the data signal line 15x and a second one of which stretches beyond the data signal line 15y. The pixel electrode 17jb has two edges along the column direction a first one of which stretches beyond the data signal line 15x and a second one of which stretches beyond the data signal line 15y. The pixel electrode 17IB has two edges along the column direction a first one of which stretches beyond the data signal line 15X and a second one of which stretches beyond the data signal line 15Y. The pixel electrode 17JB has two edges along the column direction a first one of which stretches beyond the data signal line 15X and a second one of which stretches beyond the data signal line 15Y.

The gap line 41 extends through (i) a gap between the pixel electrodes 17ib and 17IB and below them and (ii) a gap between the pixel electrodes 17jb and 17JB and below them.

The scanning signal line 16i functions as a gate electrode of each of the transistors 12ia and 12ib. The transistor 12ia has (i) a source electrode connected to the data signal line 15y and (ii) a drain electrode connected to the pixel electrode 17ia via a drain extracting electrode and a contact hole. The transistor 12ib has (i) a source electrode connected to the data signal line 15y and (ii) a drain electrode connected to the pixel electrode 17ib via a drain extracting electrode and a contact hole. The liquid crystal panel includes capacitor electrodes 37ia, 67ia, and 67ib above the retention capacitor line 18p. The capacitor electrode 37ia is connected to a source electrode of the transistor 112j. The capacitor electrode 67ia is connected to the pixel electrode 17ia via a contact hole. The capacitor electrode 67ib is connected to the pixel electrode 17ib via a contact hole. The pixel electrode 17ib is connected to a relay electrode 47m via a contact hole 33ib. The relay electrode 47m extends from below the pixel electrode 17ib across the scanning signal line 16j and the retention capacitor line 18q to above the scanning signal line 16m so as to be connected to a drain electrode of the transistor 112m.

The scanning signal line 16j functions as a gate electrode of each of the transistors 12ja and 12jb. The transistor 12ja has (i) a source electrode connected to the data signal line 15x and (ii) a drain electrode connected to the pixel electrode 17ja via a drain extracting electrode and a contact hole. The transistor 12jb has (i) a source electrode connected to the data signal line 15x and (ii) a drain electrode connected to the pixel electrode 17jb via a drain extracting electrode and a contact hole. The liquid crystal panel includes capacitor electrodes 37ja, 67ja, and 67jb above the retention capacitor line 18q. The capacitor electrode 37ja is connected to a source electrode of the transistor 112m. The capacitor electrode 67ja is connected to the pixel electrode 17ja via a contact hole. The capacitor electrode 67jb is connected to the pixel electrode 17jb via a contact hole. The pixel electrode 17jb is connected to a relay electrode 47n via a contact hole 33jb. The relay electrode 47n extends from below the pixel electrode 17jb across the scanning signal line 16m and the retention capacitor line 18r to above the scanning signal line 16n so as to be connected to a drain electrode of the transistor 112n.

The scanning signal line 16m functions as a gate electrode of each of the transistors 12ma and 12mb. The transistor 12ma has (i) a source electrode connected to the data signal line 15y and (ii) a drain electrode connected to the pixel electrode 17ma via a drain extracting electrode and a contact hole. The transistor 12mb has (i) a source electrode connected to the data signal line 15y and (ii) a drain electrode connected to the pixel electrode 17mb via a drain extracting electrode and a contact hole. The liquid crystal panel includes capacitor electrodes 37ma, 67ma, and 67mb above the retention capacitor line 18r. The capacitor electrode 37ma is connected to a source electrode of the transistor 112n. The capacitor electrode 67ma is connected to the pixel electrode 17ma via a contact hole. The capacitor electrode 67mb is connected to the pixel electrode 17mb via a contact hole. The pixel electrode 17mb is connected to a relay electrode 47s via a contact hole 33mb. The relay electrode 47s extends from below the pixel electrode 17mb across the scanning signal line 16n and the retention capacitor line 18s to above the scanning signal line 16w so as to be connected to a drain electrode of the transistor 112w.

The liquid crystal panel of the present embodiment is configured such that the retention capacitor line 18p and the capacitor electrode 67ia overlap each other via a gate insulating film at a first portion, and thus form the above retention capacitor is at the first portion; the retention capacitor line 18p and the capacitor electrode 67ib overlap each other via the gate insulating film at a second portion, and thus form the above retention capacitor ib at the second portion; and the retention capacitor line 18q and the capacitor electrode 37ja overlap each other via the gate insulating film at a third portion, and thus form the above control capacitor ibq at the third portion. The liquid crystal panel is further configured such that the retention capacitor line 18q and the capacitor electrode 67ja overlap each other via the gate insulating film at a fourth portion, and thus form the above retention capacitor ja at the fourth portion; the retention capacitor line 18q and the capacitor electrode 67jb overlap each other via the gate insulating film at a fifth portion, and thus form the above retention capacitor jb at the fifth portion; and the retention capacitor line 18r and the capacitor electrode 37ma overlap each other via the gate insulating film at a sixth portion, and thus form the above control capacitor jbr at the sixth portion. The liquid crystal panel is further configured such that the retention capacitor line 18r and the capacitor electrode 67ma overlap each other via the gate insulating film at a seventh portion, and thus form the above retention capacitor ma at the seventh portion; the retention capacitor line 18r and the capacitor electrode 67mb overlap each other via the gate insulating film at an eighth portion, and thus form the above retention capacitor mb at the eighth portion; and the retention capacitor line 18s and the capacitor electrode 37na overlap each other via the gate insulating film at a ninth portion, and thus form the above control capacitor mbs at the ninth portion.

FIG. 33 is a cross-sectional view taken along a line of FIG. 32. As illustrated in FIG. 33, in the active matrix substrate 3, the retention capacitor lines 18p and 18q and the scanning signal line 16j are formed on a glass substrate 31 and covered by a gate insulating film 43. Formed in a layer above the gate insulating film 43 are the capacitor electrode 67ia, the relay line 47m, and the capacitor electrode 37ja. Further formed above the gate insulating film 43 are (although not shown in the cross-sectional view): semiconductor layers (namely, an i layer and an n+ layer) of each transistor; a source electrode and a drain electrode of each transistor both in contact with the n+ layer; data signal lines; gap lines; and capacitor electrodes. Metal layers such as the relay line 47m and the capacitor electrode 37ja are covered by an inorganic interlayer insulating film 25, on which an organic interlayer insulating film 26 is formed that is thicker than the inorganic interlayer insulating film 25. Formed on the organic interlayer insulating film 26 are the pixel electrodes 17ib, 17jb, and 17ja, which are each covered by an alignment film 9. The inorganic interlayer insulating film 25 and the organic interlayer insulating film 26 are each hollowed at a portion at which a contact hole 33ib is formed. With this arrangement, the pixel electrode 17ib is in contact with the relay line 47m. The retention capacitor line 18p and the capacitor electrode 67ia overlap each other via the gate insulating film 43 as described above at a portion, at which the retention capacitor is formed. The retention capacitor line 18q and the capacitor electrode 37ja overlap each other via the gate insulating film 43 at a portion, at which the control capacitor ibq is formed.

The liquid crystal panel includes, between the data signal lines 15y and 15X, the gap line 41 to which the Vcom signal is supplied. As such, it is possible, for example, to (i) reduce a cross talk which arises between the pixel electrode 17ib and the data signal line 15X from a parasitic capacitance therebetween, and thus (ii) prevent appearance of a longitudinal shadow. The effect of reducing a cross talk is particularly significant in a pixel division system, as in the liquid crystal panel of the present embodiment, which controls each pixel so that the pixel has two luminances. This is because a cross talk affects display quality more severely in such a pixel division system than in a pixel non-division system illustrated in FIG. 3.

The liquid crystal panel of the present embodiment, which includes the gap line 41, further reduces a cross talk between two adjacent data signal lines (for example, 15y and 15X) separated from each other by the gap line which cross talk arises from a parasitic capacitance between the two adjacent data signal lines.

Figure 34:
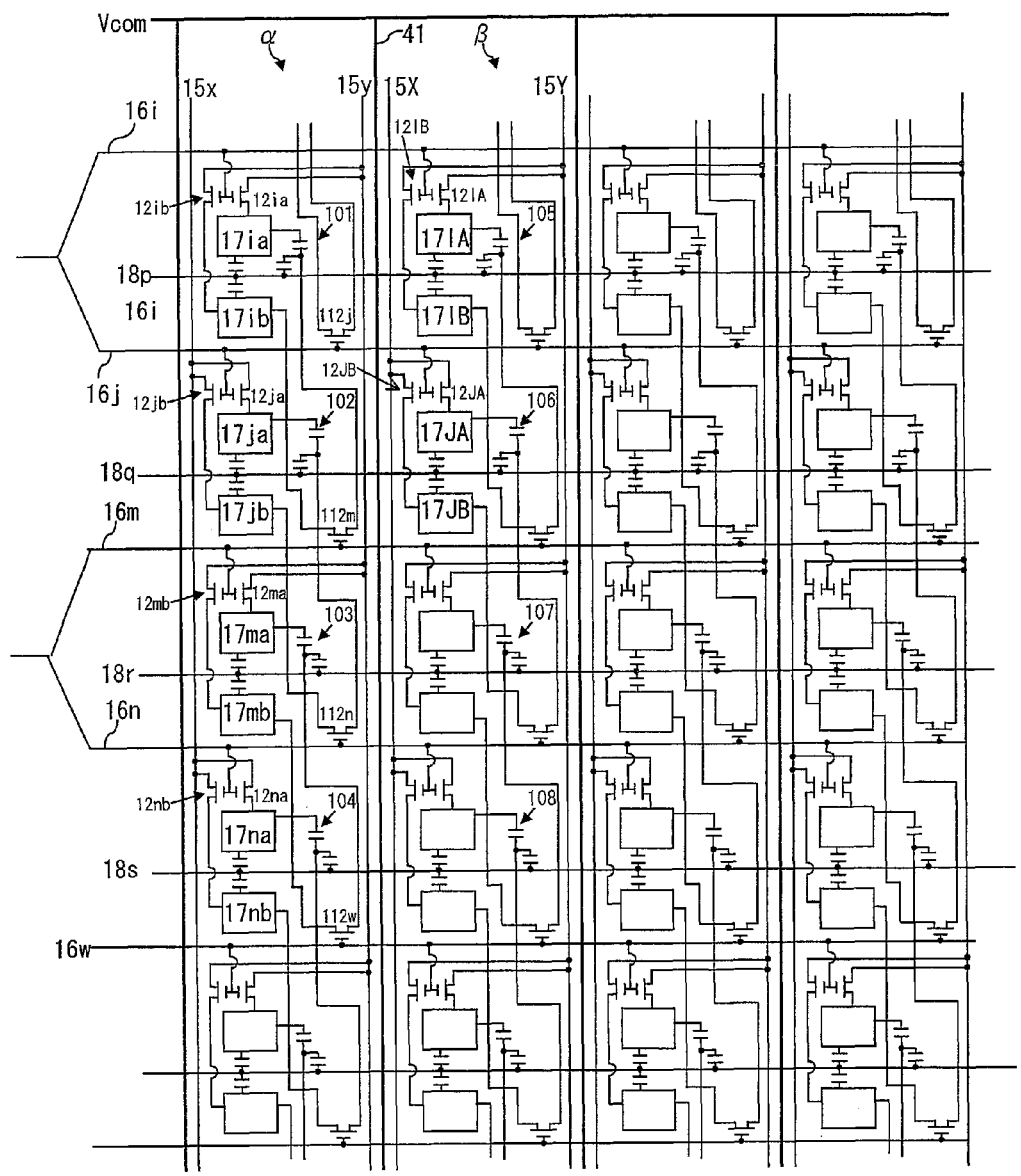
FIG. 34 is an equivalent circuit diagram illustrating a configuration of an active matrix substrate of Embodiment 5.

The active matrix substrate of FIG. 29 can be varied as in FIG. 34. FIG. 34 illustrates an active matrix substrate that has data signal lines, scanning signal lines, gap lines, retention capacitor lines, and pixel regions, all of which are identical to their respective equivalents included in the active matrix substrate of FIG. 29. The active matrix substrate of FIG. 34 is also identical to that of FIG. 29 in how transistors are positioned and in how pixel electrodes are positioned in the pixel regions.

The pixel electrode 17ib is connected, via the transistor 112m connected to the scanning signal line 16m, to a first capacitor electrode which forms a capacitor together with each of the pixel electrode 17ia and the retention capacitor line 18p. The pixel electrode 17jb is connected, via the transistor 112n connected to the scanning signal line 16n, to a second capacitor electrode which forms a capacitor together with each of the pixel electrode 17ja and the retention capacitor line 18q. The pixel electrode 17mb is connected, via the transistor 112w connected to the scanning signal line 16w, to a third capacitor electrode which forms a capacitor together with each of the pixel electrode 17ma and the retention capacitor line 18r.

The pixel electrode 17ia and the retention capacitor line 18p form a retention capacitor is therebetween. The pixel electrode 17*ib* and the retention capacitor line 18*p* form a retention capacitor ib therebetween. The first capacitor electrode connected to the pixel electrode 17*ib* via the transistor 112*m* forms a control capacitor ibp together with the retention capacitor line 18*p*. The first capacitor electrode and the pixel electrode 17*ia* form a coupling capacitor iab therebetween. The pixel electrode 17*ja* and the retention capacitor line 18*q* form a retention capacitor ja therebetween. The pixel electrode 17*jb* and the retention capacitor line 18*q* form a retention capacitor jb therebetween. The second capacitor electrode connected to the pixel electrode 17*jb* via the transistor 112*n* forms a control capacitor jbq together with the retention capacitor line 18*q*. The second capacitor electrode and the pixel electrode 17*ja* form a coupling capacitor jab therebetween. The pixel electrode 17*ma* and the retention capacitor line 18*r* form a retention capacitor ma therebetween. The pixel electrode 17*mb* and the retention capacitor line 18*r* form a retention capacitor mb therebetween. The third capacitor electrode connected to the pixel electrode 17*mb* via the transistor 112*w* forms a control capacitor mbr together with the retention capacitor line 18*r*. The third capacitor electrode and the pixel electrode 17*ma* form a coupling capacitor mab therebetween.

Figure 35:
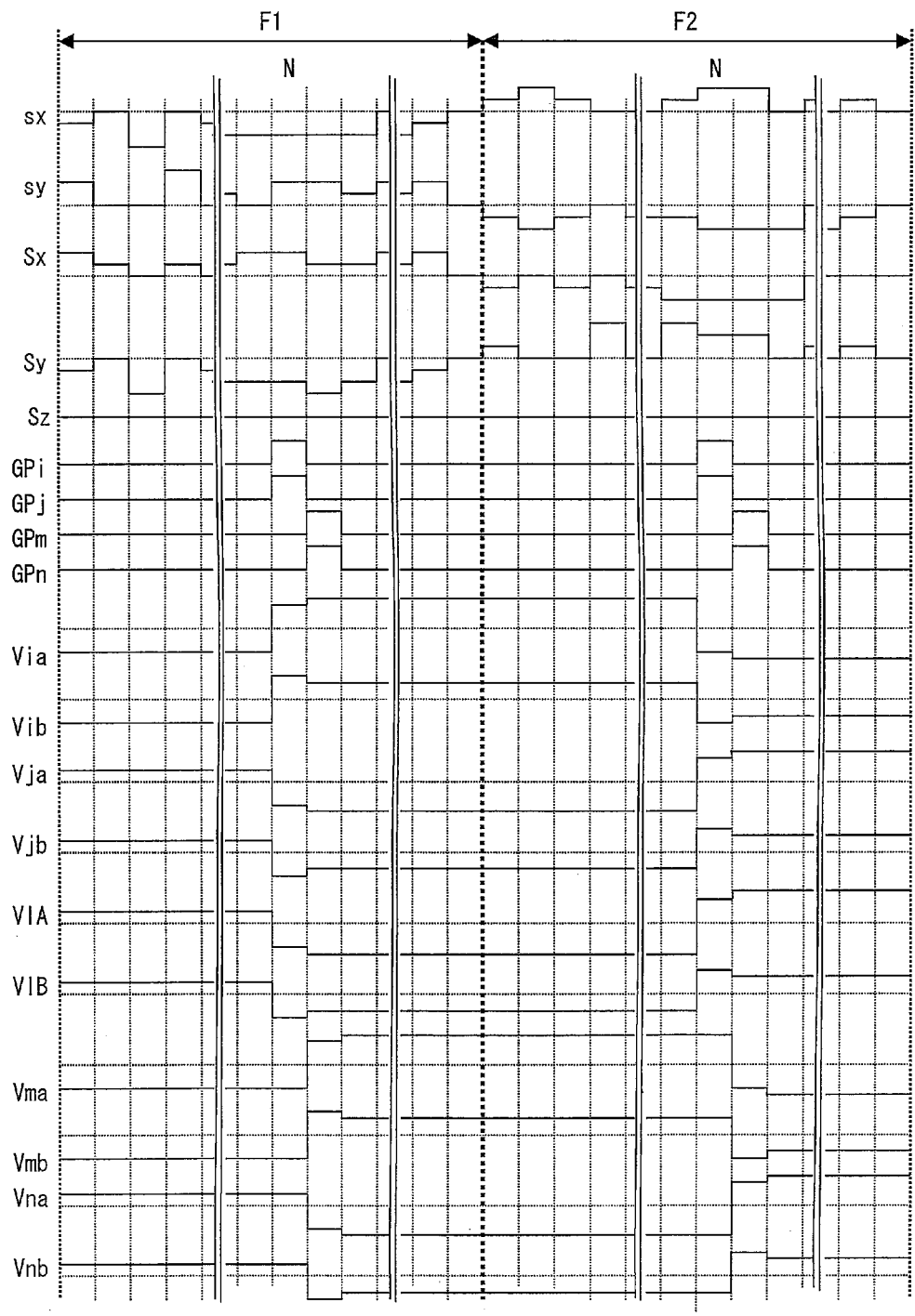
FIG. 35 is a timing chart illustrating a method for driving a liquid crystal panel including the active matrix substrate of FIG. 34.

FIG. 35 is a timing chart illustrating a method (in a normally black mode) for driving a liquid crystal panel of the present embodiment which liquid crystal panel includes the above active matrix substrate. In FIG. 35, Sx, Sy, SX, and SY represent data signals (data signals) supplied to the data signal lines 15*x*, 15*y*, 15X, and 15Y, respectively; Sz represents a signal supplied to the gap line; GPi, GPj, GPm, and GPn represent gate signals supplied to the scanning signal lines 16*i*, 16*j*, 16*m*, and 16*n*, respectively; and Via, Vib, Vja, Vjb, VIA, VIB, Vma, Vmb, Vna, and Vnb represent potentials of the pixel electrodes 17*ia*, 17*ib*, 17*ja*, 17*jb*, 17IA, 17IB, 17*ma*, 17*mb*, 17*na*, and 17*nb*, respectively.

As illustrated in FIG. 35, the driving method is carried out as follows: Two scanning signal lines are simultaneously selected at a time. Each data signal line is supplied with a data signal having a polarity which is inverted every frame period (1 V). Within a single horizontal scanning period (H), (i) two data signal lines (15*x* and 15*y*; 15X and 15Y) corresponding to an identical pixel column are supplied with respective data signals which are opposite to each other in polarity, and (ii) two adjacent data signal lines (15*y* and 15X) separated from each other by a gap line are supplied with respective data signals which are identical to each other in polarity. The gap line is supplied with a constant potential signal (Vcom signal) having a potential identical to a potential of a common electrode. Each retention capacitor line is also supplied with the Vcom signal.

Specifically, in F1 of consecutive frames F1 and F2, the data signal lines 15*x* and 15Y are each supplied with (i) a data signal with a negative polarity during an N-th horizontal scanning period (including a scanning period for the scanning signal lines 16*i* and 16*j*) and (ii) a data signal with a negative polarity also during an (N+1)-th horizontal scanning period (including a scanning period for the scanning signal lines 16*m* and 16*n*), whereas the data signal lines 15*y* and 15X are each supplied with (i) a data signal with a positive polarity during the N-th horizontal scanning period (including the scanning period for the scanning signal lines 16*i* and 16*j*) and (ii) a data signal with a positive polarity also during the (N+1)-th horizontal scanning period (including the scanning period for the scanning signal lines 16*m* and 16*n*).

The above driving method achieves the following operation: As illustrated in FIG. 35, the pixel electrodes 17*ia* and 17*ib* are supplied with respective data signals during the N-th horizontal scanning period. Then, during the (N+1)-th horizontal scanning period, since the pixel electrode 17*ib* is connected to (i) a retention capacitor line (having a potential of Vcom) via a control capacitor and to (ii) the pixel electrode 17*ia* via a coupling capacitor, the pixel electrode 17*ia* has a potential that is positive in polarity and that is not smaller in absolute value than its corresponding data signal, whereas the pixel electrode 17*ib* has a potential that is positive in polarity and that is not greater in absolute value than its corresponding data signal. Further, the pixel electrodes 17*ja* and 17*jb* are supplied with respective data signals during the N-th horizontal scanning period. Then, during the (N+1)-th horizontal scanning period, since the pixel electrode 17*jb* is connected to (i) a retention capacitor line (having a potential of Vcom) via a control capacitor and to (ii) the pixel electrode 17*ja* via a coupling capacitor, the pixel electrode 17*ja* has a potential that is negative in polarity and that is not smaller in absolute value than its corresponding data signal, whereas the pixel electrode 17*jb* has a potential that is negative in polarity and that is not greater in absolute value than its corresponding data signal.

The pixel electrodes 17*ma* and 17*mb* are supplied with respective data signals during the (N+1)-th horizontal scanning period. Then, during an (N+2)-th horizontal scanning period, since the pixel electrode 17*mb* is connected to (i) a retention capacitor line (having a potential of Vcom) via a control capacitor and to (ii) the pixel electrode 17*ma* via a coupling capacitor, the pixel electrode 17*ma* has a potential that is positive in polarity and that is not smaller in absolute value than its corresponding data signal, whereas the pixel electrode 17*mb* has a potential that is positive in polarity and that is not greater in absolute value than its corresponding data signal. Further, the pixel electrodes 17*na* and 17*nb* are supplied with respective data signals during the (N+1)-th horizontal scanning period. Then, during the (N+2)-th horizontal scanning period, since the pixel electrode 17*nb* is connected to (i) a retention capacitor line (having a potential of Vcom) via a control capacitor and to (ii) the pixel electrode 17*na* via a coupling capacitor, the pixel electrode 17*na* has a potential that is negative in polarity and that is not smaller in absolute value than its corresponding data signal, whereas the pixel electrode 17*nb* has a potential that is negative in polarity and that is not greater in absolute value than its corresponding data signal.

The pixel electrodes 17IA and 17IB are supplied with respective data signals during the N-th horizontal scanning period. Then, during the (N+1)-th horizontal scanning period, since the pixel electrode 17IB is connected to (i) a retention capacitor line (having a potential of Vcom) via a control capacitor and to (ii) the pixel electrode 17IA via a coupling capacitor, the pixel electrode 17IA has a potential that is negative in polarity and that is not greater in absolute value than its corresponding data signal, whereas the pixel electrode 17IB has a potential that is negative in polarity and that is not greater in absolute value than its corresponding data signal.

The above operation in F1 achieves a state illustrated in FIG. 36. Specifically, a sub-pixel including the pixel electrode 17*ia* serves as a bright sub-pixel having a positive polarity; a sub-pixel including the pixel electrode 17*ib* serves as a dark sub-pixel having a positive polarity; a sub-pixel including the pixel electrode 17*ja* serves as a bright sub-pixel having a negative polarity; a sub-pixel including the pixel electrode 17*jb* serves as a dark sub-pixel having a negative polarity; a sub-pixel including the pixel electrode 17*ma* serves as a bright sub-pixel having a positive polarity; a sub-pixel including the pixel electrode 17*mb* serves as a dark sub-pixel having a positive polarity; a sub-pixel including the pixel electrode 17na serves as a bright sub-pixel having a negative polarity; a sub-pixel including the pixel electrode 17nb serves as a dark sub-pixel having a negative polarity; a sub-pixel including the pixel electrode 17IA serves as a bright sub-pixel having a negative polarity; and a sub-pixel including the pixel electrode 17IB serves as a dark sub-pixel having a negative polarity. The present embodiment thus achieves dot inversion drive in F1.

As illustrated in FIG. 35, in the frame F2, the data signal lines 15x and 15Y are each supplied with (i) a data signal with a positive polarity during the N-th horizontal scanning period (including the scanning period for the scanning signal lines 16i and 16j) and (ii) a data signal with a positive polarity also during the (N+1)-th horizontal scanning period (including the scanning period for the scanning signal lines 16m and 16n), whereas the data signal lines 15y and 15X are each supplied with (i) a data signal with a negative polarity during the N-th horizontal scanning period (including the scanning period for the scanning signal lines 16i and 16j) and (ii) a data signal with a negative polarity also during the (N+1)-th horizontal scanning period (including the scanning period for the scanning signal lines 16m and 16n).

The above operation in F2 achieves a state in which the sub-pixel including the pixel electrode 17ia serves as a bright sub-pixel having a negative polarity; the sub-pixel including the pixel electrode 17ib serves as a dark sub-pixel having a negative polarity; the sub-pixel including the pixel electrode 17ja serves as a bright sub-pixel having a positive polarity; the sub-pixel including the pixel electrode 17jb serves as a dark sub-pixel having a positive polarity; the sub-pixel including the pixel electrode 17ma serves as a bright sub-pixel having a negative polarity; the sub-pixel including the pixel electrode 17mb serves as a dark sub-pixel having a negative polarity; the sub-pixel including the pixel electrode 17na serves as a bright sub-pixel having a positive polarity; the sub-pixel including the pixel electrode 17nb serves as a dark sub-pixel having a positive polarity; the sub-pixel including the pixel electrode 17IA serves as a bright sub-pixel having a positive polarity; and the sub-pixel including the pixel electrode 17IB serves as a dark sub-pixel having a positive polarity. The present embodiment thus achieves dot inversion drive in F2 as well.

The liquid crystal panel of FIG. 36, which includes bright sub-pixels and dark sub-pixels, can display a halftone as described above, and thus improve a viewing angle characteristic. Further, unlike in the liquid crystal panel illustrated in FIG. 25, pixel electrodes for dark sub-pixels in the liquid crystal panel of FIG. 36 are not electrically floating. As such, it is possible to prevent, for example, image sticking in pixels.

Figure 37:
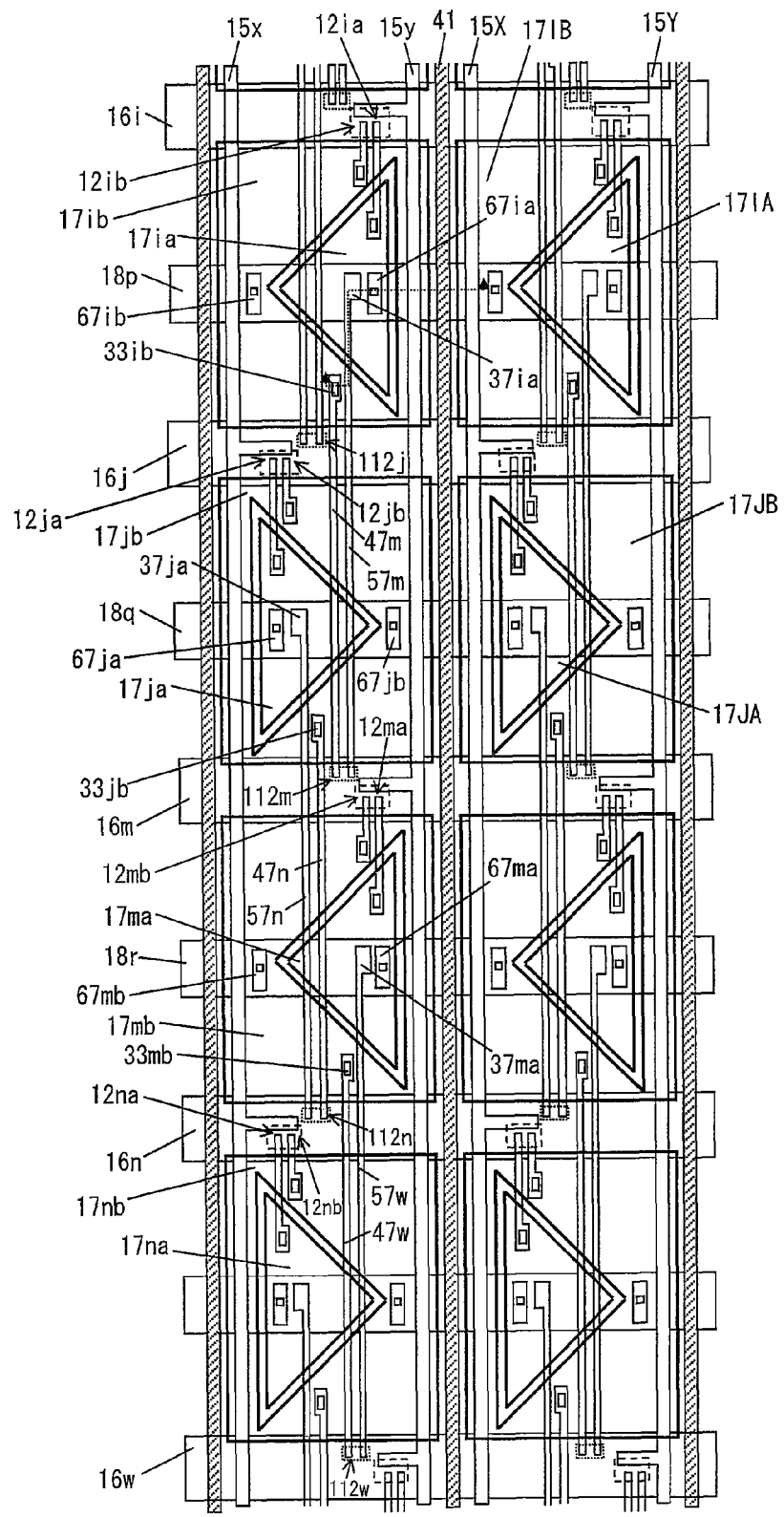
FIG. 37 is a plan view illustrating a configuration of the liquid crystal panel of Embodiment 5.

FIG. 37 is a plan view partially illustrating a liquid crystal panel including the active matrix substrate of FIG. 34. For ease of view, FIG. 37 omits members provided for a color filter substrate (counter substrate), and thus illustrates only members provided for the active matrix substrate. The liquid crystal panel of FIG. 37 has data signal lines, scanning signal lines, gap lines, retention capacitor lines, and pixel regions all of which are identical to their respective equivalents included in the liquid crystal panel of FIG. 32. The liquid crystal panel of FIG. 37 is also identical to that of FIG. 32 in how transistors are positioned and in how pixel electrodes are positioned in the pixel regions.

The scanning signal line 16i functions as a gate electrode of each of the transistors 12ia and 12ib. The transistor 12ia has (i) a source electrode connected to the data signal line 15y and (ii) a drain electrode connected to the pixel electrode 17ia via a drain extracting electrode and a contact hole. The transistor 12ib has (i) a source electrode connected to the data signal line 15y and (ii) a drain electrode connected to the pixel electrode 17ib via a drain extracting electrode and a contact hole. The liquid crystal panel includes capacitor electrodes 37ia, 67ia, and 67ib above the retention capacitor line 18p. The capacitor electrode 67ia is connected to the pixel electrode 17ia via a contact hole. The capacitor electrode 67ib is connected to the pixel electrode 17ib via a contact hole. The capacitor electrode 37ia is connected to the relay electrode 57m in a layer in which the relay electrode 57m is provided. The relay electrode 57m extends from above the retention capacitor line 18p across the scanning signal line 16j and the retention capacitor line 18q to above the scanning signal line 16m so as to be connected to a source electrode of the transistor 112m. The pixel electrode 17ib is connected to a relay electrode 47m via a contact hole 33ib. The relay electrode 47m extends from below the pixel electrode 17ib across the scanning signal line 16j and the retention capacitor line 18q to above the scanning signal line 16m so as to be connected to a drain electrode of the transistor 112m.

The liquid crystal panel of the present embodiment is configured such that the retention capacitor line 18p and the capacitor electrode 67ia overlap each other via a gate insulating film at a first portion, and thus form the above retention capacitor is at the first portion; the retention capacitor line 18p and the capacitor electrode 67ib overlap each other via the gate insulating film at a second portion, and thus form the above retention capacitor ib at the second portion; the retention capacitor line 18p and the capacitor electrode 37ia overlap each other via the gate insulating film at a third portion, and thus form the above control capacitor ibp at the third portion; and the capacitor electrode 37ia and the pixel electrode 17ia overlap each other via an inorganic interlayer insulating film at a fourth portion, and thus form the above coupling capacitor iab at the fourth portion.

The liquid crystal panel of the present embodiment is further configured such that the retention capacitor line 18q and the capacitor electrode 67ja overlap each other via the gate insulating film at a fifth portion, and thus form the above retention capacitor ja at the fifth portion; the retention capacitor line 18q and the capacitor electrode 67jb overlap each other via the gate insulating film at a sixth portion, and thus form the above retention capacitor jb at the sixth portion; the retention capacitor line 18q and the capacitor electrode 37ja overlap each other via the gate insulating film at a seventh portion, and thus form the above control capacitor jbq at the seventh portion; and the capacitor electrode 37ja and the pixel electrode 17ja overlap each other via the inorganic interlayer insulating film at an eighth portion, and thus form the above coupling capacitor jab at the eighth portion. The liquid crystal panel of the present embodiment is further configured such that the retention capacitor line 18r and the capacitor electrode 67ma overlap each other via the gate insulating film at a ninth portion, and thus form the above retention capacitor ma at the ninth portion; the retention capacitor line 18r and the capacitor electrode 67mb overlap each other via the gate insulating film at a tenth portion, and thus form the above retention capacitor mb at the tenth portion; the retention capacitor line 18r and the capacitor electrode 37ma overlap each other via the gate insulating film at an eleventh portion, and thus form the above control capacitor mbr at the eleventh portion; and the capacitor electrode 37ma and the pixel electrode 17ma overlap each other via the inorganic interlayer insulating film at a twelfth portion, and thus form the above coupling capacitor mab at the twelfth portion.

Figure 38:
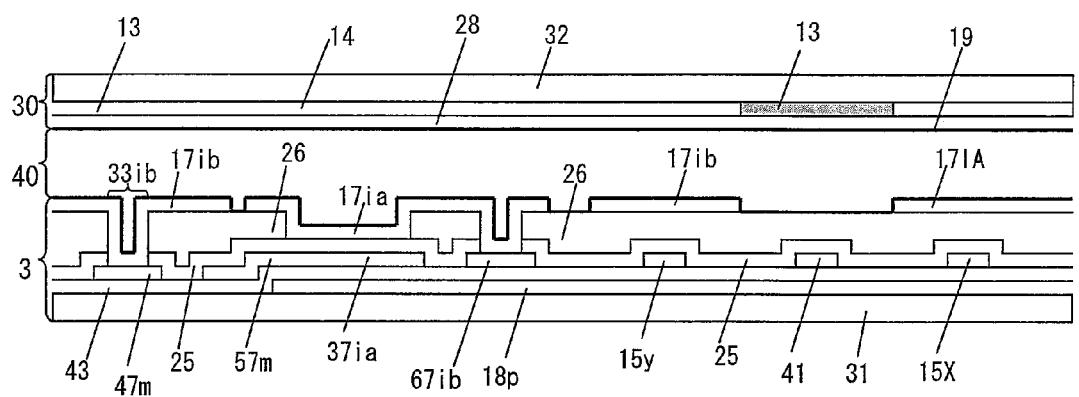
FIG. 38 is a cross-sectional view, taken along a line, of the liquid crystal panel of FIG. 37.

FIG. 38 is a cross-sectional view taken along a line of FIG. 37. As illustrated in FIG. 38, in the active matrix substrate 3, the retention capacitor line 18p is formed on a glass substrate 31 and covered by a gate insulating film 43. The active matrix substrate 3 further includes (although not shown in the cross-sectional view) scanning signal lines in a layer below the gate insulating film 43. Formed in a layer above the gate insulating film 43 are the capacitor electrode 67ib, the relay lines 47m and 57m, the capacitor electrode 37ia, the data signal lines 15y and 15X, and the gap line 41. Further formed above the gate insulating film 43 are (although not shown in the cross-sectional view): semiconductor layers (namely, an i layer and an n+ layer) of each transistor; and a source electrode and a drain electrode of each transistor both in contact with the n+ layer. Metal layers such as the capacitor electrode 67ib and the capacitor electrode 37ia are covered by an inorganic interlayer insulating film 25, on which an organic interlayer insulating film 26 is formed that is thicker than the inorganic interlayer insulating film 25. Formed on the organic interlayer insulating film 26 are the pixel electrodes 17ib, 17ia, and 17IA, which are each covered by an alignment film 9. The inorganic interlayer insulating film 25 and the organic interlayer insulating film 26 are each hollowed at a portion at which a contact hole 33ib is formed. With this arrangement, the pixel electrode 17ib is in contact with the relay line 47m. The retention capacitor line 18p and the capacitor electrode 67ia overlap each other via the gate insulating film 43 as described above at a portion, at which the retention capacitor is formed. The retention capacitor line 18p and the capacitor electrode 37ia overlap each other via the gate insulating film 43 at a portion, at which the control capacitor ibp is formed. Further, the organic interlayer insulating film 26 is hollowed at a portion above the capacitor electrode 37ia. With this arrangement, the capacitor electrode 37ia and the pixel electrode 17ia overlap each other via only the inorganic interlayer insulating film 25 at a portion, at which the coupling capacitor iab is formed.

For a portion of the organic interlayer insulating film which portion is to be hollowed, half exposure is carried out during a photolithography process so that a thin organic interlayer insulating film remains when development is finished, whereas for a portion for forming a contact hole, full exposure is carried out during the photolithography process so that no organic interlayer insulating film remains when development is finished. Carrying out dry etching after the above exposure (i) removes the remaining organic interlayer insulating film at the above portion of the organic interlayer insulating film (that is, leaves only an inorganic interlayer insulating film above the capacitor electrodes 37ia, 37ja, and 37ma) and (ii) removes the inorganic interlayer insulating film below the organic interlayer insulating film at the portion for forming a contact hole.

The liquid crystal panel includes, between the data signal lines 15y and 15X, the gap line 41 to which the Vcom signal is supplied. As such, it is possible, for example, to (i) reduce a cross talk which arises between the pixel electrode 17ib and the data signal line 15X from a parasitic capacitance therebetween, and thus (ii) prevent appearance of a longitudinal shadow. The effect of reducing a cross talk is particularly significant in a pixel division system, as in the liquid crystal panel of the present embodiment, which controls each pixel so that the pixel has two luminances. This is because a cross talk affects display quality more severely in such a pixel division system than in a pixel non-division system illustrated in FIG. 3.

The liquid crystal panel of the present embodiment, which includes the gap line 41, further reduces a cross talk between two adjacent data signal lines (for example, 15y and 15X) separated from each other by the gap line which cross talk arises from a parasitic capacitance between the two adjacent data signal lines.

[Embodiment 5]

Figure 39:
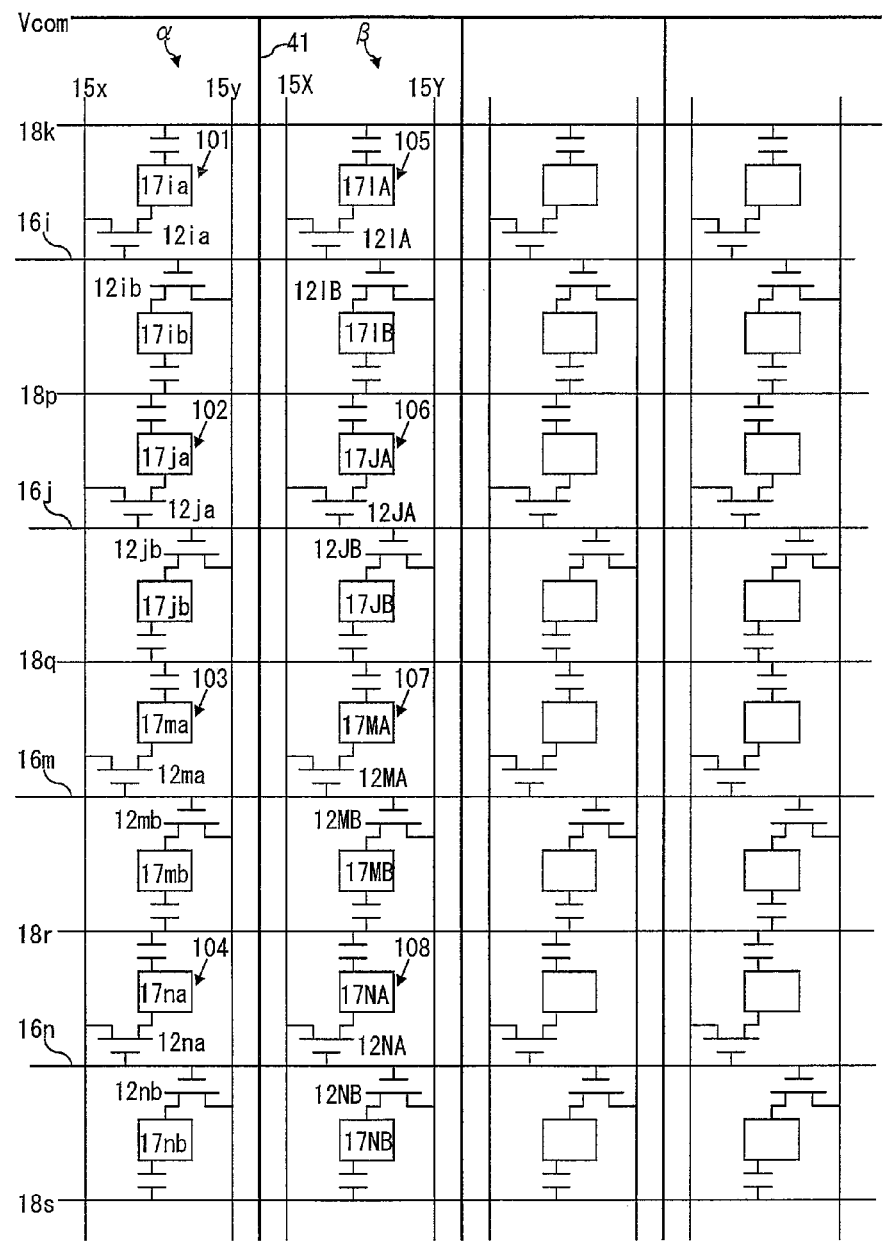
FIG. 39 is an equivalent circuit diagram illustrating another configuration of the active matrix substrate of Embodiment 5.

FIG. 39 is an equivalent circuit diagram partially illustrating an active matrix substrate of Embodiment 5. The active matrix substrate of FIG. 39 has data signal lines, scanning signal lines, gap lines, retention capacitor lines, and pixel regions, all of which are identical to their respective equivalents included in the active matrix substrate of FIG. 7. The active matrix substrate of FIG. 39 is also identical to that of FIG. 7 in how pixel electrodes are positioned in the pixel regions.

Each pixel includes two pixel electrodes: A pixel electrode 17ia in the pixel region 101 is connected to the data signal line 15x via a transistor 12ia connected to the scanning signal line 16i. A pixel electrode 17ib in the pixel region 101 is connected to the data signal line 15y via a transistor 12ib connected to the scanning signal line 16i. A pixel electrode 17ja in the pixel region 102 is connected to the data signal line 15x via a transistor 12ja connected to the scanning signal line 16j. A pixel electrode 17jb in the pixel region 102 is connected to the data signal line 15y via a transistor 12jb connected to the scanning signal line 16j. A pixel electrode 17ma in the pixel region 103 is connected to the data signal line 15x via a transistor 12ma connected to the scanning signal line 16m. A pixel electrode 17mb in the pixel region 103 is connected to the data signal line 15y via a transistor 12mb connected to the scanning signal line 16m. A pixel electrode 17na in the pixel region 104 is connected to the data signal line 15x via a transistor 12na connected to the scanning signal line 16n. A pixel electrode 17nb in the pixel region 104 is connected to the data signal line 15y via a transistor 12nb connected to the scanning signal line 16n. A pixel electrode 17IA in the pixel region 105 is connected to the data signal line 15X via a transistor 12IA connected to the scanning signal line 16i. A pixel electrode 17IB in the pixel region 105 is connected to the data signal line 15Y via a transistor 12IB connected to the scanning signal line 16i. A pixel electrode 17JA in the pixel region 106 is connected to the data signal line 15X via a transistor 12JA connected to the scanning signal line 16j. A pixel electrode 17JB in the pixel region 106 is connected to the data signal line 15Y via a transistor 12JB connected to the scanning signal line 16j.

The pixel electrode 17ia and the retention capacitor line 18k form a retention capacitor is therebetween. The pixel electrode 17ib and the retention capacitor line 18p form a retention capacitor ib therebetween. The pixel electrode 17ja and the retention capacitor line 18p form a retention capacitor ja therebetween. The pixel electrode 17jb and the retention capacitor line 18q form a retention capacitor jb therebetween. The pixel electrode 17ma and the retention capacitor line 18q form a retention capacitor therebetween. The pixel electrode 17mb and the retention capacitor line 18r form a retention capacitor therebetween. The pixel electrode 17na and the retention capacitor line 18r form a retention capacitor therebetween. The pixel electrode 17nb and the retention capacitor line 18s form a retention capacitor therebetween. The pixel electrode 17IA and the retention capacitor line 18k form a retention capacitor therebetween. The pixel electrode 17IB and the retention capacitor line 18p form a retention capacitor therebetween. The pixel electrode 17JA and the retention capacitor line 18p form a retention capacitor therebetween. The pixel electrode 17JB and the retention capacitor line 18q form a retention capacitor therebetween.

Figure 40:
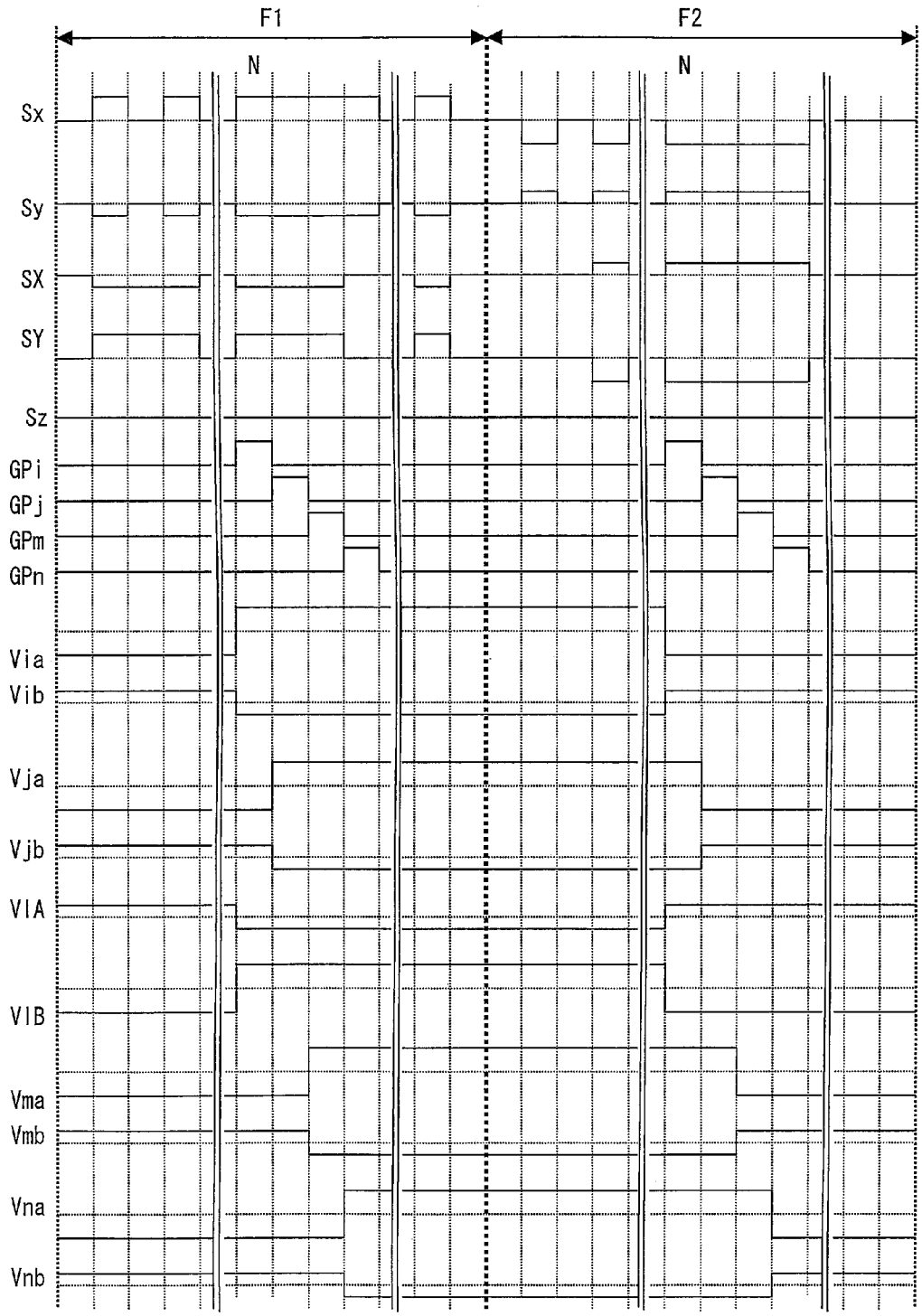
FIG. 40 is a timing chart illustrating a method for driving a liquid crystal panel including the active matrix substrate of FIG. 39.

FIG. 40 is a timing chart illustrating a method (in a normally black mode) for driving a liquid crystal panel of the present embodiment which liquid crystal panel includes the above active matrix substrate. In FIG. 40, Sx, Sy, SX, and SY represent data signals (data signals) supplied to the data signal lines 15x, 15y, 15X, and 15Y, respectively; Sz represents a signal supplied to the gap line; GPi, GPj, GPm, and GPn represent gate signals supplied to the scanning signal lines 16i, 16j, 16m, and 16n, respectively; and Via, Vib, Vja, Vjb, VIA, VIB, Vma, Vmb, Vna, and Vnb represent potentials of the pixel electrodes 17ia, 17ib, 17ja, 17jb, 17IA, 17IB, 17ma, 17mb, 17na, and 17nb, respectively.

As illustrated in FIG. 40, the driving method is carried out as follows: One scanning signal line is selected at a time. Each data signal line is supplied with a data signal having a polarity which is inverted every frame period (1 V). Within an identical horizontal scanning period, (i) two data signal lines (15x and 15y; 15X and 15Y) corresponding to an identical pixel column are supplied with respective data signals which are opposite to each other in polarity, and (ii) two adjacent data signal lines (15y and 15X) sandwiching a gap line are supplied with respective data signals which are identical to each other in polarity. The gap line is supplied with a constant potential signal (Vcom signal) having a potential identical to a potential of a common electrode.

Specifically, in F1 of consecutive frames F1 and F2, during an N-th horizontal scanning period (including a scanning period for the scanning signal line 16i), the data signal line 15x is supplied with a data signal having a positive polarity; the data signal line 15y is supplied with a data signal having (i) a negative polarity and an (ii) absolute value which corresponds to an absolute value of the data signal (that is, a potential difference between Vcom and the data signal) and which is not greater than the absolute value of the data signal; the data signal line 15Y is supplied with a data signal having a positive polarity; and the data signal line 15X is supplied with a data signal having (i) a negative polarity and (ii) an absolute value which corresponds to an absolute value of the data signal and which is not greater than the absolute value of the data signal. Similarly, also during an (N+1)-th horizontal scanning period (including a scanning period for the scanning signal line 16j), the data signal line 15x is supplied with a data signal having a positive polarity; the data signal line 15y is supplied with a data signal having (i) a negative polarity and (ii) an absolute value which corresponds to an absolute value of the data signal and which is not greater than the absolute value of the data signal; the data signal line 15Y is supplied with a data signal having a positive polarity; and the data signal line 15X is supplied with a data signal having (i) a negative polarity and (ii) an absolute value which corresponds to an absolute value of the data signal and which is not greater than the absolute value of the data signal.

Figure 41:
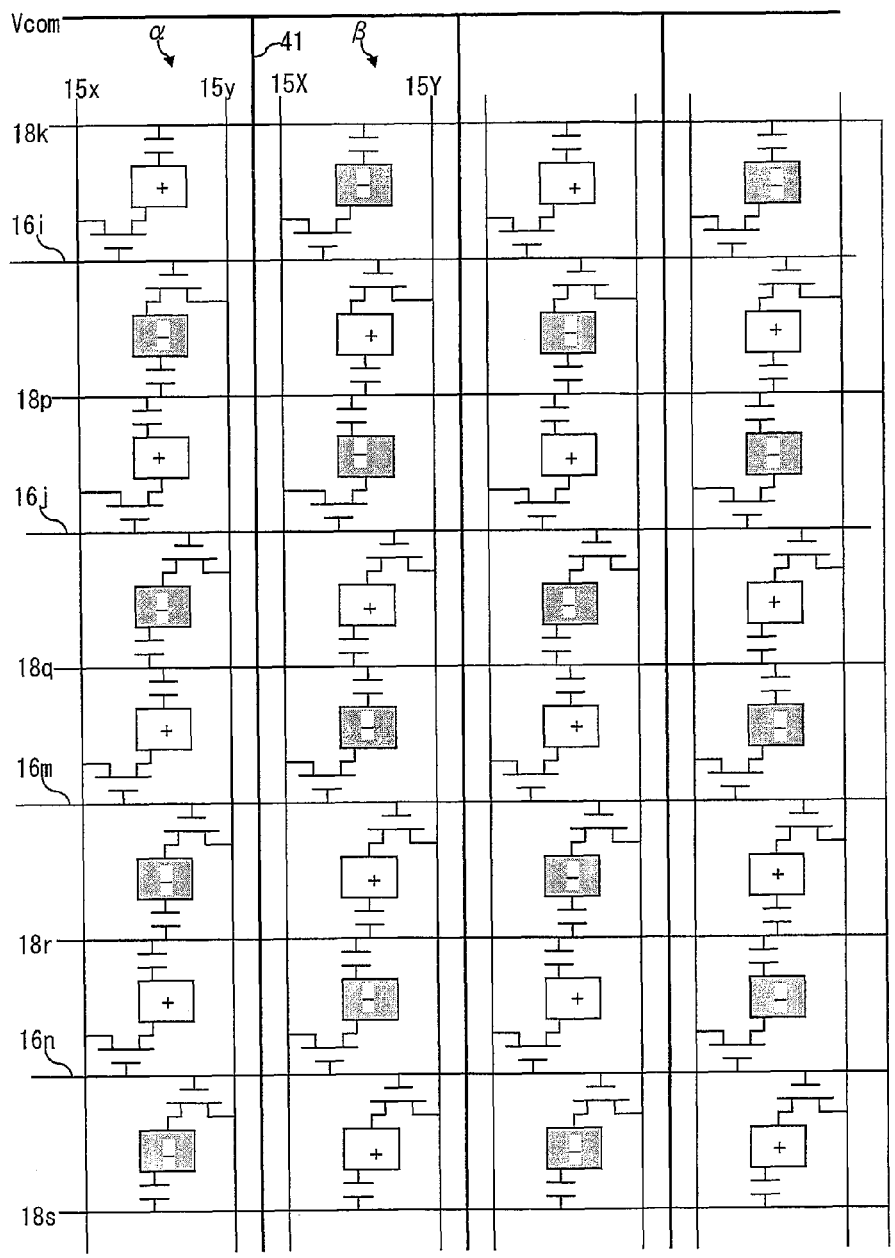
FIG. 41 is a diagram schematically illustrating a display state of the liquid crystal panel being driven by the method of FIG. 40.

The above operation in F1 achieves a state illustrated in FIG. 41. Specifically, a sub-pixel including the pixel electrode 17ia serves as a bright sub-pixel having a positive polarity; a sub-pixel including the pixel electrode 17ib serves as a dark sub-pixel having a negative polarity; a sub-pixel including the pixel electrode 17ja serves as a bright sub-pixel having a positive polarity; a sub-pixel including the pixel electrode 17jb serves as a dark sub-pixel having a negative polarity; a sub-pixel including the pixel electrode 17ma serves as a bright sub-pixel having a positive polarity; a sub-pixel including the pixel electrode 17mb serves as a dark sub-pixel having a negative polarity; a sub-pixel including the pixel electrode 17na serves as a bright sub-pixel having a positive polarity; a sub-pixel including the pixel electrode 17nb serves as a dark sub-pixel having a negative polarity; a sub-pixel including the pixel electrode 17IA serves as a dark sub-pixel having a negative polarity; and a sub-pixel including the pixel electrode 17IB serves as a bright sub-pixel having a positive polarity. The present embodiment thus achieves, in F1, dot inversion drive and bright-and-dark checkered-pattern display (in which sub-pixels are alternately bright and dark in both the row direction and the column direction).

As illustrated in FIG. 40, in the frame F2, during the N-th horizontal scanning period (including the scanning period for the scanning signal line 16i), the data signal line 15x is supplied with a data signal having a negative polarity; the data signal line 15y is supplied with a data signal having (i) a positive polarity and (ii) an absolute value which corresponds to an absolute value of the data signal (that is, a potential difference between Vcom and the data signal) and which is not greater than the absolute value of the data signal; the data signal line 15Y is supplied with a data signal having a negative polarity; and the data signal line 15X is supplied with a data signal having (i) a positive polarity and (ii) an absolute value which corresponds to an absolute value of the data signal and which is not greater than the absolute value of the data signal. Similarly, also during the (N+1)-th horizontal scanning period (including the scanning period for the scanning signal line 16j), the data signal line 15x is supplied with a data signal having a negative polarity; the data signal line 15y is supplied with a data signal having (i) a positive polarity and (ii) an absolute value which corresponds to an absolute value of the data signal and which is not greater than the absolute value of the data signal; the data signal line 15Y is supplied with a data signal having a negative polarity; and the data signal line 15X is supplied with a data signal having (i) a positive polarity and (ii) an absolute value which corresponds to an absolute value of the data signal and which is not greater than the absolute value of the data signal.

The above operation in F2 achieves a state in which the sub-pixel including the pixel electrode 17ia serves as a bright sub-pixel having a negative polarity; the sub-pixel including the pixel electrode 17ib serves as a dark sub-pixel having a positive polarity; the sub-pixel including the pixel electrode 17ja serves as a bright sub-pixel having a negative polarity; the sub-pixel including the pixel electrode 17jb serves as a dark sub-pixel having a positive polarity; the sub-pixel including the pixel electrode 17IA serves as a dark sub-pixel having a positive polarity; the sub-pixel including the pixel electrode 17IB serves as a bright sub-pixel having a negative polarity; the sub-pixel including the pixel electrode 17ma serves as a bright sub-pixel having a negative polarity; the sub-pixel including the pixel electrode 17mb serves as a dark sub-pixel having a positive polarity; the sub-pixel including the pixel electrode 17na serves as a bright sub-pixel having a negative polarity; and the sub-pixel including the pixel electrode 17nb serves as a dark sub-pixel having a positive polarity. The present embodiment thus achieves, in F2 as well, dot inversion drive and bright-and-dark checkered-pattern display (in which sub-pixels are alternately bright and dark in both the row direction and the column direction).

The liquid crystal panel of the present embodiment, which includes bright sub-pixels and dark sub-pixels, can display a halftone and thus improve a viewing angle characteristic. Since different data signals are supplied to a bright sub-pixel and a dark sub-pixel, it is possible to more accurately control respective luminances of the bright and dark sub-pixels. Further, the liquid crystal panel, which carries out a bright-and-dark checkered-pattern display, can prevent appearance of stripe-shaped unevenness arising from presence of consecutive bright sub-pixels or dark sub-pixels.

The active matrix substrate illustrated in FIG. 39 can alternatively be driven as follows: Each data signal line is supplied with a data signal having a polarity which is inverted every horizontal scanning period (1H). Within an identical horizontal scanning period, (i) two data signal lines (15*x* and 15*y*; 15X and 15Y) corresponding to an identical pixel column are supplied with respective data signals which are identical to each other in polarity, and (ii) two adjacent data signal lines (15*y* and 15X) sandwiching a gap line are supplied with respective data signals which are identical to each other in polarity. With this arrangement, (i) bright sub-pixels which are positive in polarity are present in a number that is substantially equal to a number of bright sub-pixels which are negative in polarity, and (ii) dark sub-pixels which are positive in polarity are present in a number that is substantially equal to a number of dark sub-pixels which are negative in polarity. This further reduces occurrence of a flicker as compared to the driving method illustrated in FIG. 41.

Figure 42:
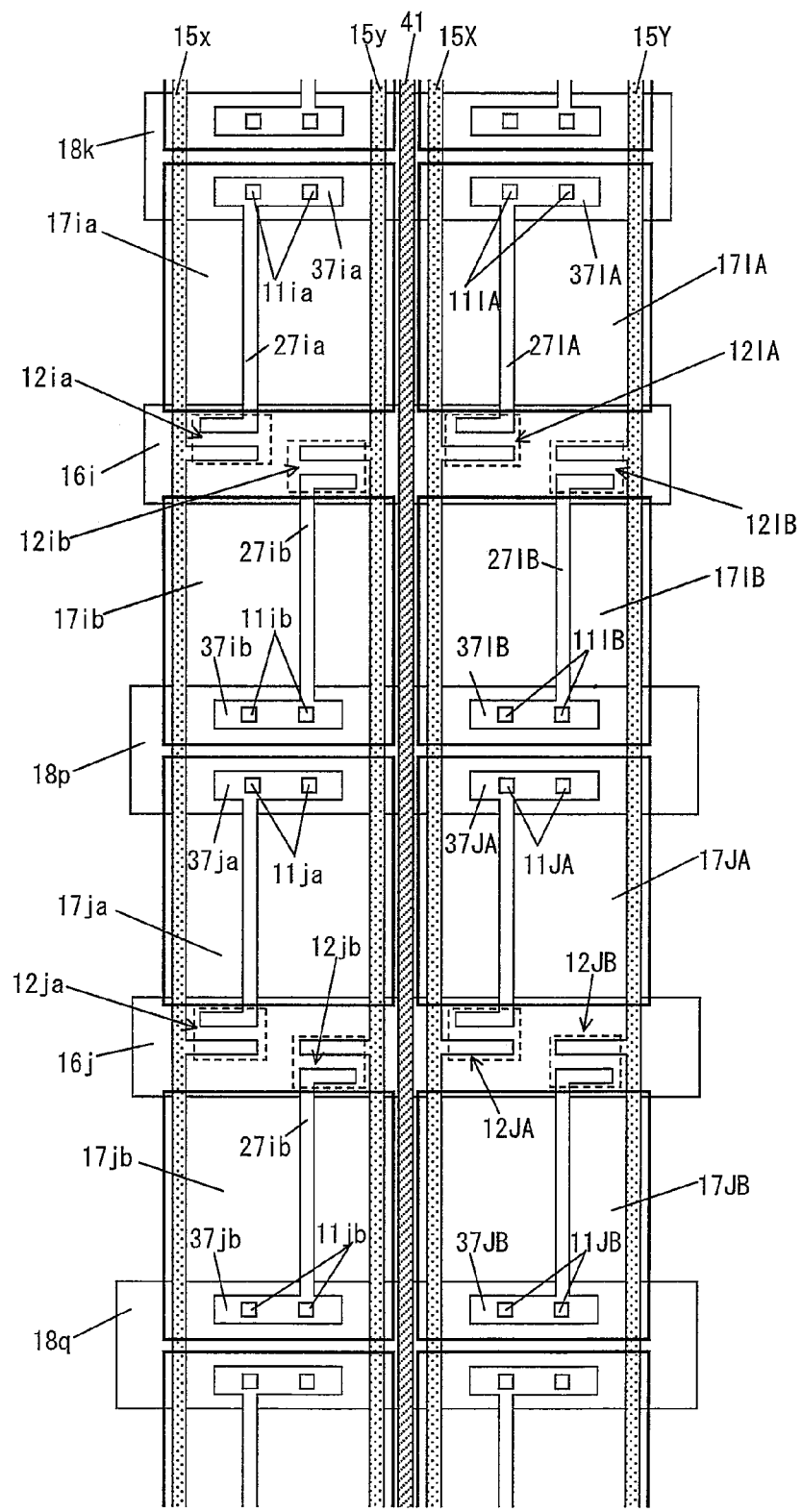
FIG. 42 is a plan view illustrating another configuration of the liquid crystal panel of Embodiment 5.

FIG. 42 is a plan view partially illustrating a liquid crystal panel including the active matrix substrate of FIG. 39. For ease of view, FIG. 42 omits members provided for a color filter substrate (counter substrate), and thus illustrates only members provided for the active matrix substrate. The liquid crystal panel of FIG. 42 has data signal lines, scanning signal lines, gap lines, retention capacitor lines, and pixel regions all of which are identical to their respective equivalents included in the liquid crystal panel of FIG. 13. The liquid crystal panel of FIG. 42 is also identical to that of FIG. 13 in how pixel electrodes are positioned in the pixel regions.

The scanning signal line 16*i* functions as a gate electrode of the transistor 12*ia*. The transistor 12*ia* has (i) a source electrode connected to the data signal line 15*x* and (ii) a drain electrode connected to a capacitor electrode 37*ia* via a drain extracting electrode 27*ia*. The capacitor electrode 37*ia* is positioned above the retention capacitor line 18*p* and connected to the pixel electrode 17*ia* via two contact holes 11*ia*. The scanning signal line 16*i* functions as a gate electrode of the transistor 12*ib*. The transistor 12*ib* has (i) a source electrode connected to the data signal line 15*y* and (ii) a drain electrode connected to a capacitor electrode 37*ib* via a drain extracting electrode 27*ib*. The capacitor electrode 37*ib* is positioned above the retention capacitor line 18*q* and connected to the pixel electrode 17*ib* via two contact holes 11*ib*.

The scanning signal line 16*j* functions as a gate electrode of the transistor 12*ja*. The transistor 12*ja* has (i) a source electrode connected to the data signal line 15*x* and (ii) a drain electrode connected to a capacitor electrode 37*ja* via a drain extracting electrode 27*ja*. The capacitor electrode 37*ja* is positioned above the retention capacitor line 18*p* and connected to the pixel electrode 17*ja* via two contact holes 11*ja*. The scanning signal line 16*j* functions as a gate electrode of the transistor 12*jb*. The transistor 12*jb* has (i) a source electrode connected to the data signal line 15*y* and (ii) a drain electrode connected to a capacitor electrode 37*jb* via a drain extracting electrode 27*jb*. The capacitor electrode 37*jb* is positioned above the retention capacitor line 18*q* and connected to the pixel electrode 17*jb* via two contact holes 11*jb*.

Similarly, the scanning signal line 16*i* functions as a gate electrode of the transistor 12IA. The transistor 12IA has (i) a source electrode connected to the data signal line 15X and (ii) a drain electrode connected to a capacitor electrode 37IA via a drain extracting electrode 27IA. The capacitor electrode 37IA is positioned above the retention capacitor line 18*p* and connected to the pixel electrode 17IA via two contact holes 11IA. The scanning signal line 16*i* functions as a gate electrode of the transistor 12IB. The transistor 12IB has (i) a source electrode connected to the data signal line 15Y and (ii) a drain electrode connected to a capacitor electrode 37IB via a drain extracting electrode 27IB. The capacitor electrode 37IB is positioned above the retention capacitor line 18*q* and connected to the pixel electrode 17IB via two contact holes 11IB.

The scanning signal line 16*j* functions as a gate electrode of the transistor 12JA. The transistor 12JA has (i) a source electrode connected to the data signal line 15X and (ii) a drain electrode connected to a capacitor electrode 37JA via a drain extracting electrode 27JA. The capacitor electrode 37JA is positioned above the retention capacitor line 18*p* and connected to the pixel electrode 17JA via two contact holes 11JA.

The liquid crystal panel of the present embodiment is configured such that the retention capacitor line 18*k* and the capacitor electrode 37*ia* overlap each other via a gate insulating film at a first portion, and thus form the above retention capacitor is at the first portion; the retention capacitor line 18*p* and the capacitor electrode 37*ib* overlap each other via the gate insulating film at a second portion, and thus form the above retention capacitor ib at the second portion; the retention capacitor line 18*p* and the capacitor electrode 37*ja* overlap each other via the gate insulating film at a third portion, and thus form the above retention capacitor ja at the third portion; and the retention capacitor line 18*q* and the capacitor electrode 37*jb* overlap each other via the gate insulating film at a fourth portion, and thus form the above retention capacitor jb at the fourth portion.

The liquid crystal panel includes, between the data signal lines 15*y* and 15X, the gap line 41 to which the Vcom signal is supplied. As such, it is possible, for example, to (i) reduce a cross talk which arises between the pixel electrode 17*ia* and the data signal line 15X from a parasitic capacitance therebetween, and thus (ii) prevent appearance of a longitudinal shadow. FIG. 43 illustrates equipotential lines (among which LVM is a line corresponding to −0.5 V, and LVP is a line corresponding to +0.5 V) for the liquid crystal panel which is being driven. FIG. 43 illustrates no equipotential lines which extend from above a pixel electrode (17*ia*) of a first pixel to above a data signal line (15X) corresponding to a second pixel adjacent to the first pixel. This clearly indicates the above effect of reducing a cross talk (shield effect). In the present embodiment, a value of the above parasitic capacitance is reduced by approximately 40%, for example. The effect of reducing a cross talk is particularly significant in a pixel division system, as in the liquid crystal panel of the present embodiment, which controls each pixel so that the pixel has two luminances. This is because a cross talk affects display quality more severely in such a pixel division system than in a pixel non-division system illustrated in FIG. 3.

The liquid crystal panel of the present embodiment, which includes the gap line 41, further reduces a cross talk between two adjacent data signal lines (for example, 15*y* and 15X) sandwiching the gap line which cross talk arises from a parasitic capacitance between the two adjacent data signal lines. In the present embodiment, a value of such a parasitic capacitance is reduced approximately by half, for example.

[Embodiment 6]

Figure 44:
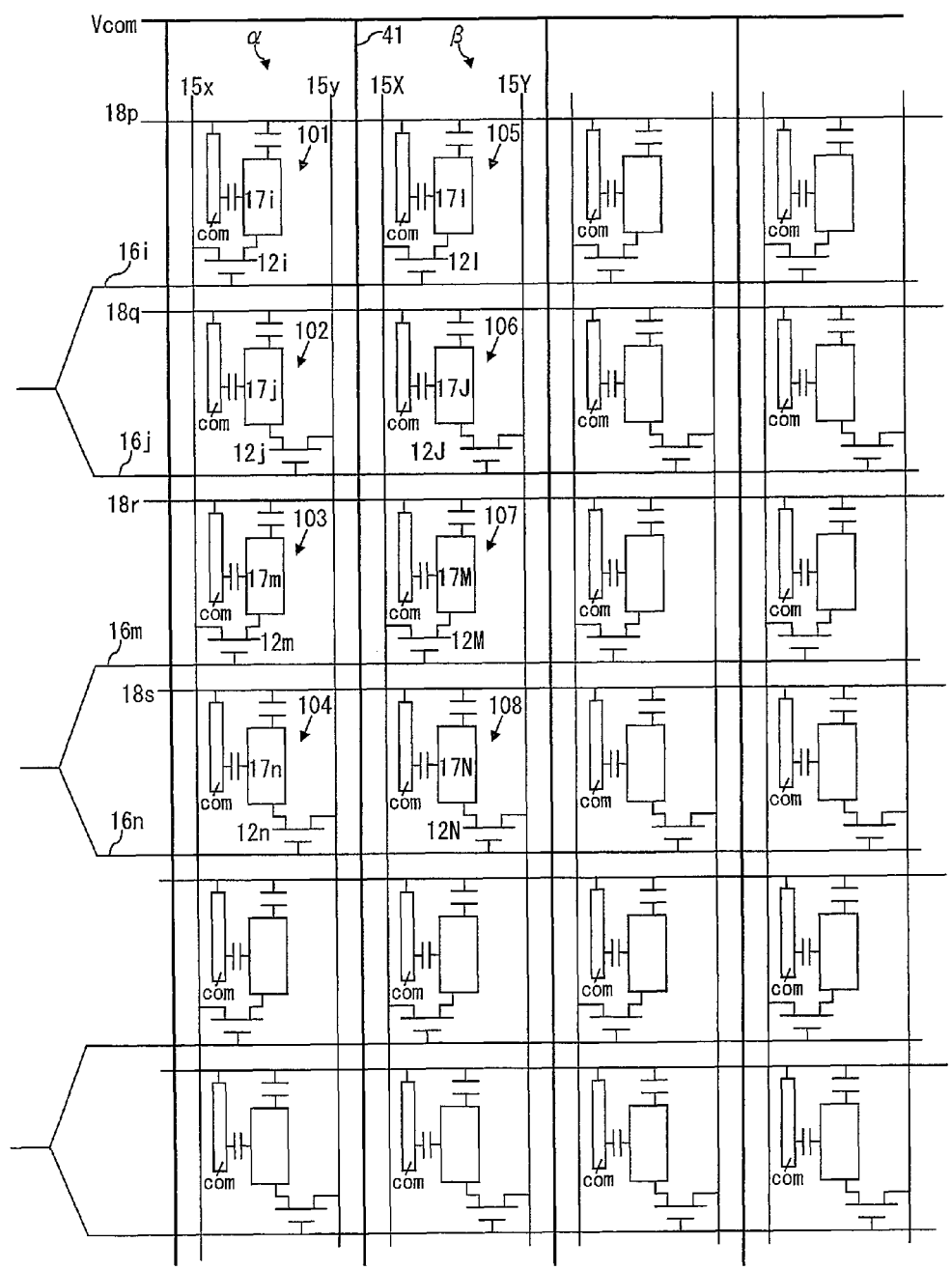
FIG. 44 is an equivalent circuit diagram illustrating a configuration of an active matrix substrate of Embodiment 6.

FIG. 44 is an equivalent circuit diagram partially illustrating an active matrix substrate of Embodiment 6. As illustrated in FIG. 44, the active matrix substrate includes: data signal lines 15*x*, 15*y*, 15X, and 15Y arranged in that order; scanning signal lines 16*i*, 16*j*, 16*m*, and 16*n* arranged in that order and extending in a row direction (that is, a right-left direction in FIG. 44); a pixel region 101 corresponding to an intersection of the data signal lines 15*x* and 15*y* with the scanning signal line 16*i*; a pixel region 102 corresponding to an intersection of the data signal lines 15*x* and 15*y* with the scanning signal line 16*j*; a pixel region 103 corresponding to an intersection of the data signal lines 15*x* and 15*y* with the scanning signal line 16m; a pixel region 104 corresponding to an intersection of the data signal lines 15X and 15y with the scanning signal line 16n; a pixel region 105 corresponding to an intersection of the data signal lines 15X and 15Y with the scanning signal line 16i; a pixel region 106 corresponding to an intersection of the data signal lines 15X and 15Y with the scanning signal line 16j; a pixel region 107 corresponding to an intersection of the data signal lines 15X and 15Y with the scanning signal line 16m; a pixel region 108 corresponding to an intersection of the data signal lines 15X and 15Y with the scanning signal line 16n; a retention capacitor line 18p corresponding to the pixel regions 101 and 105; a retention capacitor line 18q corresponding to the pixel regions 102 and 106; a retention capacitor line 18r corresponding to the pixel regions 103 and 107; and a retention capacitor line 18s corresponding to the pixel regions 104 and 108.

The data signal lines 15x and 15y are provided so as to correspond to a pixel region column α including the pixel regions 101 through 104, whereas the data signal lines 15X and 15Y are provided so as to correspond to a pixel region column β including the pixel regions 101 through 104. Further, there is a gap line 41 provided between the data signal lines 15y and 15X to which gap line 41 a Vcom signal is supplied.

Provided in each pixel region are a single comb-like pixel electrode and a common electrode com corresponding thereto. A pixel electrode 17i in the pixel region 101 is connected to the data signal line 15x via a transistor 12i connected to the scanning signal line 16i. A pixel electrode 17j in the pixel region 102 is connected to the data signal line 15y via a transistor 12j connected to the scanning signal line 16j. A pixel electrode 17m in the pixel region 103 is connected to the data signal line 15x via a transistor 12m connected to the scanning signal line 16m. A pixel electrode 17n in the pixel region 104 is connected to the data signal line 15y via a transistor 12n connected to the scanning signal line 16n. A pixel electrode 17I in the pixel region 105 is connected to the data signal line 15x via a transistor 12I connected to the scanning signal line 16i. A pixel electrode 17J in the pixel region 106 is connected to the data signal line 15Y via a transistor 12J connected to the scanning signal line 16j. A pixel electrode 17M in the pixel region 107 is connected to the data signal line 15X via a transistor 12M connected to the scanning signal line 16m. A pixel electrode 17N in the pixel region 108 is connected to the data signal line 15Y via a transistor 12N connected to the scanning signal line 16n. In other words, (i) each even-numbered pixel region (102 and 104) in the pixel region column α has a pixel electrode connected to the data signal line 15y, (ii) each odd-numbered pixel region (105 and 107) in the pixel region column β has a pixel electrode connected to the data signal line 15X, and (iii) the data signal line 15y and the data signal line 15X are adjacent to each other with the gap line 41 therebetween.

The scanning signal line 16i, to which the pixel electrode 17i in the pixel region 101 and the pixel electrode 17I in the pixel region 105 are connected, and the scanning signal line 16i, to which the pixel electrode 17j in the pixel region 102 and the pixel electrode 17J in the pixel region 106 are connected, are connected to each other inside or outside a panel and simultaneously selected (described below in detail). Further, the scanning signal line 16m, to which the pixel electrode 17m in the pixel region 103 and the pixel electrode 17M in the pixel region 107 are connected, and the scanning signal line 16n, to which the pixel electrode 17n in the pixel region 104 and the pixel electrode 17N in the pixel region 108 are connected, are connected to each other inside or outside the panel and simultaneously selected (described below in detail).

The retention capacitor line 18p and the pixel electrode 17i form a retention capacitor i therebetween. The pixel electrode 17i and its corresponding common electrode com form an alignment capacitor is therebetween. The retention capacitor line 18q and the pixel electrode 17j form a retention capacitor j therebetween. The pixel electrode 17j and its corresponding common electrode com form an alignment capacitor jc therebetween. The retention capacitor line 18p and the pixel electrode 17I form a retention capacitor I therebetween. The pixel electrode 17I and its corresponding common electrode com form an alignment capacitor Ic therebetween. The retention capacitor line 18q and the pixel electrode 17J form a retention capacitor J therebetween. The pixel electrode 17J and its corresponding common electrode com form an alignment capacitor Jc therebetween.

Figure 45:
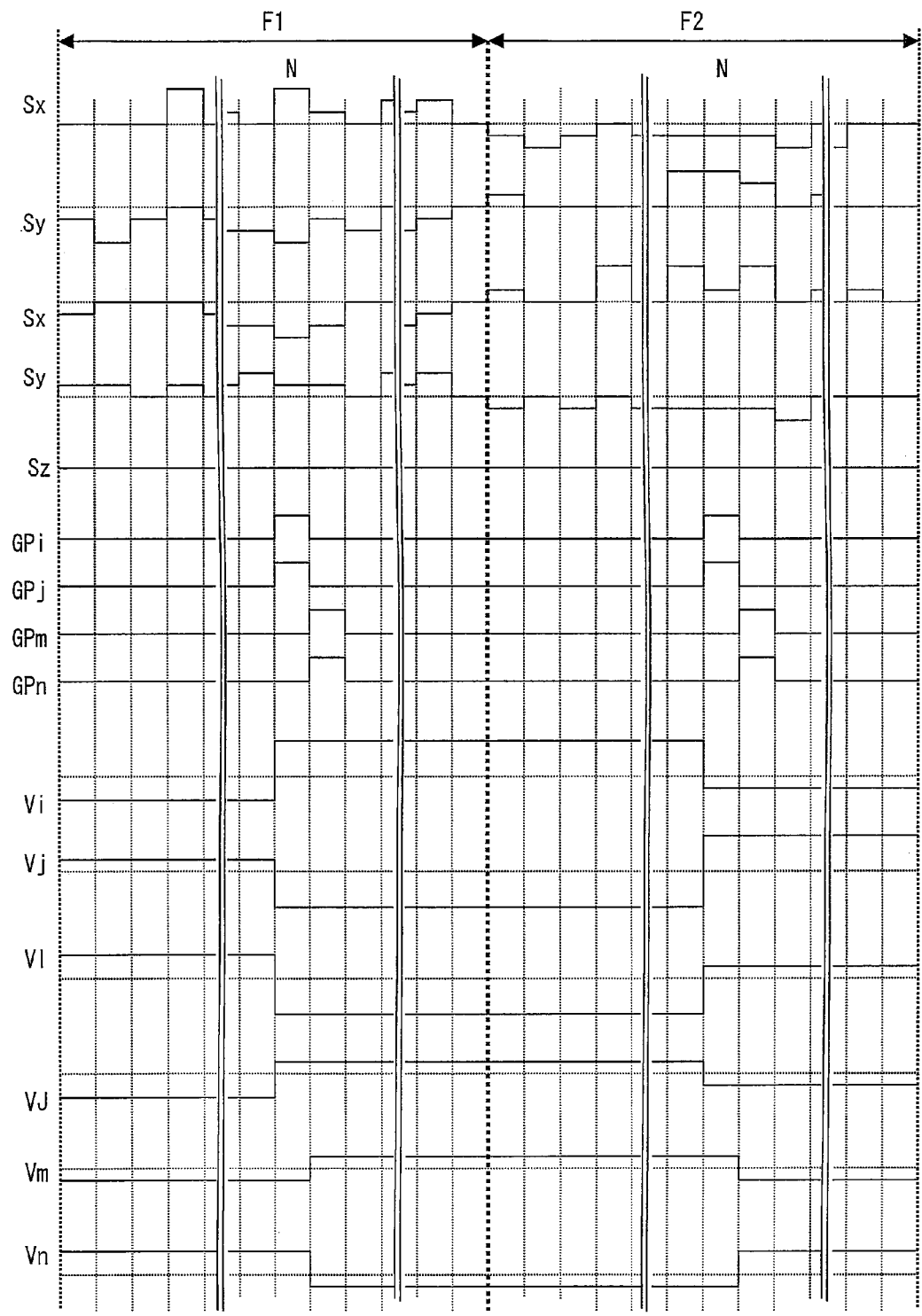
FIG. 45 is a timing chart illustrating a method for driving a liquid crystal panel including the active matrix substrate of FIG. 44.

FIG. 45 is a timing chart illustrating a method (in a normally black mode) for driving a liquid crystal panel of the present embodiment which liquid crystal panel includes the above active matrix substrate. In FIG. 45, Sx, Sy, SX, and SY represent data signals (data signals) supplied to the data signal lines 15x, 15y, 15X, and 15Y, respectively; Sz represents a signal supplied to the gap line; GPi, GPj, GPm, and GPn represent gate signals supplied to the scanning signal lines 16i, 16j, 16m, and 16n, respectively; and Vi, Vj, VI, VJ, Vm, and Vn represent potentials of the pixel electrodes 17i, 17j, 17I, 17J, 17m, and 17n, respectively.

As illustrated in FIG. 45, the driving method is carried out as follows: Two scanning signal lines are simultaneously selected at a time. Each data signal line is supplied with a data signal having a polarity which is inverted every frame period (1 V). Within an identical horizontal scanning period, (i) two data signal lines (15x and 15y; 15X and 15Y) corresponding to an identical pixel column are supplied with respective data signals which are opposite to each other in polarity, and (ii) two adjacent data signal lines (15y and 15X) sandwiching a gap line are supplied with respective data signals which are identical to each other in polarity. The gap line is supplied with a constant potential signal (Vcom signal) having a potential identical to a potential of a common electrode.

Specifically, in F1 of consecutive frames F1 and F2, the data signal lines 15x and 15Y are each supplied with (i) a data signal with a positive polarity during an N-th horizontal scanning period (including a scanning period for the scanning signal lines 16i and 16j) and (ii) a data signal with a positive polarity also during an (N+1)-th horizontal scanning period (including a scanning period for the scanning signal lines 16m and 16n), whereas the data signal lines 15y and 15X are each supplied with (i) a data signal with a negative polarity during the N-th horizontal scanning period (including the scanning period for the scanning signal lines 16i and 16j) and (ii) a data signal with a negative polarity also during the (N+1)-th horizontal scanning period (including the scanning period for the scanning signal lines 16m and 16n).

Figure 46:
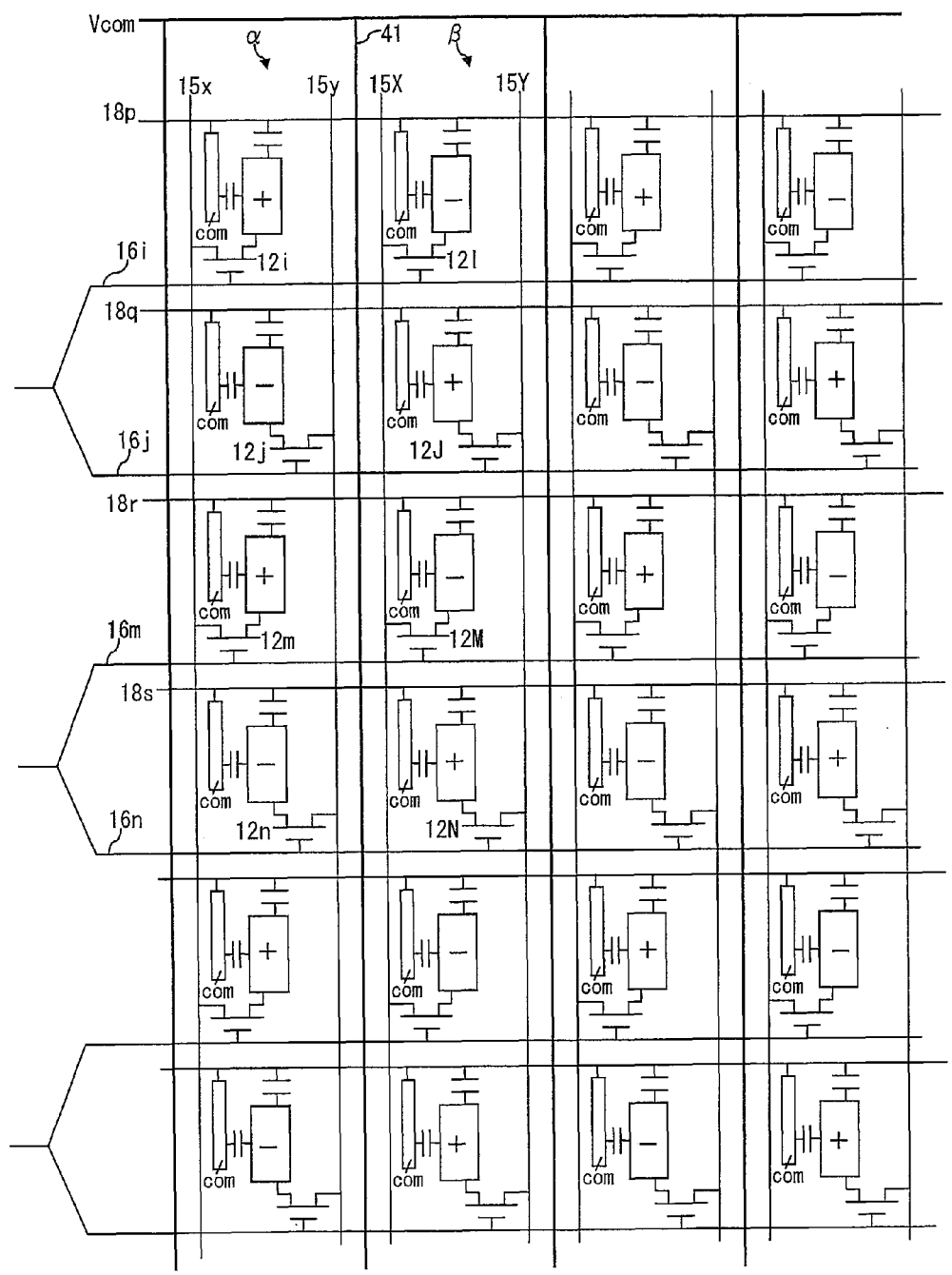
FIG. 46 is a diagram schematically illustrating a display state of the liquid crystal panel being driven by the method of FIG. 45.

FIG. 46 illustrates the liquid crystal panel driven as described above. Specifically, a pixel including the pixel electrode 17i has a positive polarity; a pixel including the pixel electrode 17j has a negative polarity; a pixel including the pixel electrode 17m has a positive polarity; a pixel including the pixel electrode 17n has a negative polarity; a pixel including the pixel electrode 17I has a negative polarity; and a pixel including the pixel electrode 17J has a positive polarity. This achieves dot inversion drive in F1.

In F2, the data signal lines 15x and 15Y are each supplied with (i) a data signal with a negative polarity during the N-th horizontal scanning period (including the scanning period for the scanning signal lines 16i and 16j) and (ii) a data signal with a negative polarity also during the (N+1)-th horizontal scanning period (including the scanning period for the scanning signal lines 16m and 16n), whereas the data signal lines 15y and 15X are each supplied with (i) a data signal with a positive polarity during the N-th horizontal scanning period (including the scanning period for the scanning signal lines 16i and 16j) and (ii) a data signal with a positive polarity also during the (N+1)-th horizontal scanning period (including the scanning period for the scanning signal lines 16m and 16n). With this driving, the pixel electrode 17i has a negative polarity; the pixel electrode 17j has a positive polarity; the pixel electrode 17m has a negative polarity; the pixel electrode 17n has a positive polarity; the pixel electrode 17I has a positive polarity; and the pixel electrode 17J has a negative polarity. This achieves dot inversion drive in F2 as well.

Figure 47:
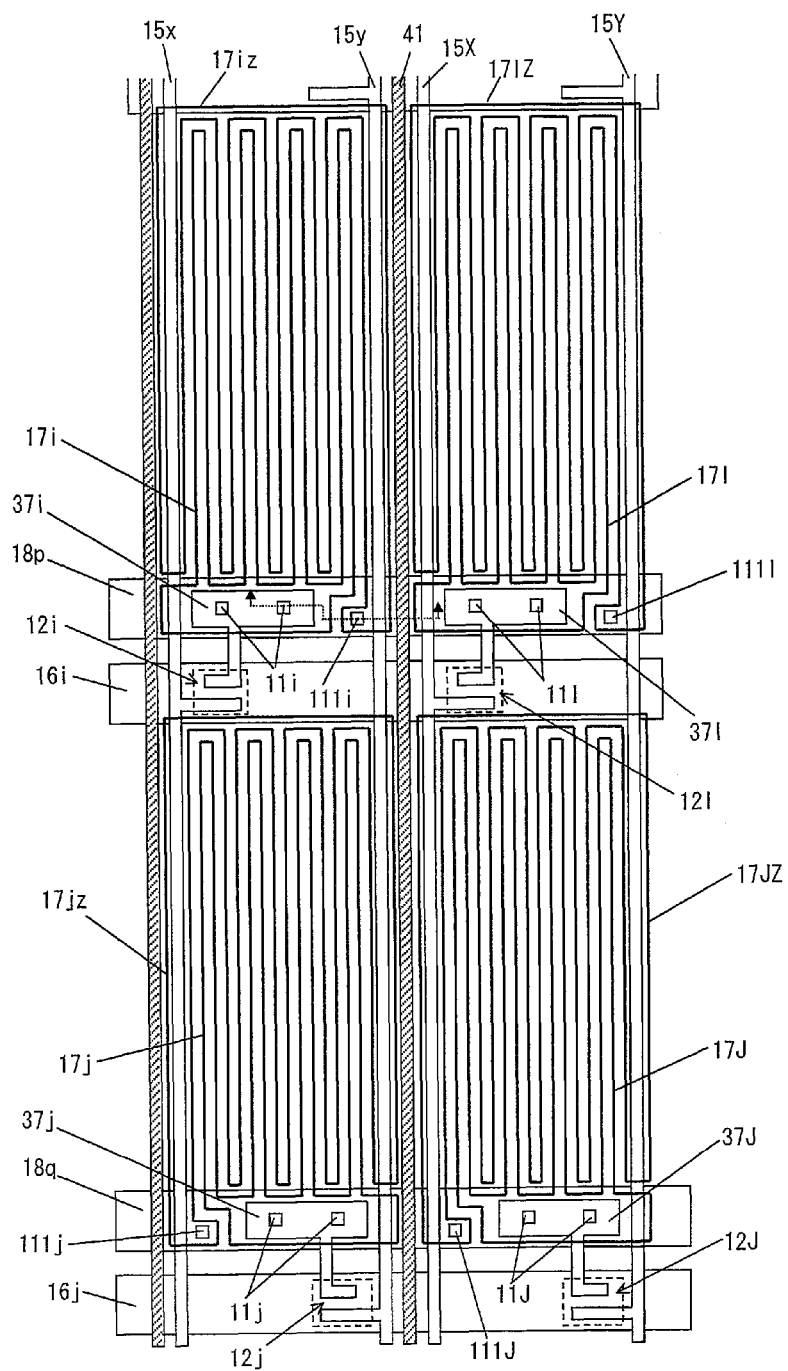
FIG. 47 is a plan view illustrating a configuration of the liquid crystal panel of Embodiment 6.

FIG. 47 is a plan view partially illustrating a liquid crystal panel including the active matrix substrate of FIG. 44. For ease of view, FIG. 47 omits members provided for a color filter substrate (counter substrate), and thus illustrates only members provided for the active matrix substrate.

The liquid crystal panel of FIG. 47 includes: a first pair of (two) data signal lines 15x and 15y and a second pair of (two) data signal lines 15X and 15Y, the data signal lines 15y and 15X being adjacent to each other; a gap line 41 provided between the data signal lines 15y and 15X; scanning signal lines 16i and 16j extending orthogonally to the data signal lines; a transistor 12i provided in the vicinity of an intersection of the data signal line 15x with the scanning signal line 16i; a transistor 12j provided in the vicinity of an intersection of the data signal line 15y with the scanning signal line 16j; a transistor 12I provided in the vicinity of an intersection of the data signal line 15X with the scanning signal line 16i; and a transistor 12J provided in the vicinity of an intersection of the data signal line 15Y with the scanning signal line 16j.

The liquid crystal panel includes: a comb-like pixel electrode 17i; and a comb-like common electrode 17iz shaped so as to mesh with the pixel electrode 17i. The pixel electrode 17i and the common electrode 17iz are provided in a region present (i) upstream from the scanning signal line 16i in a scanning direction and (ii) on a first side of the gap line 41. The liquid crystal panel further includes: a comb-like pixel electrode 17I; and a comb-like common electrode 17IZ shaped so as to mesh with the pixel electrode 17I. The pixel electrode 17I and the common electrode 17IZ are provided in a region present (i) upstream from the scanning signal line 16i in the scanning direction and (ii) on a second side of the gap line 41. The liquid crystal panel further includes: a comb-like pixel electrode 17j; and a comb-like common electrode 17jz shaped so as to mesh with the pixel electrode 17j. The pixel electrode 17j and the common electrode 17jz are provided in a region present (i) upstream from the scanning signal line 16j in the scanning direction and (ii) on the first side of the gap line 41. The liquid crystal panel further includes: a comb-like pixel electrode 17J; and a comb-like common electrode 17JZ shaped so as to mesh with the pixel electrode 17J. The pixel electrode 17J and the common electrode 17JZ are provided in a region present (i) upstream from the scanning signal line 16j in the scanning direction and (ii) on the second side of the gap line 41. In a plan view, the comb-like pixel electrodes 17i, 17j, 17I, and 17J each include (i) a root section present in the vicinity of a scanning signal line and (ii) a teeth section extending from the root section in a column direction. The liquid crystal panel includes: a retention capacitor line 18p provided so as to overlap the respective root sections of the pixel electrodes 17i and 17I; and a retention capacitor line 18q provided so as to overlap the respective root sections of the pixel electrodes 17j and 17J.

The common electrode 17iz overlaps the data signal lines 15x and 15y. The common electrode 17jz also overlaps the data signal lines 15x and 15y. The common electrode 17IZ overlaps the data signal lines 15X and 15Y. The common electrode 17JZ also overlaps the data signal lines 15X and 15Y. The gap line 41 extends through (i) a gap between the pixel electrodes 17iz and 17Iz and below them and (ii) a gap between the pixel electrodes 17jz and 17JZ and below them.

The scanning signal line 16i functions as a gate electrode of the transistor 12i. The transistor 12i has (i) a source electrode connected to the data signal line 15x and (ii) a drain electrode connected to a capacitor electrode 37i via a drain extracting electrode. The capacitor electrode 37i is positioned above the retention capacitor line 18p and connected to the root section of the pixel electrode 17i via two contact holes 11i. The common electrode 17iz is connected to the retention capacitor line 18p via a contact hole 111i. The scanning signal line 16j functions as a gate electrode of the transistor 12j. The transistor 12j has (i) a source electrode connected to the data signal line 15y and (ii) a drain electrode connected to a capacitor electrode 37j via a drain extracting electrode. The capacitor electrode 37j is positioned above the retention capacitor line 18q and connected to the root section of the pixel electrode 17j via two contact holes 11j. The common electrode 17jz is connected to the retention capacitor line 18q via a contact hole 111j.

Similarly, the scanning signal line 16I functions as a gate electrode of the transistor 12I. The transistor 12I has (i) a source electrode connected to the data signal line 15X and (ii) a drain electrode connected to a capacitor electrode 37I via a drain extracting electrode. The capacitor electrode 37I is positioned above the retention capacitor line 18p and connected to the root section of the pixel electrode 17I via two contact holes 11I. The common electrode 17IZ is connected to the retention capacitor line 18p via a contact hole 111I. The scanning signal line 16J functions as a gate electrode of the transistor 12J. The transistor 12J has (i) a source electrode connected to the data signal line 15Y and (ii) a drain electrode connected to a capacitor electrode 37J via a drain extracting electrode. The capacitor electrode 37J is positioned above the retention capacitor line 18q and connected to the root section of the pixel electrode 17J via two contact holes 11J. The common electrode 17JZ is connected to the retention capacitor line 18q via a contact hole 111J.

The liquid crystal panel of the present embodiment is configured such that the retention capacitor line 18p and the capacitor electrode 37i overlap each other via a gate insulating film at a first portion, and thus form the above retention capacitor i at the first portion; the retention capacitor line 18q and the capacitor electrode 37j overlap each other via the gate insulating film at a second portion, and thus form the above retention capacitor j at the second portion; the retention capacitor line 18p and the capacitor electrode 37I overlap each other via the gate insulating film at a third portion, and thus form the above retention capacitor I at the third portion; and the retention capacitor line 18q and the capacitor electrode 37J overlap each other via the gate insulating film at a fourth portion, and thus form the above retention capacitor J at the fourth portion.

Figure 48:
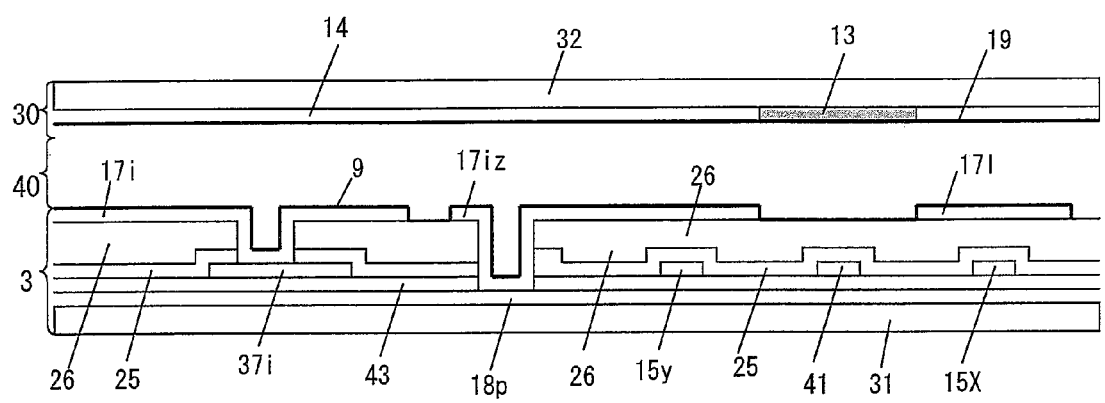
FIG. 48 is a cross-sectional view, taken along a line, of the liquid crystal panel of FIG. 47.

FIG. 48 is a cross-sectional view taken along a line of FIG. 47. As illustrated in FIG. 48, the liquid crystal panel of the present embodiment includes: an active matrix substrate 3; a color filter substrate 30 provided so as to face the active matrix substrate 3; and a liquid crystal layer 40 provided between the two substrates (3 and 30). In the active matrix substrate 3, the retention capacitor line 18p is formed on a glass substrate 31 and covered by a gate insulating film 43.

The active matrix substrate 3 further includes (although not shown in the cross-sectional view) scanning signal lines below the gate insulating film 43. Formed in a layer above the gate insulating film 43 are the capacitor electrode 37$i$, the data signal line 15$y$, the gap line 41, and the data signal line 15X. Further formed above the gate insulating film 43 are (although not shown in the cross-sectional view): semiconductor layers (namely, an i layer and an n+ layer) of each transistor; and a source electrode and a drain electrode of each transistor both in contact with the n+ layer. Metal layers such as the data signal lines and the gap line 41 are covered by an inorganic interlayer insulating film 25, on which an organic interlayer insulating film is formed that is thicker than the inorganic interlayer insulating film 25. Formed on the organic interlayer insulating film 26 are the pixel electrodes 17$i$ and 17I and the common electrode 17$iz$, which are each covered by an alignment film 9. The inorganic interlayer insulating film 25 and the organic interlayer insulating film 26 are each hollowed at a portion at which the contact hole 11$i$ is formed. With this arrangement, the pixel electrode 17$i$ is in contact with the capacitor electrode 37$i$. Further, the gate insulating film 43, the inorganic interlayer insulating film 25, and the organic interlayer insulating film 26 are each hollowed at a portion at which the contact hole 111$i$ is formed. With this arrangement, the common electrode 17$iz$ is in contact with the retention capacitor line 18$p$. The retention capacitor line 18$p$ and the capacitor electrode 37$i$ overlap each other via the gate insulating film 43 as described above at a portion, at which the retention capacitor i is formed.

The color filter substrate 30 includes a black matrix 13 and a colored layer (color filter layer) 14 on a glass substrate 32. The black matrix 13 and the colored layer 14 are covered by an alignment film 19.

Figure 49:
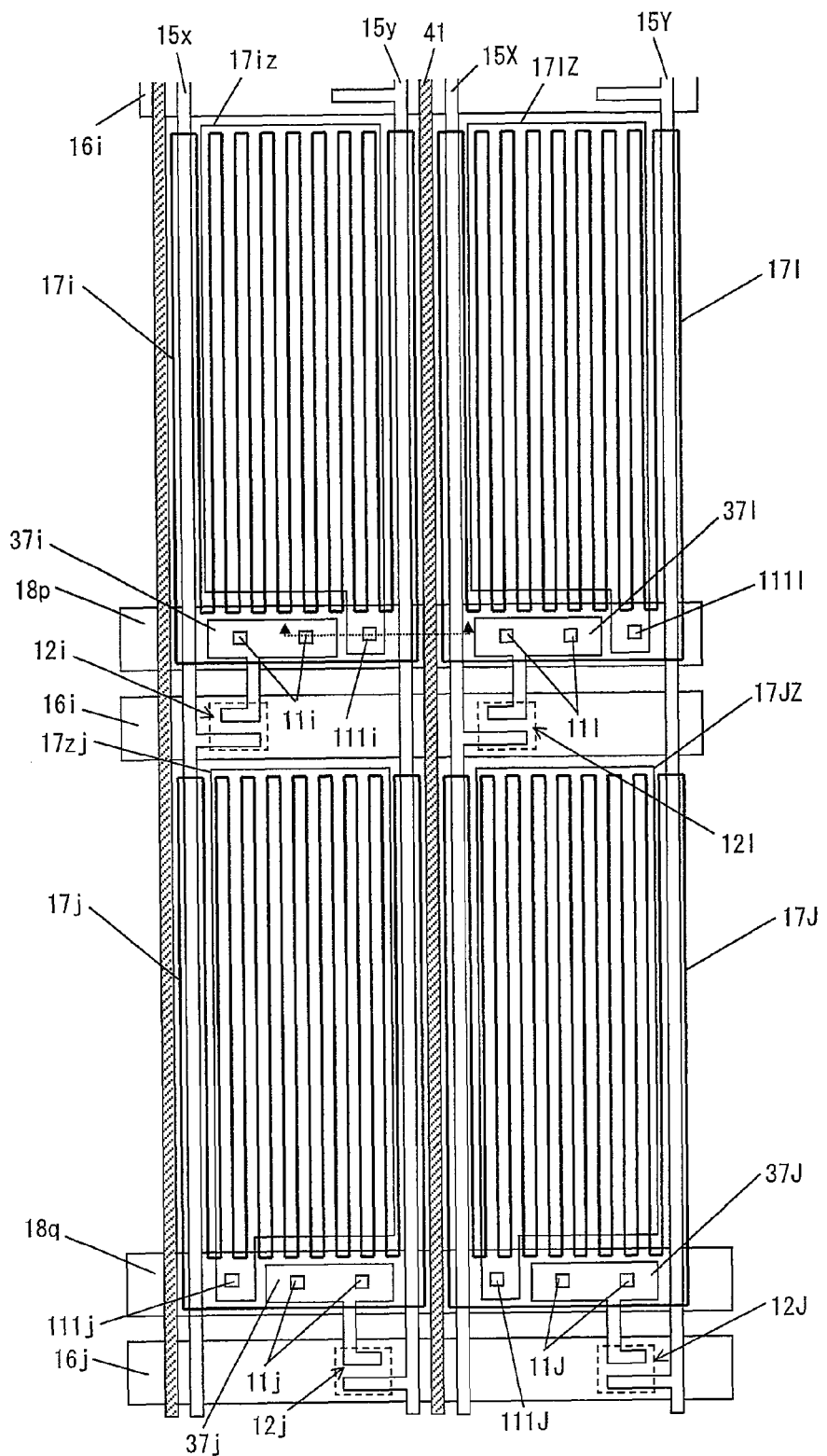
FIG. 49 is a plan view illustrating another configuration of the liquid crystal panel of Embodiment 6.

In the liquid crystal panel of FIG. 47, the common electrodes are provided in a layer in which the comb-like pixel electrodes are provided. The present invention is, however, not limited to this. The common electrodes can alternatively be provided in a layer in which lines such as the data signal lines and the gap lines are provided. FIG. 49 illustrates a liquid crystal panel which includes: an allover common electrode 17$iz$ provided in a transparent electric conductor (such as ITO, IZO, and ZnO) layer so as to face the comb-like pixel electrode 17$i$; an allover common electrode 17$jz$ provided in the transparent electric conductor layer so as to face the comb-like pixel electrode 17$j$; an allover common electrode 17IZ provided in the transparent electric conductor layer so as to face the comb-like pixel electrode 17I; and an allover common electrode 17JZ provided in the transparent electric conductor layer so as to face the comb-like pixel electrode 17J.

In the liquid crystal panel of FIG. 49, the pixel electrode 17$i$ overlaps the data signal lines 15$x$ and 15$y$; the pixel electrode 17$j$ also overlaps the data signal lines 15$x$ and 15$y$; the pixel electrode 17I overlaps the data signal lines 15$x$ and 15Y; and the pixel electrode 17J also overlaps the data signal lines 15X and 15Y.

FIG. 50 is a cross-sectional view taken along a line of FIG. 49. As illustrated in FIG. 50, in the active matrix substrate 3, the retention capacitor line 18$p$ is formed on a glass substrate 31 and covered by a gate insulating film 43. Formed in a layer above the gate insulating film 43 are the capacitor electrode 37$i$, the common electrode 17$iz$, the data signal line 15$y$, the gap line 41, and the data signal line 15X. Metal layers including the common electrode 17$iz$ and the gap line 41 are covered by an inorganic interlayer insulating film 25, on which an organic interlayer insulating film is formed that is thicker than the inorganic interlayer insulating film 25. Formed on the organic interlayer insulating film 26 are the pixel electrodes 17$i$ and 17I, which are each covered by an alignment film 9. The inorganic interlayer insulating film 25 and the organic interlayer insulating film 26 are each hollowed at a portion at which the contact hole 11$i$ is formed. With this arrangement, the pixel electrode 17$i$ is in contact with the capacitor electrode 37$i$. Further, the gate insulating film 43 is hollowed at a portion at which the contact hole 111$i$ is formed. With this arrangement, the common electrode 17$iz$ is in contact with the retention capacitor line 18$p$.

In the embodiments above, the gap line 41 is provided on the gate insulating film 43 within the gap between the data signal lines 15$y$ and 15X in the same layer as the data signal lines 15$y$ and 15X. The present invention is, however, not limited to this. The gap line 41 can alternatively be provided, for example, (i) on the inorganic interlayer insulating film 25 and above the gap between the data signal lines 15$y$ and 15X, (ii) on the inorganic interlayer insulating film 26 and above the gap between the data signal lines 15$y$ and 15X, or (iii) as sandwiched between two gate insulating films below the gap between the data signal lines 15$y$ and 15X.

Figure 51:
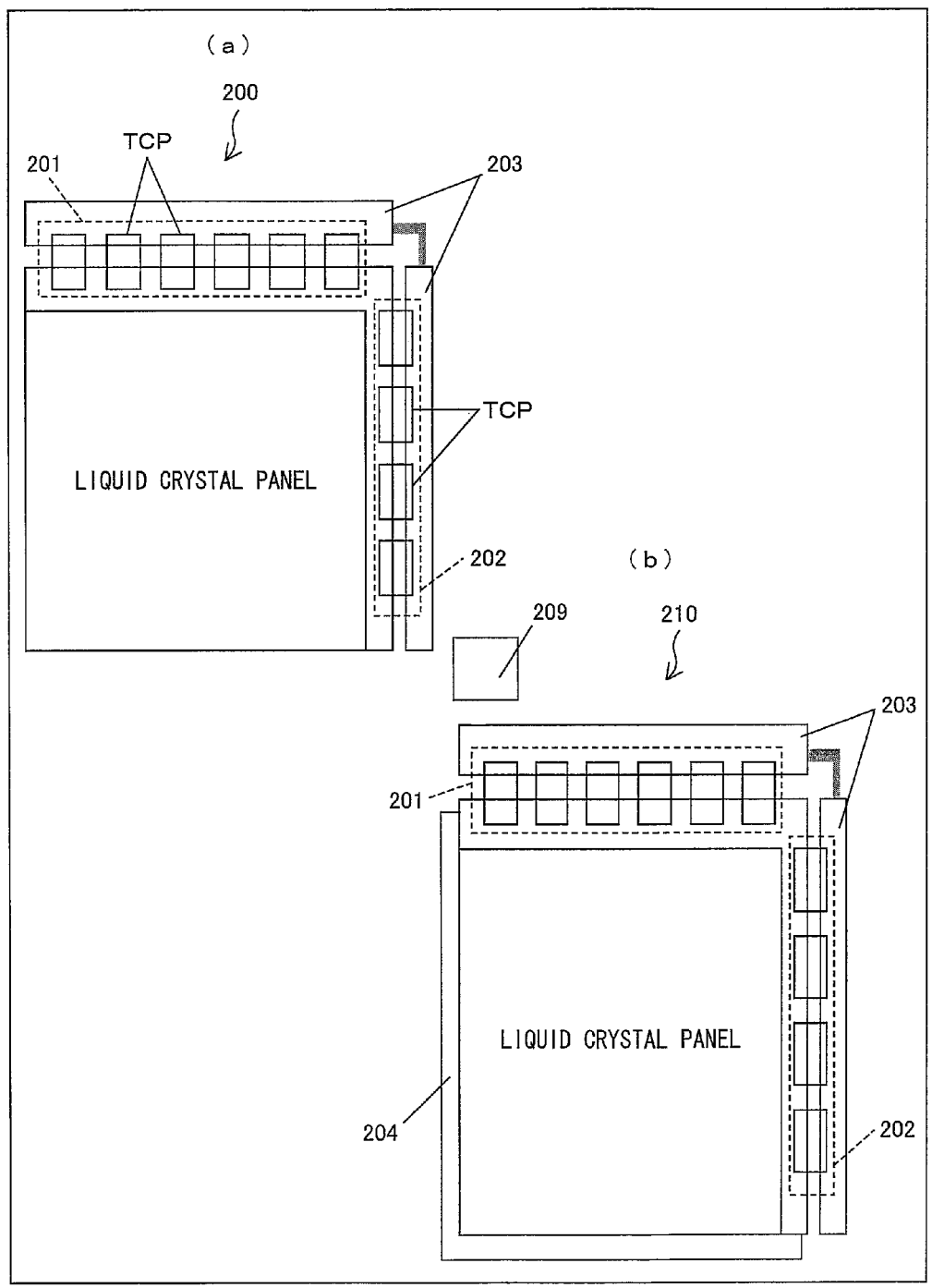
FIG. 51

In the embodiments above, a liquid crystal display unit and a liquid crystal display device of the present invention are configured as follows: To respective sides of a liquid crystal panel of the present invention, two polarization plates A and B are combined so that respective polarization axes of the polarization plates A and B intersect at right angles to each other. Further, members such as an optical compensation sheet can be stacked on each of the polarization plates if necessary. Next, as shown in (a) of FIG. 51, drivers (a gate driver 202 and a source driver 201) are connected to the liquid crystal panel. The description below explains a connection of the drivers by a TCP method as one example. First, an ACF is temporarily pressed on a terminal section of the liquid crystal panel. Next, TCPs in which the drivers are loaded are punched out from a carrier tape. The TCPs are aligned with panel terminal electrodes, and are heated and finally pressed. Thereafter, (i) circuit boards 203 (PWB) for connecting the driver TCPs together and (ii) respective input terminals of the TCPs are connected together with the ACF. As a result, a liquid crystal display unit 200 is produced. Thereafter, as shown in (b) of FIG. 51, a display control circuit 209 is connected to the drivers (201 and 202) of the liquid crystal display unit via the circuit boards 203. By integrating the liquid crystal display unit 200 and the display control circuit 209 with an illumination device (backlight unit) 204, a liquid crystal display device 210 is produced.

FIG. 52 is a block diagram illustrating a configuration of a liquid crystal display device of the present invention. As illustrated in FIG. 52, the liquid crystal display device of the present invention includes a display section (liquid crystal panel), a source driver (SD), a gate driver (GD), and a display control circuit. The source driver drives gate signal lines; the gate driver drives scanning signal lines; and the display control circuit controls the source driver and the gate driver. The liquid crystal display device can further include, as necessary, a retention capacitor line driving circuit for driving the retention capacitor lines (Cs lines).

The display control circuit receives, from an outside signal source (e.g., a tuner), a digital video signal Dv indicative of an image to be displayed; a horizontal sync signal HSY and a vertical sync signal VSY each corresponding to the digital video signal Dv; and a control signal Dc for controlling display operation. Further, the display control circuit generates, from the signals Dv, HSY, VSY, and Dc thus received, a data start pulse signal SSP, a data clock signal SCK, a digital image signal DA indicative of the image to be displayed (signal corresponding to the video signal Dv), a gate start pulse signal GSP, a gate clock signal GCK, and a gate driver output control signal (scanning signal output control signal) GOE, each serving as a signal for enabling the display section to display an image indicated by the digital video signal Dv. The display control circuit outputs these signals thus generated.

To be more specific, the video signal Dv is subjected to processes such as timing adjustment in an internal memory as necessary and then outputted as the digital image signal DA from the display control circuit. The data clock signal SCK is generated as a signal consisting of pulses corresponding to pixels of the image indicated by the digital image signal DA. The data start pulse signal SSP is generated, on the basis of the horizontal sync signal HSY, as a signal which has a high (H) level only during a predetermined period with respect to each horizontal scanning period. The gate start pulse signal GSP is generated, on the basis of the vertical sync signal VSY, as a signal which has a H level only during a predetermined period with respect to each frame period (each vertical scanning period). The gate clock signal GCK is generated on the basis of the horizontal sync signal HSY. The gate driver output control signal GOE is generated on the basis of the horizontal sync signal HSY and the control signal Dc.

Among the signals thus generated by the display control circuit, the digital image signal DA, a polarity reversal signal POL for controlling a polarity of a data signal (data data signal), the data start pulse signal SSP, and the data clock signal SCK are inputted to the source driver, whereas the gate start pulse signal GSP, the gate clock signal GCK, and the gate driver output control signal GOE are inputted to the gate driver.

On the basis of the digital image signal DA, the data clock signal SCK, the data start pulse signal SSP, and the polarity reversal signal POL, the source driver generates, sequentially for each horizontal scanning period, analog potentials (data signals) corresponding to pixel values in each scanning signal line of the image indicated by the digital image signal DA. The source driver then outputs the data signals to the respective data signal lines.

The gate driver generates gate signals on the basis of the gate start pulse signal GSP, the gate clock signal GCK, and the gate driver output control signal GOE, and then outputs the gate signals to the respective scanning signal lines so as to selectively drive the scanning signal lines.

The source driver and the gate driver respectively drive the data signal lines and the scanning signal lines of the display section (liquid crystal panel) as described above, so that a data signal is written into a pixel electrode from a data signal line via a transistor (TFT) connected with the selected scanning signal line. With this arrangement, in individual sub-pixels, a voltage is applied to the liquid crystal layer, and application of the voltage controls transmittance of light from the backlight, thereby enabling a display of the image indicated by the digital video signal Dv.

The following explains a configuration example of how the liquid crystal display device of the present invention is included in a television receiver. FIG. 53 is a block diagram illustrating a configuration of a liquid crystal display device 800 for use in a television receiver. The liquid crystal display device 800 includes a liquid crystal display unit 84, a Y/C separation circuit 80, a video chroma circuit 81, an A/D converter 82, a liquid crystal controller 83, a backlight drive circuit 85, a backlight 86, a microcomputer 87, and a gradation circuit 88. The liquid crystal display unit 84 includes: a liquid crystal panel; and a source driver and a gate driver each for driving the liquid crystal panel.

In the liquid crystal display device 800 having the above configuration, a complex color video signal Scv as a television signal is inputted from the outside to the Y/C separation circuit 80. In the Y/C separation circuit 80, the complex color video signal Scv is separated into a luminance signal and a color signal. The luminance signal and the color signal are converted in the video chroma circuit 81 to analog RGB signals corresponding to three primary colors of light. Further, the analog RGB signals are converted to digital RGB signals by the A/D converter 82. The digital RGB signals are supplied to the liquid crystal controller 83. In the Y/C separation circuit 80, horizontal and vertical sync signals are extracted from the complex color video signal Scv inputted from the outside. These sync signals are also supplied to the liquid crystal controller 83 via the microcomputer 87.

The liquid crystal display unit 84 receives, from the liquid crystal controller 83, the digital RGB signals as well as timing signals based on the sync signals at predetermined timing. Further, the gradation circuit 88 generates gradation potentials corresponding to three primary colors R, G, and B for color display, and supplies the gradation potentials to the liquid crystal display unit 84. In the liquid crystal display unit 84, drive signals (such as data signals and gate signals) are generated by internal members such as the source driver and the gate driver in accordance with the RGB signals, the timing signals, and the gradation potentials. In accordance with the above drive signals, a color image is displayed in the internal liquid crystal panel. In order to enable the liquid crystal display unit 84 to display an image, it is necessary to emit light from behind the liquid crystal panel in the liquid crystal display unit. In the liquid crystal display device 800, under control of the microcomputer 87, the backlight drive circuit 85 drives the backlight 86 so as to emit light to the backside of the liquid crystal panel. Control of the whole system, including the above processes, is carried out by the microcomputer 87. The video signal (complex color video signal) inputted from the outside can be a signal such as (i) a video signal based on television broadcasting and (ii) a video signal picked up by a camera or supplied via the Internet line. The liquid crystal display device 800 can display an image in accordance with any of various video signals.

In displaying an image by the liquid crystal display device 800 in accordance with television broadcasting, a tuner section 90 is connected to the liquid crystal display device 800 as illustrated in FIG. 54 so that a television receiver 701 of the present invention is produced. The tuner section 90 extracts a channel signal to be received from waves (high-frequency signals) received by an antenna (not shown), and thus converts the channel signal to an intermediate frequency signal. The tuner section 90 detects the intermediate frequency signal and extracts the complex color video signal Scv as the television signal. The complex color video signal Scv is supplied to the display device device 800 as described above, and an image is thus displayed by the display device device 800 in accordance with the complex color video signal Scv.

FIG. 55 is an exploded perspective view illustrating an example of a configuration of the television receiver of the present invention. As illustrated in FIG. 55, the present television receiver 701 includes, as constituents thereof, a first housing 801 and a second housing 806 in addition to the display device 800. The liquid crystal display device 800 is arranged such that the first and second housings 801 and 806 hold the display device 800 so as to wrap it therein. The first housing 801 has an opening 801a for transmitting an image displayed on the liquid crystal display device 800. The second housing 806 covers a backside of the liquid crystal display device 800, and is provided with an operating circuit 805 for operating the display device 800. The second housing 806 is further provided with a supporting member 808 at a lower portion thereof.

An array substrate of the present invention includes: scanning signal lines; data signal lines to each of which a data signal is supplied; a first pixel region column; and a second pixel region column adjacent to the first pixel region column, each of the first and second pixel region columns including pixel regions, wherein: data signal lines corresponding to the first pixel region column are provided; data signal lines corresponding to the second pixel region column are provided; a gap between two adjacent data signal lines is provided, one of the two adjacent data signal lines being corresponding to the first pixel region column, and the other of the two adjacent data signal lines being corresponding to the second pixel region column; and a gap line is provided in the gap, below the gap, or above the gap, a signal different from the data signal being supplied to the gap line.

In a case where a display device (for example, a liquid crystal display device) including the array substrate of the present invention (for example, an active matrix substrate) is driven, the gap line is supplied with a signal other than the data signal (for example, a signal having a constant potential or a signal having a polarity which is inverted periodically). With this arrangement, it is possible to (i) reduce a cross talk between a first pixel and a data signal line corresponding to a second pixel adjacent to the first pixel, and thus (ii) improve display quality.

The array substrate of the present invention may be arranged such that the first pixel region column corresponds to a first pair of data signal lines; the second pixel region column corresponds to a second pair of data signal lines; each of the pixel regions includes one or more pixel electrodes; a pixel electrode included in the first pixel region column is connected via a transistor to either of the first pair of data signal lines corresponding to the first pixel region column; and a pixel electrode included in the second pixel region column is connected via a transistor to either of the second pair of data signal lines corresponding to the second pixel region column.

The array substrate of the present invention may be arranged such that the gap line is provided in a layer in which the two adjacent data signal lines are provided.

The array substrate of the present invention may be arranged such that the pixel electrodes included in the first pixel region column are each provided so as to overlap each of the first pair of data signal lines corresponding to the first pixel region column; and the pixel electrodes included in the second pixel region column are each provided so as to overlap each of the second pair of data signal lines corresponding to the second pixel region column.

The array substrate of the present invention may be arranged such that in each of the first and second pixel region columns, a first one of two consecutive pixel regions includes a pixel electrode which is connected via a transistor to a data signal line which is different from a data signal line to which a pixel electrode included in a second one of the two consecutive pixel regions is connected via a transistor.

The array substrate of the present invention may be arranged such that each odd-numbered pixel region in the first pixel region column includes a pixel electrode that is connected via a transistor to a data signal line which is adjacent, across the gap line, to a data signal line to which a pixel electrode included in each even-numbered pixel region in the second pixel region column is connected via a transistor.

The array substrate of the present invention may further include: a gate insulating film covering a gate electrode of a transistor; and an interlayer insulating film covering a channel of the transistor, wherein: the two adjacent data signal lines and the gap line are provided on the gate insulating film; and each pixel electrode is provided on the interlayer insulating film.

The array substrate of the present invention may be arranged such that the interlayer insulating film includes (i) an inorganic insulating film and (ii) an organic insulating film which is thicker than the inorganic insulating film.

The array substrate of the present invention may further include: retention capacitor lines, wherein: the gap line is connected to at least one of the retention capacitor lines.

The array substrate of the present invention may be arranged such that the pixel electrodes included in the first pixel region column and the pixel electrodes included in the second pixel region column are provided so as to each overlap the gap line.

The array substrate of the present invention may be arranged such that assuming that the first pair of data signal lines corresponding to the first pixel region column are separated from each other by a first distance expressed as 100, one of the first pair of data signal lines which one is adjacent to the gap line is separated from the gap line by a second distance ranging from 2 to 198.

The array substrate of the present invention may be arranged such that the first distance is substantially equal to the second distance.

The array substrate of the present invention may be arranged such that each of the pixel regions includes pixel electrodes.

The array substrate of the present invention may further include: retention capacitor lines, wherein: each of the pixel regions includes two pixel electrodes which are connected to an identical data signal line via respective transistors connected to an identical scanning signal line; and a first one of the two pixel electrodes forms a capacitor together with a first retention capacitor line, whereas a second one of the two pixel electrodes forms a capacitor together with a second retention capacitor line, the first retention capacitor line being different from the second retention capacitor line.

The array substrate of the present invention may be arranged such that each of the pixel regions includes two pixel electrodes which are connected to each other via a capacitor; and only one of the two pixel electrodes is connected to a data signal line via a transistor connected to a single scanning signal line.

The array substrate of the present invention may further include: retention capacitor lines, wherein: each of the pixel regions includes two pixel electrodes which are connected to an identical data signal line via respective transistors connected to an identical scanning signal line; and one of the two pixel electrodes is connected, via a transistor connected to a scanning signal line which is different from the identical scanning signal line, to a capacitor electrode which forms a capacitor together with a retention capacitor line.

The array substrate of the present invention may further include: retention capacitor lines, wherein: each of the pixel regions includes two pixel electrodes which are connected to an identical data signal line via respective transistors connected to an identical scanning signal line; a first one of the two pixel electrodes is connected, via a transistor connected to a scanning signal line which is different from the identical scanning signal line, to a capacitor electrode which forms a capacitor together with a second one of the two pixel electrodes; and the capacitor electrode further forms a capacitor together with a retention capacitor line.

The array substrate of the present invention may further include: a color filter for the pixel electrodes included in the first pixel region column and the pixel electrodes included in the second pixel region column.

The array substrate of the present invention may further include: a comb-like pixel electrode provided in each of the pixel regions; and a common electrode provided in a layer in which the comb-like pixel electrode is provided.

The array substrate of the present invention may further include: a comb-like pixel electrode provided in each of the pixel regions; and a common electrode provided in a layer different from a layer in which the comb-like pixel electrode is provided.

A liquid crystal panel of the present invention includes the array substrate.

A liquid crystal display device of the present invention includes the liquid crystal panel.

The liquid crystal display device may be arranged such that the gap line is supplied with a signal having a constant potential.

The liquid crystal display device may be arranged such that the gap line is supplied with a signal having a polarity which is inverted periodically.

The liquid crystal display device may be arranged such that the gap line is supplied with a signal having a potential which has an effective value that is substantially equal to an effective value of a potential of the common electrode.

A liquid crystal display device of the present invention includes: the array substrate, wherein: two scanning signal lines are simultaneously selected at a time.

The liquid crystal display device may be arranged such that in each of the first and second pixel region columns, a first one of two consecutive pixel regions includes a pixel electrode which is connected via a first transistor to a data signal line which is different from a data signal line to which a pixel electrode included in a second one of the two consecutive pixel regions is connected via a second transistor; and the first transistor is connected to a first one of the two scanning signal lines, whereas the second transistor is connected to a second one of the two scanning signal lines.

In the present invention, a scanning signal line functioning as a gate electrode of a transistor is also expressed as (i) a transistor being connected to a scanning signal line or (ii) a transistor having a gate electrode connected to a scanning signal line.

The liquid crystal display device may be arranged such that a first one of the first pair of data signal lines corresponding to the first pixel region column is supplied, during a vertical scanning period, with a data signal having a first polarity, whereas a second one of the first pair of data signal lines corresponding to the first pixel region column is supplied, during the vertical scanning period, with a data signal having a second polarity; and a first one of the second pair of data signal lines corresponding to the second pixel region column is supplied, during the vertical scanning period, with a data signal having the first polarity, whereas a second one of the second pair of data signal lines corresponding to the second pixel region column is supplied, during the vertical scanning period, with a data signal having the second polarity.

The liquid crystal display device may be arranged such that each odd-numbered pixel region in the first pixel region column includes a pixel electrode that is connected via a transistor to a first data signal line which is adjacent, across the gap line, to a second data signal line to which a pixel electrode included in each even-numbered pixel region in the second pixel region column is connected via a transistor; and the first data signal line and the second data signal line are supplied, during an identical horizontal scanning period, with respective data signals which are identical to each other in polarity.

A liquid crystal display device of the present invention includes the array substrate wherein: the retention capacitor lines are each supplied with a signal having a polarity which is inverted periodically. In this case, the gap line may be connected to two or more of the retention capacitor lines. Alternatively, the two or more of the retention capacitor lines may be supplied with respective signals which are identical to one another in phase.

A television receiver of the present invention includes: the liquid crystal display device; and a tuner section for receiving television broadcast.

The present invention is not limited to the above embodiments, but further encompasses (i) embodiments achieved by appropriately modifying the above embodiments on the basis of known techniques and common general technical knowledge and (ii) embodiments achieved by combining such embodiments. Further, the operational advantages and the like described in the above embodiments are merely examples.

INDUSTRIAL APPLICABILITY

An active matrix substrate of the present invention and a liquid crystal panel including the active matrix substrate are suitably applicable in, for example, a liquid crystal television.

REFERENCE SIGNS LIST

101 to 108 pixel region
12i, 12j, 12m, 12n transistor
15x, 15y, 15X, 15Y data signal line
16i, 16j scanning signal line
17i, 17j, 17m, 17n pixel electrode
18p, 18r, 18s retention capacitor line
41 gap line
α, β pixel region column

The invention claimed is:
1. An array substrate, comprising:
scanning signal lines;
data signal lines to each of which a data signal is supplied;
a first pixel region column; and
a second pixel region column adjacent to the first pixel region column, each of the first and second pixel region columns including pixel regions, wherein:
data signal lines corresponding to the first pixel region column are provided;
data signal lines corresponding to the second pixel region column are provided;
a gap between two adjacent data signal lines is provided, one of the two adjacent data signal lines being corresponding to the first pixel region column, and the other of the two adjacent data signal lines being corresponding to the second pixel region column; and
a gap line is provided in the gap, below the gap, or above the gap, a signal different from the data signal being supplied to the gap line;
the first pixel region column corresponds to a first pair of data signal lines;
the second pixel region column corresponds to a second pair of data signal lines;
each of the pixel regions includes one or more pixel electrodes;

a pixel electrode included in the first pixel region column is connected via a transistor to either of the first pair of data signal lines corresponding to the first pixel region column;

a pixel electrode included in the second pixel region column is connected via a transistor to either of the second pair of data signal lines corresponding to the second pixel region column; and the pixel electrodes included in the first pixel region column and the pixel electrodes included in the second pixel region column are each provided so as to overlap the gap line.

2. The array substrate according to claim 1, wherein:
the gap line is provided in a layer in which the two adjacent data signal lines are provided.

3. The array substrate according to claim 2, further comprising:
a gate insulating film covering a gate electrode of a transistor; and
an interlayer insulating film covering a channel of the transistor, wherein:
the two adjacent data signal lines and the gap line are provided on the gate insulating film; and
each pixel electrode is provided on the interlayer insulating film.

4. The array substrate according to claim 3, wherein:
the interlayer insulating film includes (i) an inorganic insulating film and (ii) an organic insulating film which is thicker than the inorganic insulating film.

5. The array substrate according to claim 1, wherein:
the pixel electrodes included in the first pixel region column are each provided so as to overlap each of the first pair of data signal lines corresponding to the first pixel region column; and
the pixel electrodes included in the second pixel region column are each provided so as to overlap each of the second pair of data signal lines corresponding to the second pixel region column.

6. The array substrate according to claim 1, wherein:
in each of the first and second pixel region columns, a first one of two consecutive pixel regions includes a pixel electrode which is connected via a transistor to a data signal line which is different from a data signal line to which a pixel electrode included in a second one of the two consecutive pixel regions is connected via a transistor.

7. The array substrate according to claim 6, wherein:
each odd-numbered pixel region in the first pixel region column includes a pixel electrode that is connected via a transistor to a data signal line which is adjacent, across the gap line, to a data signal line to which a pixel electrode included in each even-numbered pixel region in the second pixel region column is connected via a transistor.

8. The array substrate according to claim 1, further comprising:
retention capacitor lines, wherein:
the gap line is connected to at least one of the retention capacitor lines.

9. The array substrate according to claim 1, wherein:
assuming that the first pair of data signal lines corresponding to the first pixel region column are separated from each other by a first distance expressed as 100, one of the first pair of data signal lines which one is adjacent to the gap line is separated from the gap line by a second distance ranging from 2 to 198.

10. The array substrate according to claim 9, wherein:
the first distance is substantially equal to the second distance.

11. A liquid crystal display device, comprising:
the array substrate recited in claim 10, wherein:
the retention capacitor lines are each supplied with a signal having a polarity which is inverted periodically.

12. The liquid crystal display device according to claim 11, wherein:
the gap line is connected to two or more of the retention capacitor lines.

13. The liquid crystal display device according to claim 12, wherein:
the two or more of the retention capacitor lines are supplied with respective signals which are identical to one another in phase.

14. The array substrate according to claim 1, wherein:
each of the pixel regions includes a plurality of pixel electrodes.

15. The array substrate according to claim 14, further comprising:
retention capacitor lines, wherein:
each of the pixel regions includes two pixel electrodes which are connected to an identical data signal line via respective transistors connected to an identical scanning signal line; and
a first one of the two pixel electrodes forms a capacitor together with a first retention capacitor line, whereas a second one of the two pixel electrodes forms a capacitor together with a second retention capacitor line, the first retention capacitor line being different from the second retention capacitor line.

16. The array substrate according to claim 14, wherein:
each of the pixel regions includes two pixel electrodes which are connected to each other via a capacitor; and
only one of the two pixel electrodes is connected to a data signal line via a transistor connected to a single scanning signal line.

17. The array substrate according to claim 14, further comprising:
retention capacitor lines, wherein:
each of the pixel regions includes two pixel electrodes which are connected to an identical data signal line via respective transistors connected to an identical scanning signal line; and
one of the two pixel electrodes is connected, via a transistor connected to a scanning signal line which is different from the identical scanning signal line, to a capacitor electrode which forms a capacitor together with a retention capacitor line.

18. The array substrate according to claim 14, further comprising:
retention capacitor lines, wherein:
each of the pixel regions includes two pixel electrodes which are connected to an identical data signal line via respective transistors connected to an identical scanning signal line;
a first one of the two pixel electrodes is connected, via a transistor connected to a scanning signal line which is different from the identical scanning signal line, to a capacitor electrode which forms a capacitor together with a second one of the two pixel electrodes; and
the capacitor electrode further forms a capacitor together with a retention capacitor line.

19. The array substrate according to claim 18, further comprising:
a color filter for the pixel electrodes included in the first pixel region column and the pixel electrodes included in the second pixel region column.

20. The array substrate according to claim 1, further comprising:
a comb-like pixel electrode provided in each of the pixel regions; and
a common electrode provided in a layer in which the comb-like pixel electrode is provided.

21. The array substrate according to claim 1, further comprising:
a comb-like pixel electrode provided in each of the pixel regions; and
a common electrode provided in a layer different from a layer in which the comb-like pixel electrode is provided.

22. A liquid crystal panel, comprising:
the array substrate recited in claim 1.

23. A liquid crystal display device, comprising:
the liquid crystal panel recited in claim 22.

24. The liquid crystal display device according to claim 23, wherein:
the gap line is supplied with a signal having a constant potential.

25. The liquid crystal display device according to claim 23, wherein:
the gap line is supplied with a signal having a polarity which is inverted periodically.

26. The liquid crystal display device according to claim 23, wherein:
the gap line is supplied with a signal having a potential which has an effective value that is substantially equal to an effective value of a potential of the common electrode.

27. A liquid crystal display device, comprising:
the array substrate recited in claim 1, wherein:
two scanning signal lines are simultaneously selected at a time.

28. The liquid crystal display device according to claim 27, wherein:
in each of the first and second pixel region columns, a first one of two consecutive pixel regions includes a pixel electrode which is connected via a first transistor to a data signal line which is different from a data signal line to which a pixel electrode included in a second one of the two consecutive pixel regions is connected via a second transistor; and
the first transistor is connected to a first one of the two scanning signal lines, whereas the second transistor is connected to a second one of the two scanning signal lines.

29. The liquid crystal display device according to claim 28, wherein:
a first one of the first pair of data signal lines corresponding to the first pixel region column is supplied, during a vertical scanning period, with a data signal having a first polarity, whereas a second one of the first pair of data signal lines corresponding to the first pixel region column is supplied, during the vertical scanning period, with a data signal having a second polarity; and
a first one of the second pair of data signal lines corresponding to the second pixel region column is supplied, during the vertical scanning period, with a data signal having the first polarity, whereas a second one of the second pair of data signal lines corresponding to the second pixel region column is supplied, during the vertical scanning period, with a data signal having the second polarity.

30. The liquid crystal display device according to claim 29, wherein:
each odd-numbered pixel region in the first pixel region column includes a pixel electrode that is connected via a transistor to a first data signal line which is adjacent, across the gap line, to a second data signal line to which a pixel electrode included in each even-numbered pixel region in the second pixel region column is connected via a transistor; and
the first data signal line and the second data signal line are supplied, during an identical horizontal scanning period, with respective data signals which are identical to each other in polarity.

31. The array substrate according to claim 1, wherein:
no transistor is connected to the gap line.

* * * * *